United States Patent [19]
Kikuchi et al.

[11] Patent Number: 5,870,523
[45] Date of Patent: Feb. 9, 1999

[54] RECORDING MEDIUM ON WHICH A DATA CONTAINING NAVIGATION DATA IS RECORDED, A METHOD AND APPARATUS FOR REPRODUCING A DATA ACCORDING TO NAVIGATION DATA, A METHOD AND APPARATUS FOR RECORDING A DATA CONTAINING NAVIGATION DATA ON A RECORDING

[75] Inventors: Shinichi Kikuchi; Takeo Arafune, both of Yokohama; Tetsuya Kitamura, Komae; Hideki Mimura, Yokohama; Kazuhiko Taira, Yokohama; Yuzo Tamada, Yokohama, all of Japan

[73] Assignee: Kabushiki Kaisha Toshiba, Kawasaki, Japan

[21] Appl. No.: 593,889

[22] Filed: Jan. 30, 1996

[30] Foreign Application Priority Data

Jan. 30, 1995 [JP] Japan ................................. 7-013164

[51] Int. Cl.⁶ .............................. H04N 5/781; H04N 5/92
[52] U.S. Cl. ............................. 386/95; 386/98; 386/111; 386/125
[58] Field of Search .................................. 386/1, 33, 95, 386/105–106, 109, 111, 112, 125, 126, 98; 369/47–48, 59–60, 32, 275.3; 360/27, 48; 381/30; 395/144; H04N 5/78, 5/92, 9/79

[56] References Cited

U.S. PATENT DOCUMENTS 4,791,622 12/1988 Clay .
5,282,186 1/1994 Yoshio .
5,357,546 10/1994 Meriwether .
5,365,502 11/1994 Misono .

FOREIGN PATENT DOCUMENTS

0424903A2 5/1991 European Pat. Off. .
0424903A3 5/1991 European Pat. Off. .
459157 12/1991 European Pat. Off. .
498617 8/1992 European Pat. Off. .

(List continued on next page.)

OTHER PUBLICATIONS

Patent Abstracts of Japan, Publication No. 08055432 A, Date of Publication of Application—Feb. 27, 1996.
Patent Abstracts of Japan, Publication No. 4–332969, Date of Publication of Application—Nov. 19, 1992.
Von Hans–Jurgen Appelrath, "Bildplatten–Navigations–und–Retrievalsysteme," 1155 Technische Rundschaue 79 (1987) 13 Marz, No. 11, Bem, Schweiz, pp. 74–79.

*Primary Examiner*—Thai Tran
*Attorney, Agent, or Firm*—Pillsbury Madison & Sutro LLP

[57] ABSTRACT

In a super density optical disk for storing video data, wherein data video is compressed to packs defined in MPEG and trains of the packs are stored in a video object unit. The video object unit includes a navigation pack which is placed at the head of the pack train. In a data cell, a plurality of video object units, each being reproduced within a predetermined period, are arranged and a cell playback information table describes a cell playback information which defines a playback order of the cells. The navigation pack has an area storing playback information for reproducing each video object unit and search information for indicating the relationship with other video object units. The data cells and the cell playback information table are stored in the optical disk.

138 Claims, 36 Drawing Sheets

FOREIGN PATENT DOCUMENTS

| | | |
|---|---|---|
| 0521487A1 | 1/1993 | European Pat. Off. . |
| 0528425A2 | 2/1993 | European Pat. Off. . |
| 0528425A3 | 2/1993 | European Pat. Off. . |
| 0542377A2 | 5/1993 | European Pat. Off. . |
| 0542377A3 | 5/1993 | European Pat. Off. . |
| 0606868A2 | 7/1994 | European Pat. Off. . |
| 0606868A3 | 7/1994 | European Pat. Off. . |
| 635835 | 1/1995 | European Pat. Off. . |
| 0644692A2 | 3/1995 | European Pat. Off. . |
| 0644692A3 | 3/1995 | European Pat. Off. . |
| 664646 | 7/1995 | European Pat. Off. . |
| 0677842A1 | 10/1995 | European Pat. Off. . |
| 675493 | 10/1995 | European Pat. Off. . |
| 677842 | 10/1995 | European Pat. Off. . |
| 0685845A2 | 12/1995 | European Pat. Off. . |
| 2189780 | 7/1990 | Japan . |
| 3293873 | 12/1991 | Japan . |
| 4324165 | 11/1992 | Japan . |
| 6309841 | 11/1994 | Japan . |
| WO 92/05658 | 4/1992 | WIPO . |
| WO 94/30014 | 12/1994 | WIPO . |

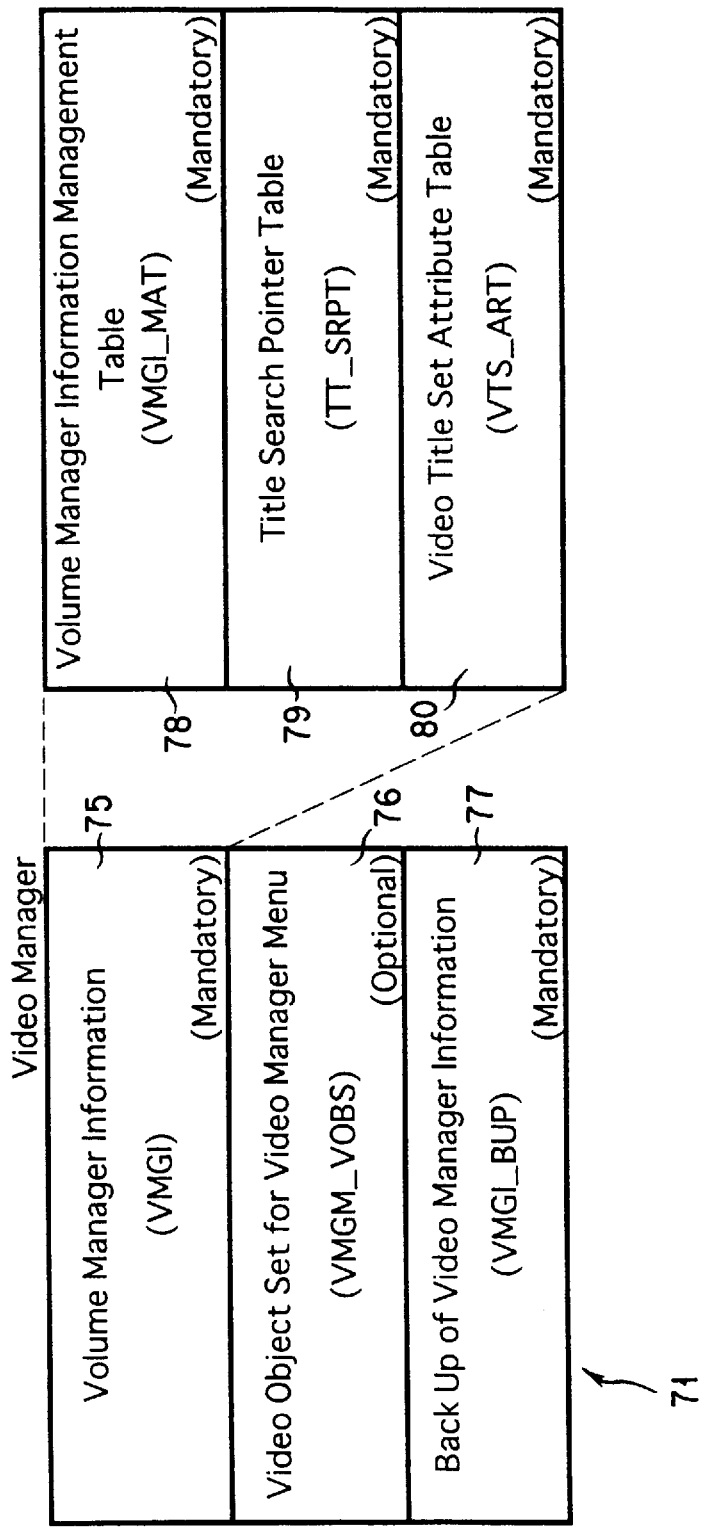
F I G. 5

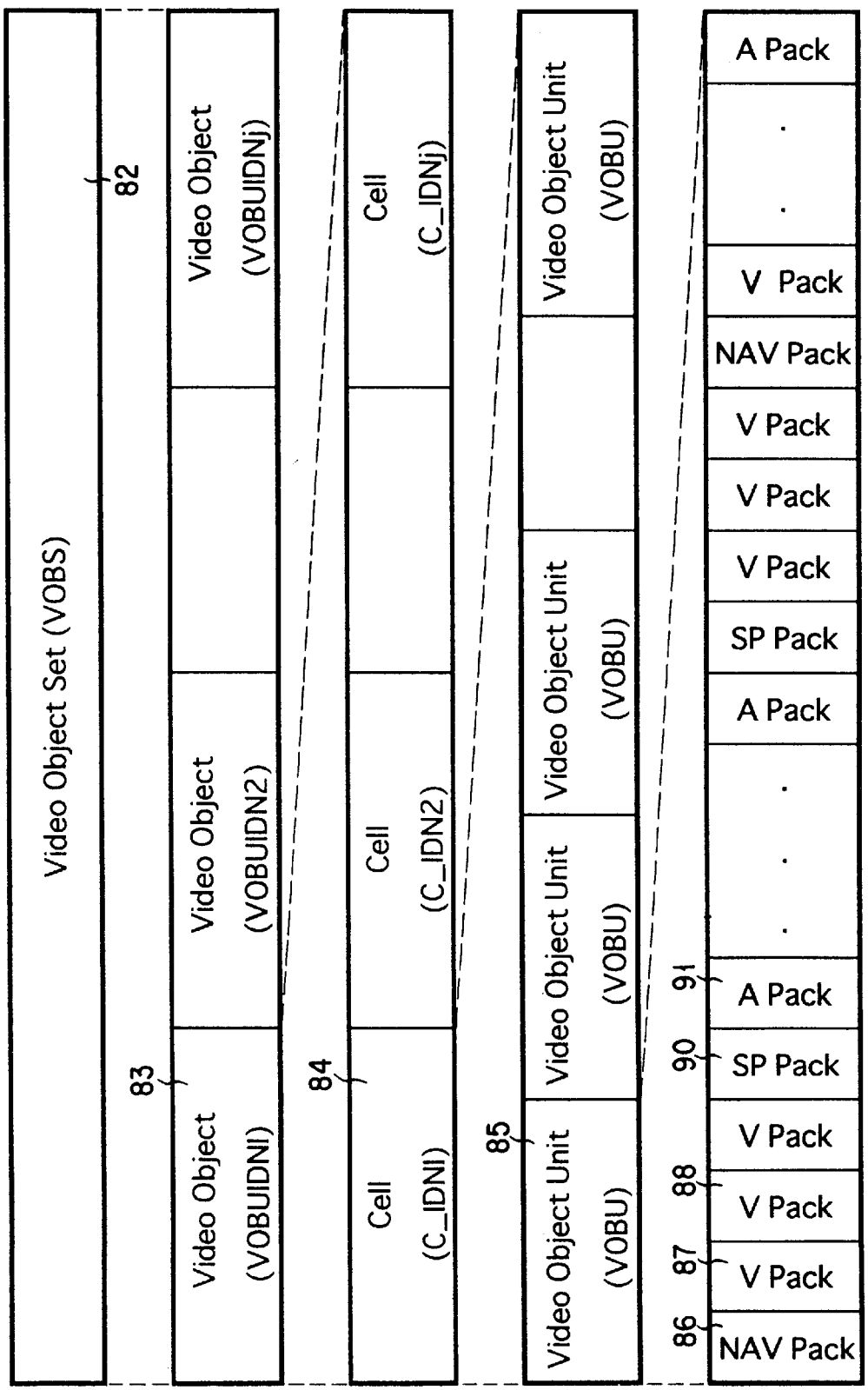
F I G. 6

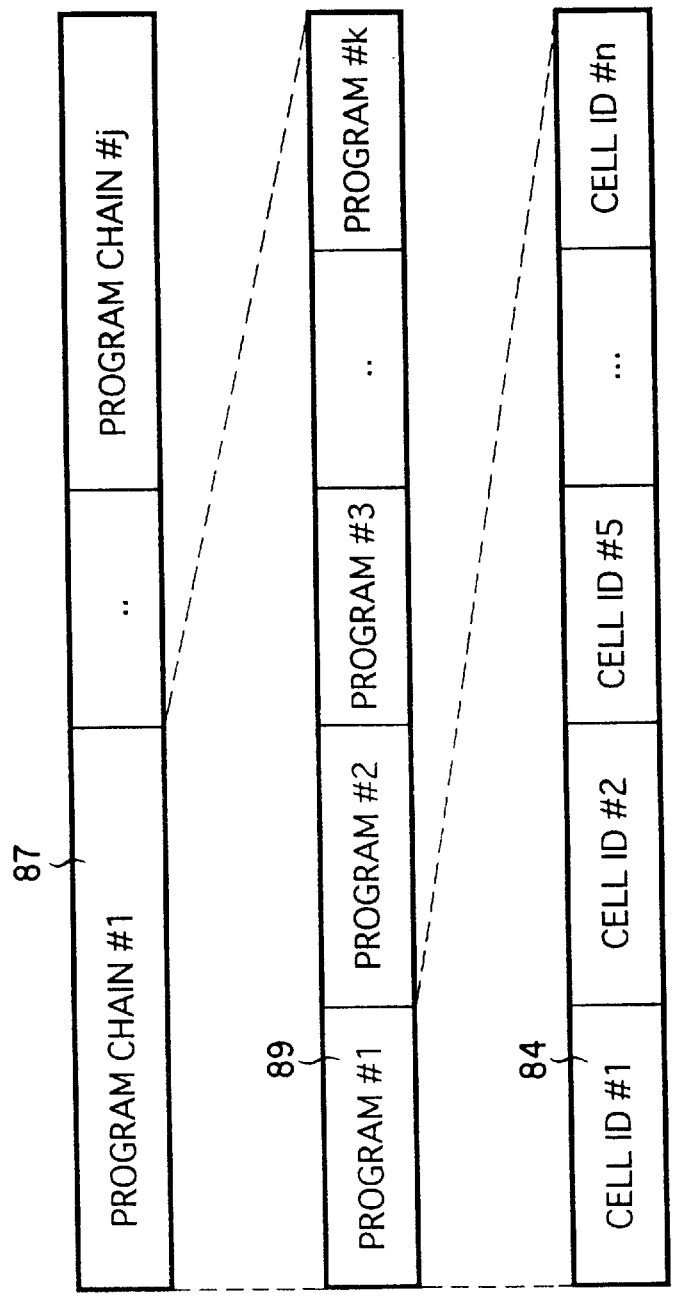
F I G. 7

| VMGI MAT | | (Description order) |
|---|---|---|
| | | Content |
| VMG_ID | | Video Manager Identifier |
| VMGI_SZ | | Size of Video Manager Information |
| VERN | | Version Number of DVD Video Specification |
| VMG_CAT | | Video Manager Category |
| VLMS_ID | | Volume Set Identifier |
| VTS_Ns | | Number of Video Title Set |
| PVR_ID | | Provider Unique ID |
| VMGM_VOBS_SA | | Video Manager Menu Video Object Set Start Address |
| VMGI_MAT_EA | | End Address of VMGI_MAT |
| TT_SRPT_SA | | Start Address of TT_SRPT |
| VTS_ATRT_SA | | Start Address of VTS_ATRT |
| VMGM_V_ATR | | Video Attribute of VMGM |
| VMGM_AST_Ns | | Number of Audio Stream of VMGM |
| VMGM_AST_ATR | | Audio Stream Attribute of VMGM |
| VMGM_SPST_Ns | | Number of Sub-picture Stream of VMGM |
| VMGM_SPST_ATR | | Sub-picture Stream Attribute of VMGM |

F I G. 8

TT_SRPT

| TT_SRPTI | (Description order) |
|---|---|
| | Content |
| EN_PGC_Ns | Number of Entry PGC |
| TT_SRPT_EA | End Address of TT_SRPT |

| TT_SRP | (Description order) |
|---|---|
| | Content |
| VTSN | Video Title Set Number |
| PGCN | Program Chain Number |
| VTS_SA | Start Address of Video Title Set |

| | (Description order) |
|---|---|
| VTSI_MAT | Content |
| VTS_ID | Video Title Set Identifier |
| VTS_SZ | Size of the VTS |
| VERN | Version Number of DVD_Video Specification |
| VTS_CAT | Video Title Set Category |
| VTSM_VOB_SA | Start Address of VTSM_VOBS |
| VTSTT_VOB_SA | Start Address of VTSTT_VOBS |
| VTI_MAT_EA | End Address of VTSI_MAT |
| VTS_DAPT_SA | Start Address of VTS_DAPT |
| VTS_PGCIT_SA | Start Address of VTS_PGCIT |
| VTS_PGCIT_UT_SA | Start Address of VTS_PGCIT_UT |
| VTS_MAPT_SA | Start Address of VTS_MAPT |
| VTS_V_ATR | Video Attribute |
| VTS_AST_Ns | Number of Audio Streams for VTS |
| VTS_AST_ATR | Audio Stream Attribute for VTS |
| VTS_SPST_Ns | Number of Sub-picture Streams for VTS |
| VTS_SPST_ATR | Sub-picture Stream Attribute for VTS |
| VTSM_AST_Ns | Number of Audio Streams for VTSM |
| VTSM_AST_ATR | Audio Stream Attribute for VTSM |
| VTS_SPST_Ns | Number of Sub-picture Streams for VTSM |
| VTS_SPST_ATR | Sub-picture Stream Attribute for VTSM |

FIG. 13

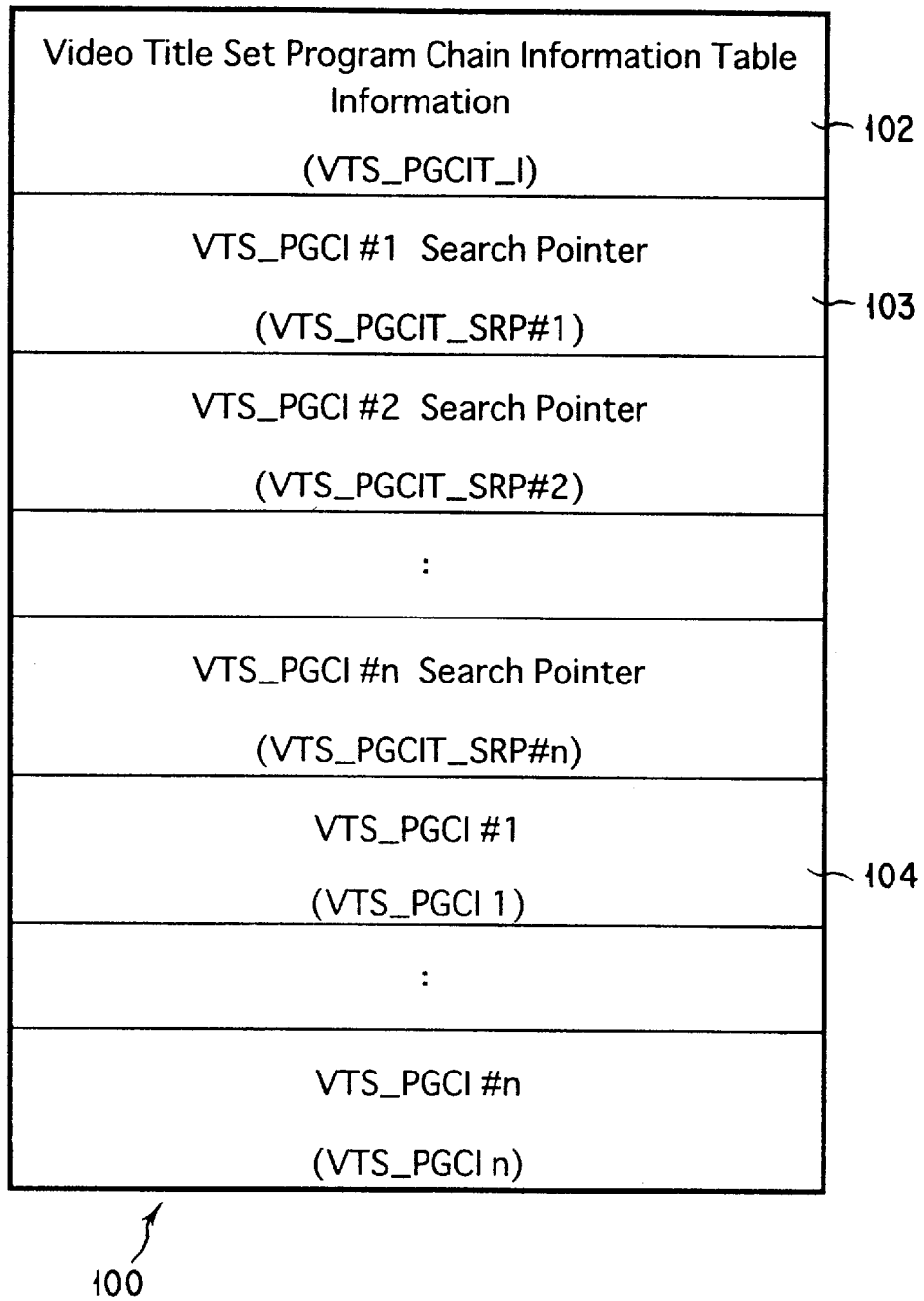
F I G. 14

VTS_PGCIT_I

| | (Description order) |
|---|---|
| | Content |
| VTS_PGC_Ns | Number of VTS_PGCs |
| VTS_PGCIT_EA | End Address of VTS_PGCCIT |

F I G. 15

VTS_PGCIT_SRP

| | (Description order) |
|---|---|
| | Content |
| VTS_PGC_CAT | Video Title Set PGC category |
| VTS_PGCI_SA | Start Address of VTS_PGC Information |

F I G. 16

VTS_PGCI

| Program Chain General Information (PGC_GI) (Mondatory) | ~105 |
| Program Chain Program Map (PGC_PGMAP) (Mandatory If VOB exists) | ~106 |
| Cell Playback Information Table (C_PBIT) (Mandatory If VOB exists) | ~107 |
| Cell Position Information Table (C_POSIT) (Mandatory If VOB exists) | ~108 |

~104

F I G. 17

PGCI_GI

| | (Description order) |
|---|---|
| | Content |
| PGCI_CAT | PGC Category |
| PGC_CNT | PGC Content |
| PGC_PB_TIME | PGC Playback Time |
| PGC_SPST_CTL | PGC-Sub-picutre Stream Control |
| PGC_AST_CTL | PGC Audio Stream Control |
| PGC_SP_PLT | PGC Sub-picture Palette |
| C_PBIT_SA | Start Address of C_PBIT |
| C_POSIT_SA | Start Address of C_POSIT |

F I G. 18

PGC_PGMAP

| Entry Cell Number for Program #1 |
|---|
| Entry Cell Number for Program #2 |
| : |
| Entry Cell Number for Program #n |

F I G. 19

Entry cell number

| | Content |
|---|---|
| ECELLN | Entry Cell Number |

F I G. 20

C_PBIT

| Cell Playback Information #1 (C_PBI1) |
|---|
| Cell Playback Information #2 (C_PBI2) |
| : |
| Cell Playback Information #n (C_PBIn) |

F I G. 21

| C_PBI | |
|---|---|
| | Content |
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
F I G. 22
C_POSI
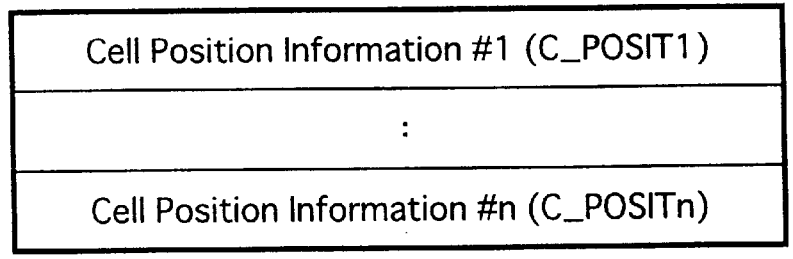
F I G. 23
| C_POSI | |
|---|---|
| | Content |
| C_VOB_IDN | VOB ID Number of Cell |
| C_IDN | Cell ID Number of the Cell |
F I G. 24

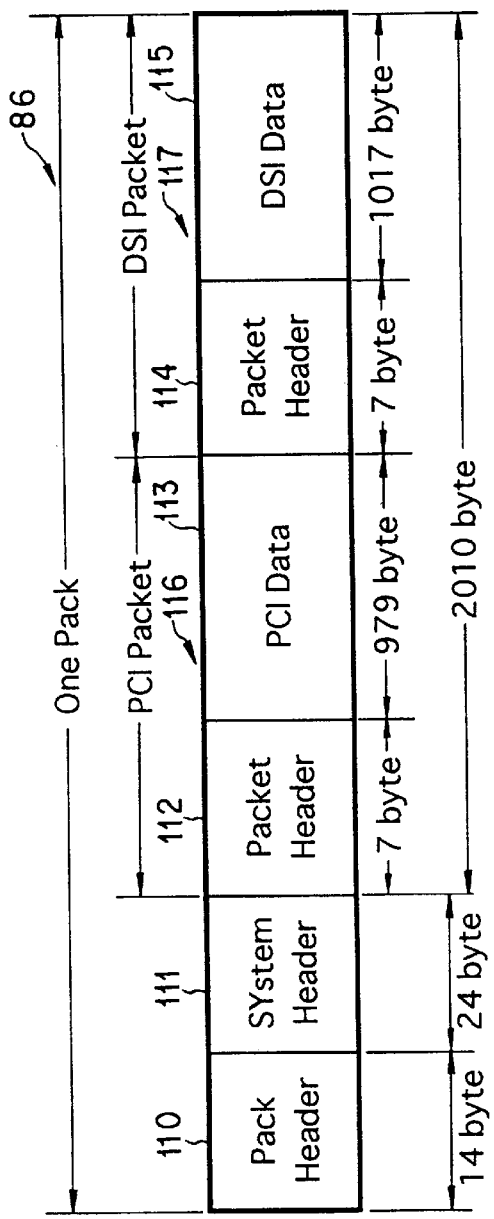
F I G. 25
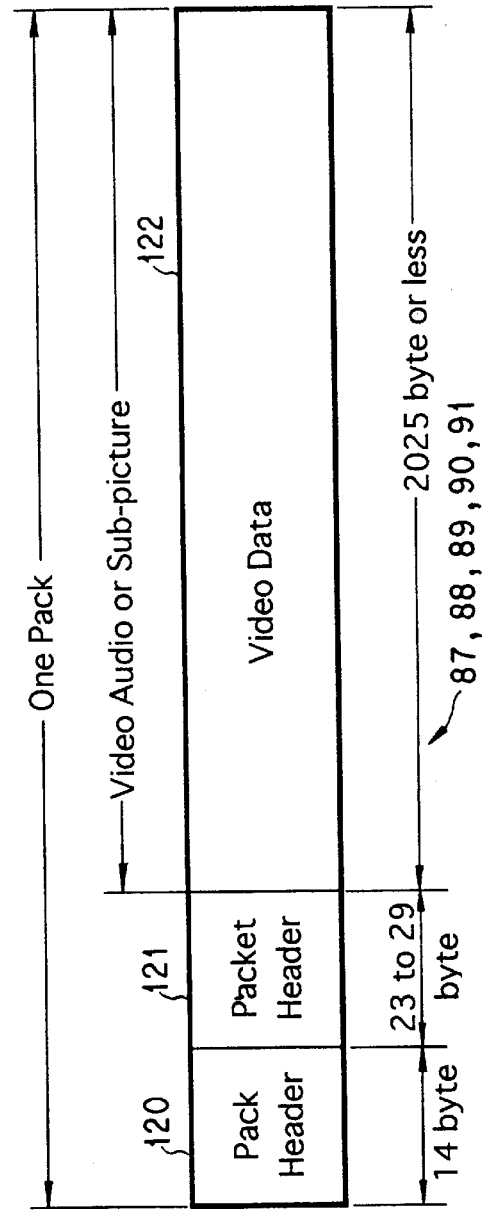
F I G. 26

| PCI | |
|---|---|
| | Content |
| PCI_GI | PCI General Information |
| NSLS_ANGLI | Angle Information |

F I G. 27

| PCI_GI | |
|---|---|
| | Content |
| NV_PCK_LBN | LBN of NV Pack |
| VOBU_CAT | Category of VOBU |
| VOBU_SPTS | Start PTS of VOBU |
| VOBU_EPTS | End PTS of VOBU |

F I G. 28

| NSLS_ANGLI | |
|---|---|
| | Content |
| NSLS_ANGC1_DSTA | Destination Address of Angle Cell Number 1 |
| NSLS_ANGC2_DSTA | Destination Address of Angle Cell Number 2 |
| NSLS_ANGC3_DSTA | Destination Address of Angle Cell Number 3 |
| NSLS_ANGC4_DSTA | Destination Address of Angle Cell Number 4 |
| NSLS_ANGC5_DSTA | Destination Address of Angle Cell Number 5 |
| NSLS_ANGC6_DSTA | Destination Address of Angle Cell Number 6 |
| NSLS_ANGC7_DSTA | Destination Address of Angle Cell Number 7 |
| NSLS_ANGC8_DSTA | Destination Address of Angle Cell Number 8 |
| NSLS_ANGC9_DSTA | Destination Address of Angle Cell Number 9 |

F I G. 29

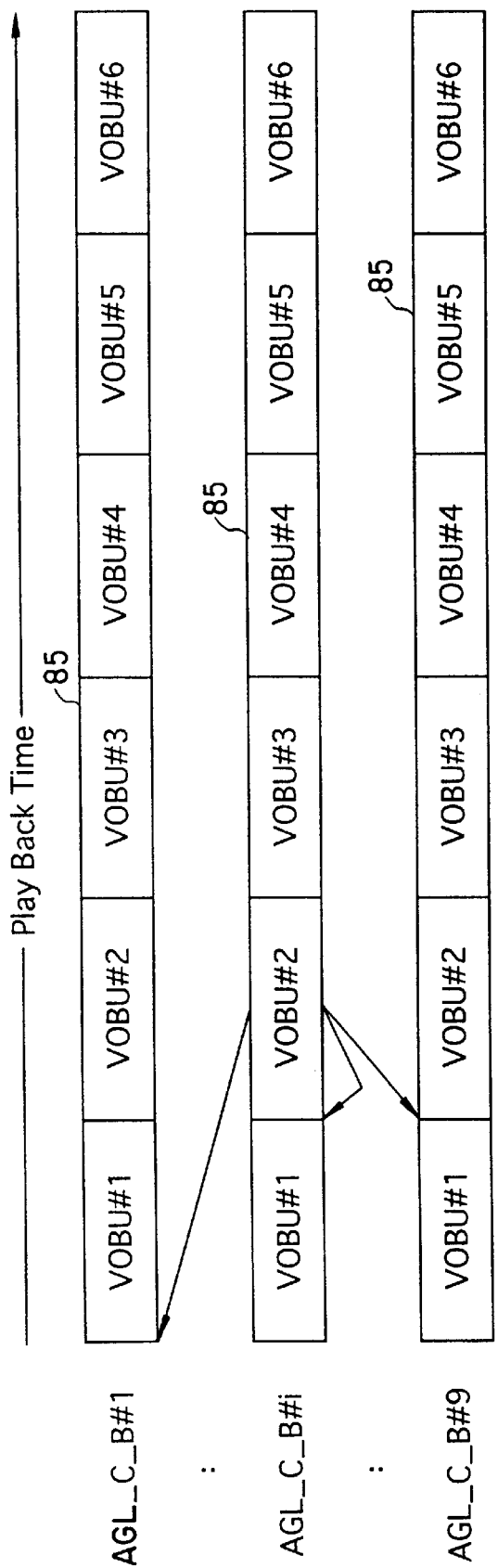
F I G. 30

| DSI | |
|---|---|
| | Content |
| DSI_GI | DSI General Information |
| SML_AGLI | Angle Information |
| VOBU_SI | VOB Search Information |
| SYNCI | Synchronus Playback Information |

F I G. 31

| DSI_GI | |
|---|---|
| | Content |
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOB ID Number |
| VOBU_C_IDN | Cell ID Number |

F I G. 32

| SML_AGLI | |
|---|---|
| | Content |
| SML_ANG1_DSTA | Destination Address of Angle Cell Number 1 |
| SML_ANG2_DSTA | Destination Address of Angle Cell Number 2 |
| SML_ANG3_DSTA | Destination Address of Angle Cell Number 3 |
| SML_ANG4_DSTA | Destination Address of Angle Cell Number 4 |
| SML_ANG5_DSTA | Destination Address of Angle Cell Number 5 |
| SML_ANG6_DSTA | Destination Address of Angle Cell Number 6 |
| SML_ANG7_DSTA | Destination Address of Angle Cell Number 7 |
| SML_ANG8_DSTA | Destination Address of Angle Cell Number 8 |
| SML_ANG9_DSTA | Destination Address of Angle Cell Number 9 |

F I G. 33

| SYNCI | |
|---|---|
| | Content |
| A_SYNCA 0 to 7 | Target Audio Pack Address |
| SP_SYNCA 0 to 31 | VOBU Start Address of Target SP pack |

F I G. 36

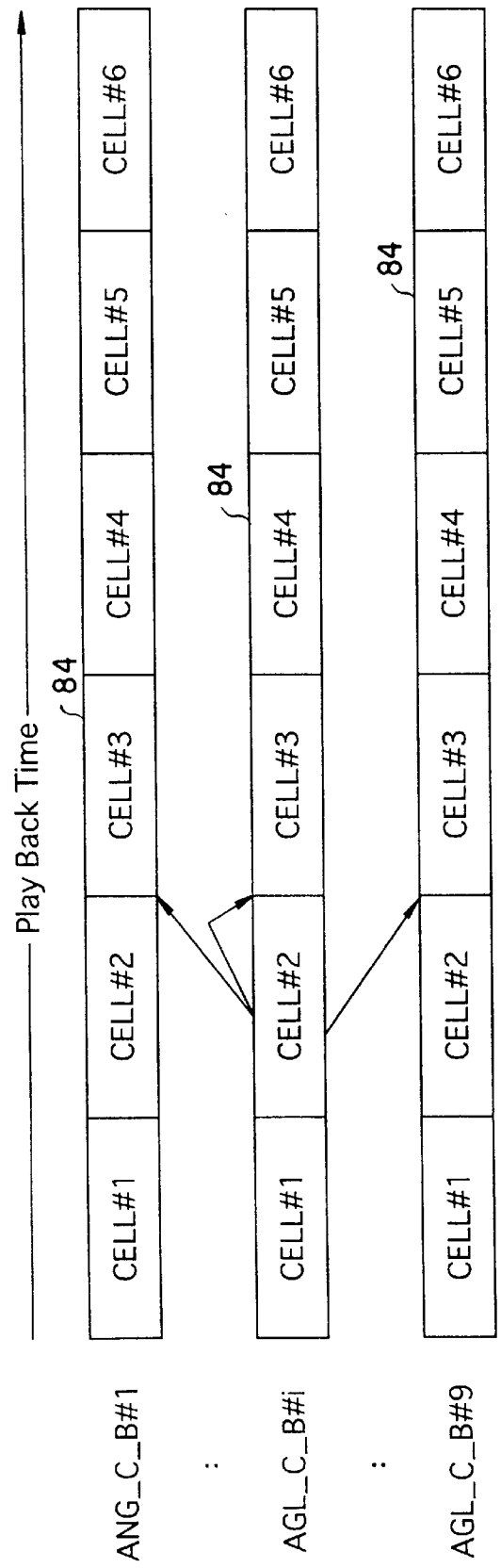
F I G. 34

| VOBU_SI | |
|---|---|
| | Content |
| FWDA240 | +240 VOBU Start Address |
| FWDA120 | +120 VOBU Start Address |
| FWDA60 | +60 VOBU Start Address |
| FWDA20 | +20 VOBU Start Address |
| FWDA15 | +15 VOBU Start Address |
| FWDA14 | +14 VOBU Start Address |
| FWDA13 | +13 VOBU Start Address |
| FWDA12 | +12 VOBU Start Address |
| FWDA11 | +11 VOBU Start Address |
| FWDA10 | +10 VOBU Start Address |
| FWDA9 | +9 VOBU Start Address |
| FWDA8 | +8 VOBU Start Address |
| FWDA7 | +7 VOBU Start Address |
| FWDA6 | +6 VOBU Start Address |
| FWDA5 | +5 VOBU Start Address |
| FWDA4 | +4 VOBU Start Address |
| FWDA3 | +3 VOBU Start Address |
| FWDA2 | +2 VOBU Start Address |
| FWDA1 | +1 VOBU Start Address |
| BWDA1 | -1 VOBU Start Address |
| BWDA2 | -2 VOBU Start Address |
| BWDA3 | -3 VOBU Start Address |
| BWDA4 | -4 VOBU Start Address |
| BWDA5 | -5 VOBU Start Address |
| BWDA6 | -6 VOBU Start Address |
| BWDA7 | -7 VOBU Start Address |
| BWDA8 | -8 VOBU Start Address |
| BWDA9 | -9 VOBU Start Address |
| BWDA10 | -10 VOBU Start Address |
| BWDA11 | -11 VOBU Start Address |
| BWDA12 | -12 VOBU Start Address |
| BWDA13 | -13 VOBU Start Address |
| BWDA14 | -14 VOBU Start Address |
| BWDA15 | -15 VOBU Start Address |
| BWDA20 | -20 VOBU Start Address |
| BWDA60 | -60 VOBU Start Address |
| BWDA120 | -120 VOBU Start Address |
| BWDA240 | -240 VOBU Start Address |

F I G. 35A

| b31 | b30 | b29 | b28 | b27 | b26 | b25 | b24 |
|---|---|---|---|---|---|---|---|
| V_FWD_Exist 1 | V_FWD_Exist 2 | A_FWDn[29...24] | | | | | |

| b23 | b24 | b25 | b26 | b27 | b28 | b29 | b30 |
|---|---|---|---|---|---|---|---|
| A-FWDn[23...16] | | | | | | | |

| b15 | b14 | b13 | b12 | b11 | b10 | b9 | b8 |
|---|---|---|---|---|---|---|---|
| A-FWDn[15...8] | | | | | | | |

| b7 | b6 | b5 | b4 | b3 | b2 | b1 | b0 |
|---|---|---|---|---|---|---|---|
| A-FWDn[7...0] | | | | | | | |

F I G. 35B

| b31 | b30 | b29 | b28 | b27 | b26 | b25 | b24 |
|---|---|---|---|---|---|---|---|
| V_BWD_Exist 1 | V_BWD_Exist 2 | A_BWDn[29...24] | | | | | |

| b23 | b24 | b25 | b26 | b27 | b28 | b29 | b30 |
|---|---|---|---|---|---|---|---|
| A-BWDn[23...16] | | | | | | | |

| b15 | b14 | b13 | b12 | b11 | b10 | b9 | b8 |
|---|---|---|---|---|---|---|---|
| A-BWDn[15...8] | | | | | | | |

| b7 | b6 | b5 | b4 | b3 | b2 | b1 | b0 |
|---|---|---|---|---|---|---|---|
| A-BWDn[7...0] | | | | | | | |

F I G. 35C

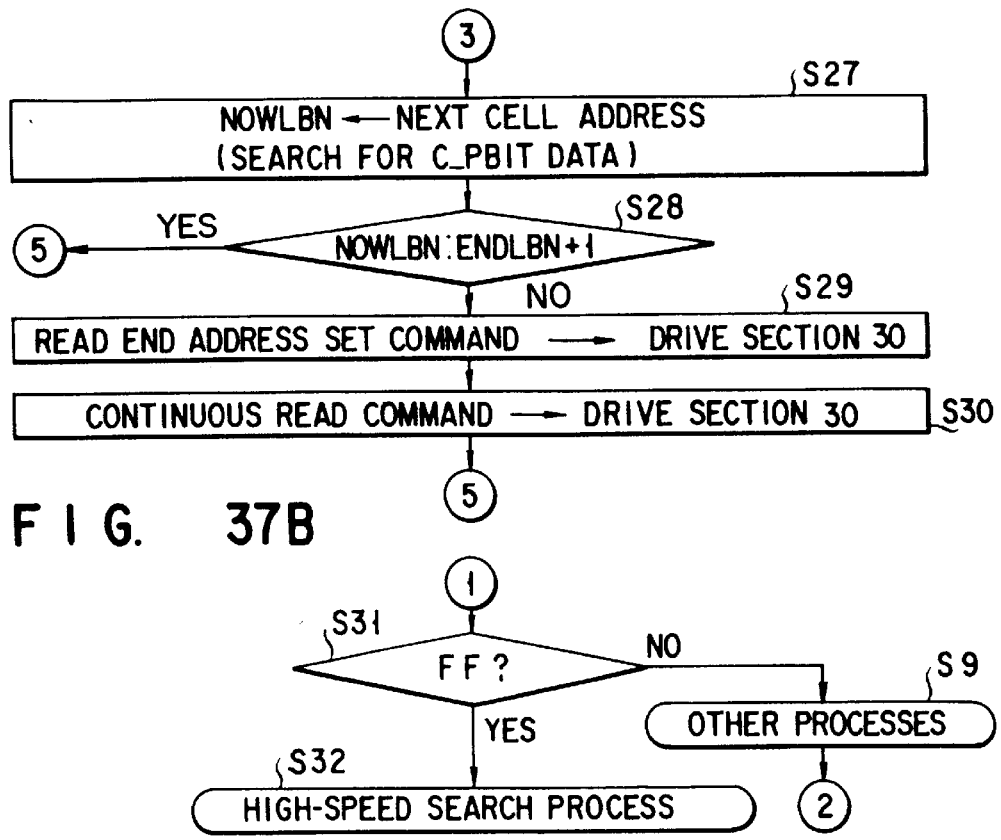
FIG. 37B
FIG. 39
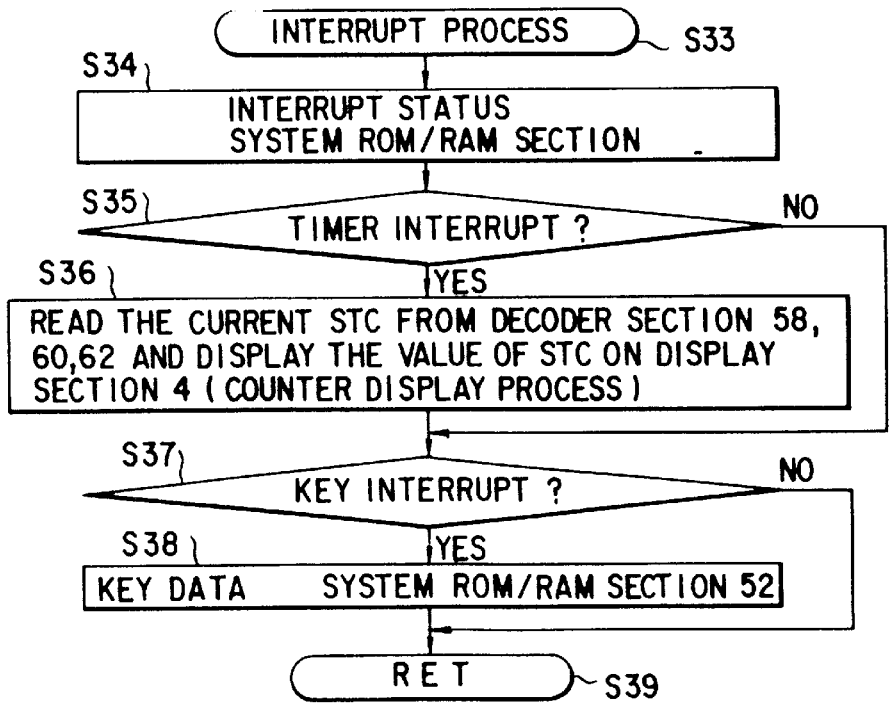
FIG. 41

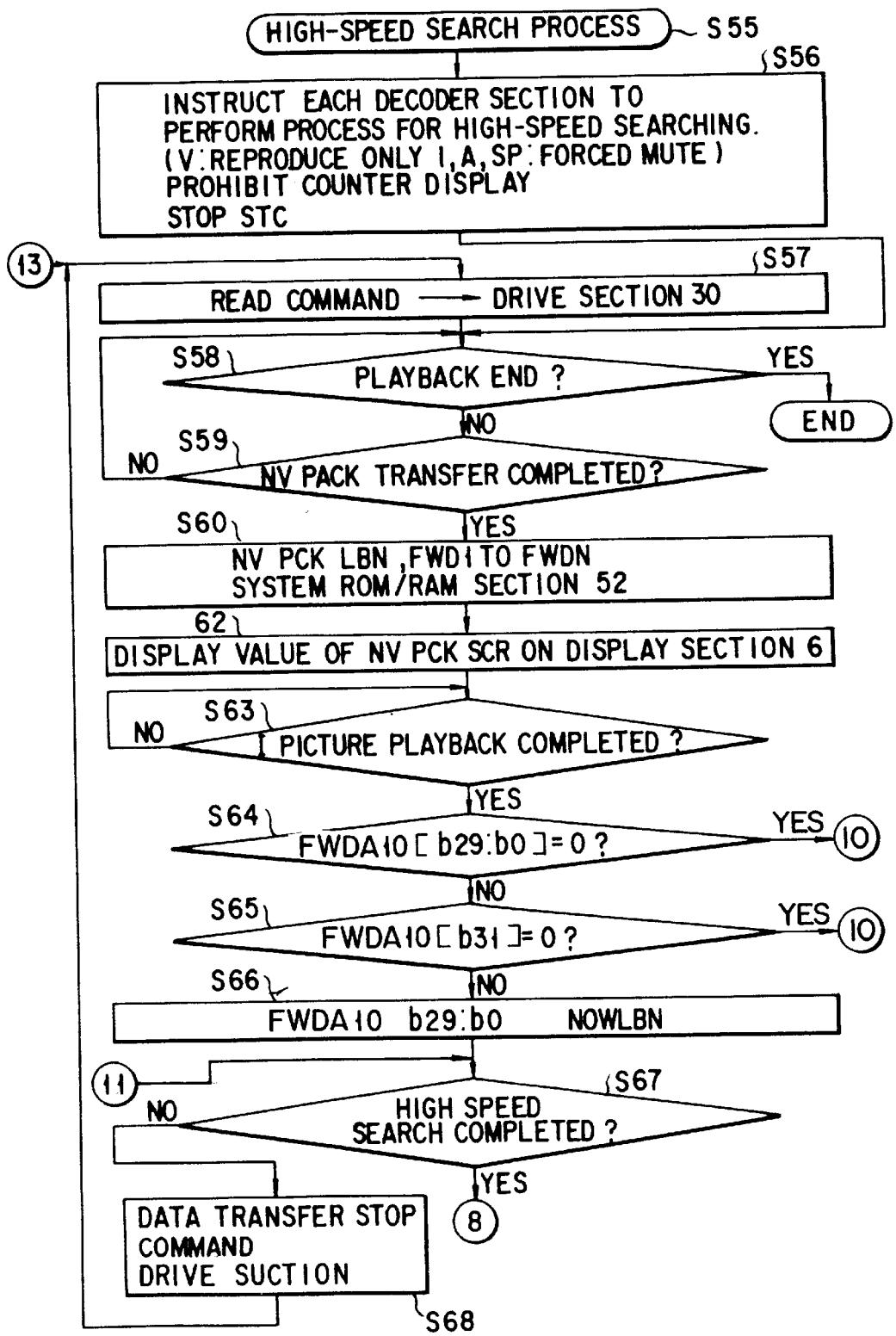
F I G. 42A

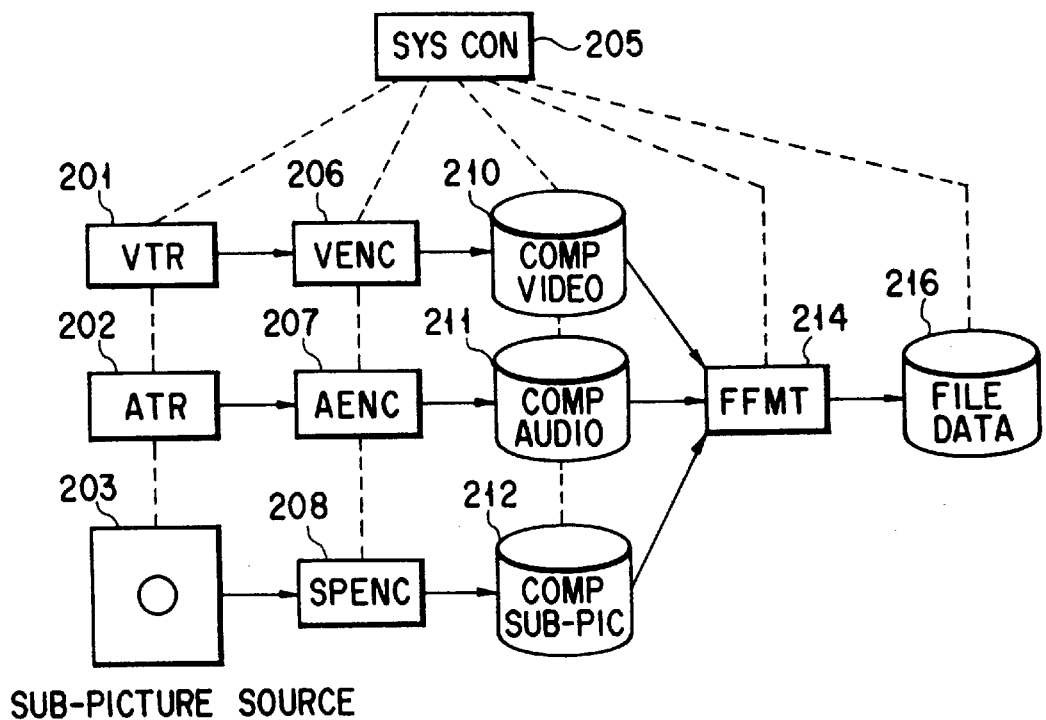
F I G. 45
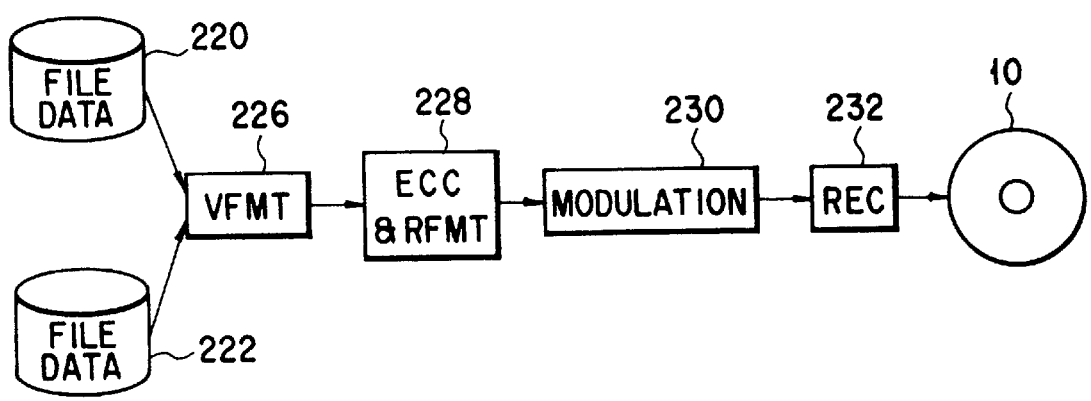
F I G. 48

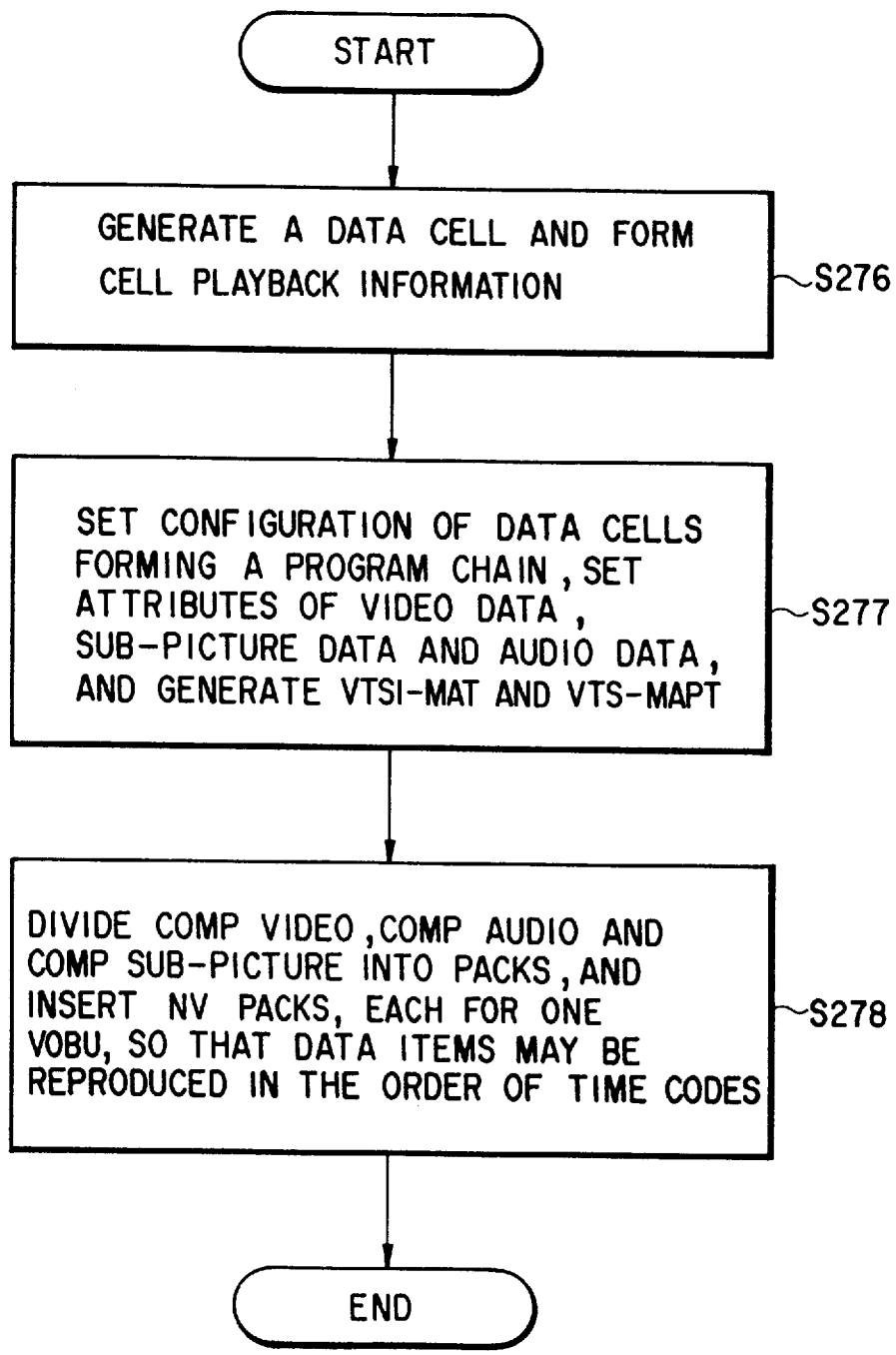
F I G. 47

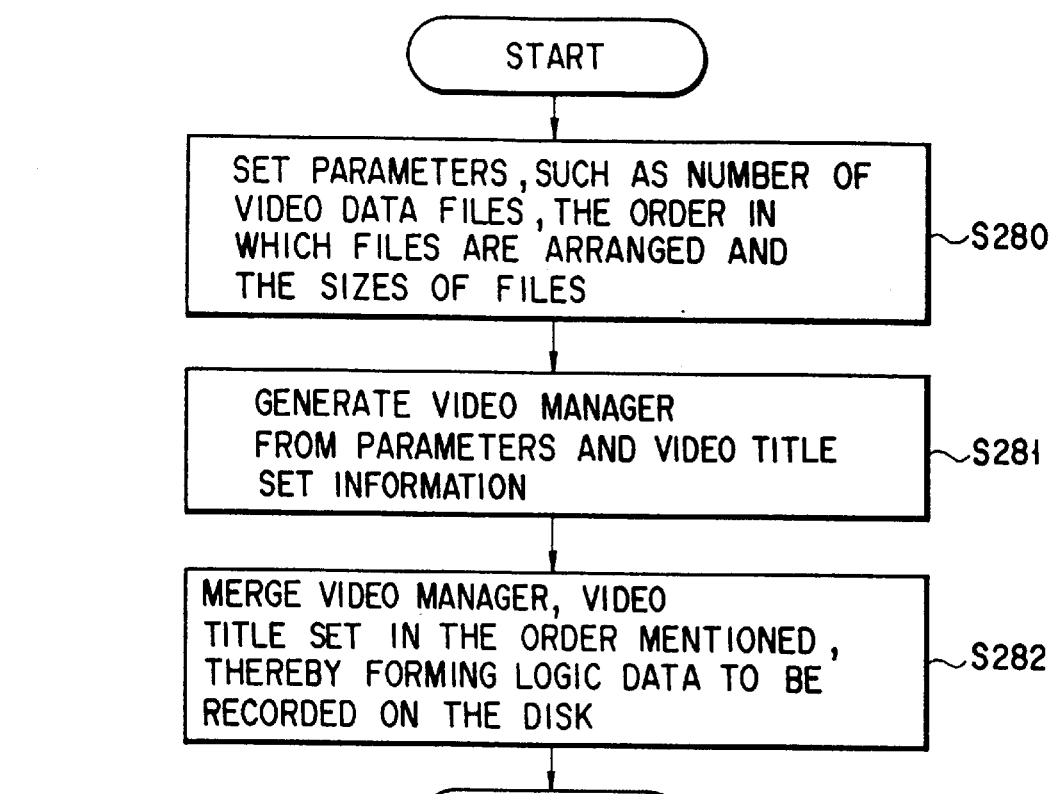
F I G. 49
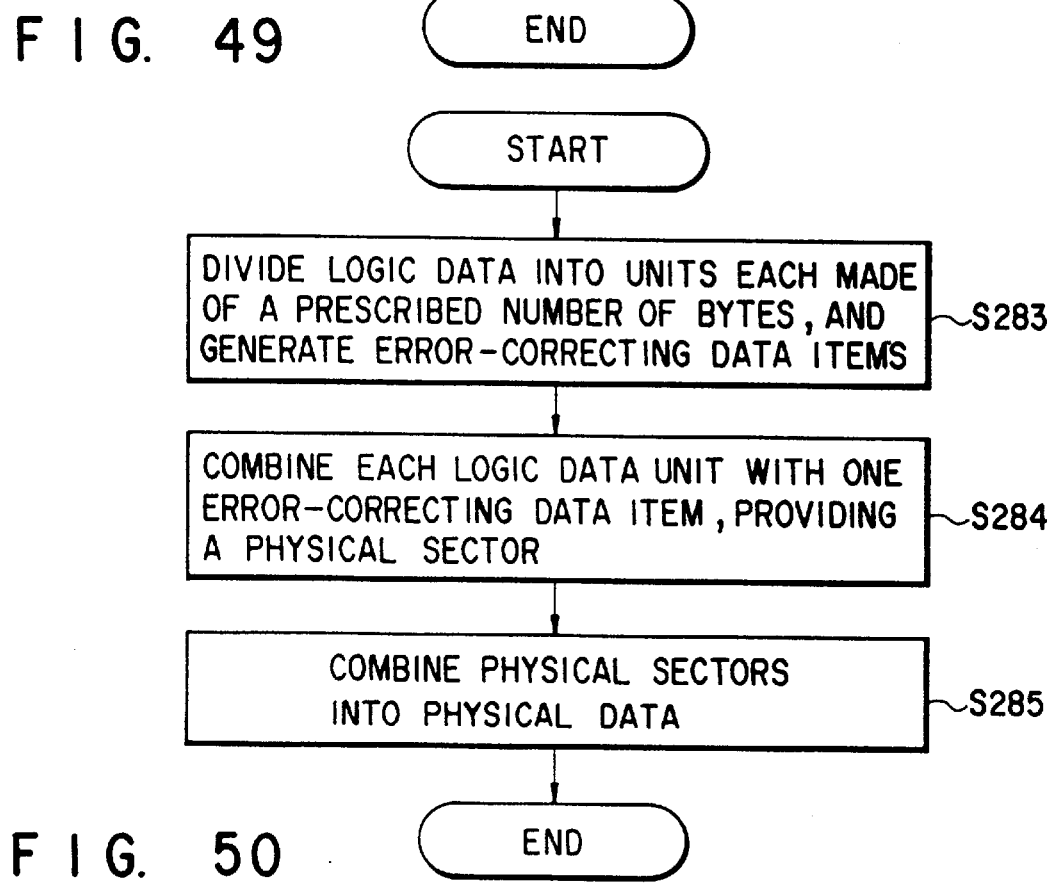
F I G. 50

RECORDING MEDIUM ON WHICH A DATA CONTAINING NAVIGATION DATA IS RECORDED, A METHOD AND APPARATUS FOR REPRODUCING A DATA ACCORDING TO NAVIGATION DATA, A METHOD AND APPARATUS FOR RECORDING A DATA CONTAINING NAVIGATION DATA ON A RECORDING

BACKGROUND OF THE INVENTION

1. Field of the Invention

This invention relates to a recording medium on which a data containing navigation data is recorded, a method and apparatus for reproducing a data according to the navigation data, a method and apparatus for recording a data containing navigation data on a recording medium, and a system for transferring data via a communication route on the basis of the navigation data.

2. Description of the Related Art

One well-known optical disk is a compact disk (CD). With such an optical disk, it is difficult to record and reproduce movie data due to the limited storage capacity of the CD and the long running time of the movie. To overcome this shortcoming, an optical disk enabling high-density recording of movie data is being investigated and developed.

Recently, a data compression method for moving pictures has been standardized internationally to be the MPEG (Moving Picture Image Coding Expert Group) scheme. The MPEG scheme is known as a method of variably compressing the video data. Furthermore, the MPEG2 scheme has been proposed and is being standardized internationally. With this movement, a system format complying with the MPEG2 scheme has been determined to be of an MPEG2 system layer. For the MPEG2 system layer, the transfer start time and playback time expressed using a reference time for each data item are set so that moving pictures, sound, and their data items can be transferred and reproduced in synchronization with each other.

Using only the information on the transfer start time and playback start time, however, makes it difficult to achieve a special playback, such as fast-forward or rewind playback, or a playback process that provides the system with interactive capabilities.

SUMMARY OF THE INVENTION

An object of the present invention is to provide a recording medium on which a data stream containing navigation data capable of special playback, such as fast-forward or rewind playback, is recorded.

Another object of the present invention is to provide a method and apparatus for reproducing data from a recording medium according to the navigation data from the recording medium on which data including navigation data used to navigate and capable of special playback, such as fast-forward or rewind playback, is recorded.

Still another object of the present invention is to provide a method and apparatus for recording data, including navigation data for special playback, such as fast-forward or rewind playback.

Still another object of the present invention is to provide a communication system that transfers navigation data for special playback, such as fast-forward or rewind playback, together with playback data, via a communication route.

According to the present invention, there is provided a recording medium with navigation data, comprising:

a plurality of data units defining playback objects time-sequentially and each to be reproduced within a specific period of time, each data unit being composed of a plurality of data pack trains obtained by compressing playback data containing at least any one of audio data, video data, and sub-picture data into packets and a navigation pack placed at the head of the data pack trains and storing playback information on the data packs and navigation information indicating the relationship with other data units, the playback data being reproduced on the basis of the navigation information.

According to the present invention, there is also provided a method of reproducing playback data containing navigation data, comprising the steps of:

receiving playback data comprising a plurality of data units defining playback objects time-sequentially and each to be reproduced within a specific period of time, each data unit being composed of a plurality of data pack trains obtained by compressing playback data containing at least any one of audio data, video data, and sub-picture data into packets and a navigation pack placed at the head of the data pack trains and storing playback information on the data packs and navigation information indicating the relationship with other data units;

converting the data unit into a playback signal with reference to the navigation information in the playback data; and reproducing the playback signal.

Further, according to the present invention, there is provided an apparatus for reproducing playback data containing navigation data, comprising:

means for retrieving from a recording medium playback data comprising a plurality of data units defining playback objects time-sequentially and each to be reproduced within a specific period of time, each data unit being composed of a plurality of data pack trains obtained by compressing playback data containing at least any one of audio data, video data, and sub-picture data into packets and a navigation pack placed at the head of the data pack trains and storing playback information on the data packs and navigation information indicating the relationship with other data units; and means for converting the data unit into a playback signal with reference to the navigation information in the retrieved playback data and reproducing a playback signal.

Further, according to the present invention, there is also provided a method of recording playback data containing navigation data on a recording medium, comprising the steps of:

preparing a plurality of data packs obtained by compressing playback data containing at least any one of audio data, video data, and sub-picture data into packets;

preparing a plurality of data units, each of which is composed of data pack trains each to be reproduced within a specific period of time and at the head of each of which, and a navigation pack storing playback information on the data pack and navigation information indicating the relationship with other data units; and recording the data units time-sequentially on a recording medium so that the data units can be reproduced.

Furthermore, according to the present invention, there is provided an apparatus for recording on a recording medium playback data containing navigation data, comprising:

means for generating a plurality of data packs obtained by compressing playback data containing at least any one of audio data, video data, and sub-picture data into packets;

means for preparing a plurality of data units, each of which is composed of data pack trains each to be reproduced within a specific period of time and at the head of each of which there is provided a navigation pack storing playback information on the data pack and navigation information indicating the relationship with other data units; and means for recording the data units time-sequentially on the recording medium so that the data units can be reproduced.

Furthermore, according to the present invention, there is provided a communication system for transferring playback data containing navigation data, comprising:

means for creating playback data comprising a plurality of data units defining playback objects time-sequentially and each to be reproduced within a specific period of time, each data unit being composed of a plurality of data pack trains obtained by compressing playback data containing at least any one of audio data, video data, and sub-picture data into packets and a navigation pack placed at the head of the data pack trains and storing playback information on the data packs and navigation information indicating the relationship with other data units;

means for transferring the data units;

means for converting the data unit into a playback signal with reference to the navigation information in the playback data; and means for reproducing the playback signal.

Still further, according to the present invention, there is provided a recording medium with navigation data comprising:

a plurality of data cells whose playback sequence can be specified and which consecutively define playback objects time-sequentially, each data cell being composed of a plurality of data units each to be reproduced within a specific period of time, each data unit being made up of a plurality of data pack trains obtained by compressing playback data containing at least any one of audio data, video data, and sup-picture data into packets and a navigation pack placed at the head of the data pack trains and storing first playback information on the data packs; and a table in which second playback information on the playback of each data cell is written.

Still further, according to the present invention, there is also provided an apparatus for reproducing data from a recording medium with navigation data, comprising:

means for receiving playback information from the recording medium containing a plurality of data cells whose playback sequence can be specified and which consecutively define playback objects time-sequentially, each data cell being composed of a plurality of data units each to be reproduced within a specific period of time, each data unit being made up of a plurality of data pack trains obtained by compressing playback data containing at least any one of audio data, video data, and sup-picture data into packets and a navigation pack placed at the head of the data pack trains and storing first playback information on the data packs, and a table in which second playback information on the playback of each data cell is written, and storing the second playback information;

means for converting the data cells into playback signals; and means for transferring the data cells to converting means with reference to the stored playback information.

Still furthermore, according to the present invention, there is provided a method of recording playback data containing navigation data on a recording medium, comprising the steps of:

preparing a plurality of data packs obtained by compressing playback data containing at least any one of audio data, video data, and sub-picture data into packets and a navigation pack placed at the head of the data pack trains and storing first playback information on the data packs;

preparing a plurality of data units, each of which is composed of data pack trains each to be reproduced within a certain period of time;

collecting the plurality of data units so that they may be reproduced time-sequentially and creating a plurality of data cells whose playback sequence can be specified;

creating a table in which second playback information on the playback of each data cell is written; and recording on the recording medium the plurality of data cells immediately after the table.

Still furthermore, according to the present invention, there is also provided an apparatus for recording playback data containing navigation data on a recording medium, comprising:

means for creating a plurality of data packs obtained by compressing playback data containing at least any one of audio data, video data, and sub-picture data into packets;

means for preparing a plurality of data units, each of which is composed of data pack trains each to be reproduced within a certain period of time, and a navigation pack placed at the head of the data pack trains and storing first playback information on the data packs;

means for collecting the plurality of data units so that they may be reproduced time-sequentially and creating a plurality of data cells whose playback sequence can be specified;

means for creating a table in which second playback information on the playback of each data cell is written; and means for recording the plurality of data cells immediately after the table.

Yet furthermore, according to the present invention, there is provided a communication system for transferring playback data containing navigation data, comprising:

means for creating a plurality of data cells whose playback sequence can be specified and which consecutively define playback objects time-sequentially, each data cell being composed of a plurality of data units to be reproduced within a specific period of time, each data unit being made up of a plurality of data pack trains obtained by compressing playback data containing at least any one of audio data, video data, and sup-picture data into packets, and a navigation pack placed at the head of the data pack trains and storing first playback information on the data packs and a table in which second playback information on the playback of each data cell is written; and means for transferring table and with reference to the table, transferring the data units in which the navigation pack is emerged at first.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 shows the structure of the video manager of FIG. 4;

FIG. 6 shows an example of the structure of the video object set (VOBS) shown in FIG. 5;

FIG. 7 is a diagram to help explain the structure of the video object unit of FIG. 6;

FIG. 8 shows the parameters and contents of the volume manger information management table (VMGI_MAT) in the video manager (VMGI) of FIG. 5;

FIG. 13 shows the parameters and contents of the video title set information management table (VTSI_MAT) of the video title set information (VTSI) of FIG. 12;

FIG. 14 illustrates the structure of the video title set program chain information table (VTS_PGCIT) of the video title set information (VTSI) of FIG. 12;

FIG. 15 shows the parameters and contents of the information (VTS_PGCITI) in the video title set program chain information table (VTS_PGCIT) of FIG. 14;

FIG. 16 shows the parameters and contents of the search pointer (VTS_PGCIT_SRP) corresponding to the program chain in the video title set program chain information table (VTS_PGCIT) of FIG. 14;

FIG. 17 illustrates the structure of the program chain information (VTS_PGCI) in the video set corresponding to the program chain in the video title set program chain information table (VTS_PGCIT) of FIG. 14;

FIG. 18 shows the parameters and contents of the program chain general information (PGC_GI) in the program chain information (VTS_PGCI) of FIG. 17;

FIG. 19 illustrates the structure of a program chain map (PGC_PGMAP) of the program chain information (VTS_PGCI) of FIG. 17;

FIG. 20 shows the parameters and contents of the entry cell numbers (ECELLN) corresponding to the programs written in the program chain map (PGC_PGMAP) of FIG. 19;

FIG. 21 illustrates the structure of the cell playback information table (C_PBIT) of the program chain information (VTS_PGCI) of FIG. 17;

FIG. 22 shows the parameters and contents of the cell playback information table (C_PBIT) of FIG. 21;

FIG. 23 illustrates the structure of the cell position information (C_POSI) in the program chain information (VTS_PGCI) of FIG. 18;

FIG. 24 shows the parameters and contents of the cell position information (C_POSI) of FIG. 23;

FIG. 25 illustrates the structure of the navigation pack of FIG. 23;

FIG. 26 illustrates the structure of the video, audio, sub-picture, or VBI pack of FIG. 6;

FIG. 27 shows the parameters and contents of the playback control information (PCI) in the navigation pack of FIG. 26;

FIG. 28 shows the parameters and contents of the general information (PCI_GI) in the playback control information (PCI) of FIG. 27;

FIG. 29 shows the parameters and contents of the angle information (NSLS_ANGLI) in the playback control information (PCI) of FIG. 27;

FIG. 30 is a diagram to help explain how to change the angle using the angle information (NSLS_ANGLI) in the playback control information (PCI) of FIG. 29;

FIG. 31 shows the parameters and contents of the disk search information (DSI) in the navigation pack of FIG. 26;

FIG. 32 shows the parameters and contents of the DSI general information (DSI_GI) in the disk search information of FIG. 31;

FIG. 33 shows the parameters and contents of the angle information (SML_SI) in the disk search information of FIG. 31;

FIG. 34 is a diagram to help explain how to change the angle using the angle information (SML_SI) in the disk search information (DSI) of FIG. 33;

FIG. 35A shows the parameters and contents of the search information (VOP_SI) for the video object (VOB) of FIG. 31;

FIGS. 35B and 35C illustrate bit maps describing the forward addresses of the search information (VOB_SI) on the video object (VOB) of FIG. 31;

FIG. 36 shows the parameters and contents of the synchronizing playback information (SYNCI) on the video object (VOB) of FIG. 31;

FIGS. 37A and 37B, FIG. 38, and FIG. 39 are flowcharts of the procedure for reproducing the video data in the normal mode from an optical disk having logic formats shown in FIGS. 4 to 36;

FIG. 41 is a flowchart of the procedure for an interrupt process during playback of the video data from an optical disk having logic formats shown in FIGS. 4 to 36;

FIGS. 42A to 42F are flowcharts of the procedure for an example of a high-speed search process of the video data on an optical disk having logic formats shown in FIGS. 4 to 36;

FIG. 45 is a block diagram of an encoder system that encodes the video data and generates a video file;

FIG. 47 is a flowchart for combining the main video data, audio data, and sup-picture data all encoded according to the flow of FIG. 46 to create a video data file;

FIG. 48 is a block diagram of a disk formatter system that records the formatted video files on an optical disk;

FIG. 49 is a flowchart for creating logic data to be recorded on a disk in the disk formatter of FIG. 48;

FIG. 50 is a flowchart for creating from the logic data the physical data to be recorded on a disk.

DETAILED DESCRIPTION OF THE PREFERRED EMBODIMENTS

Hereinafter, referring to the accompanying drawings, an optical disk reproducing apparatus according to an embodiment of the present invention will be explained.

Figure 1:
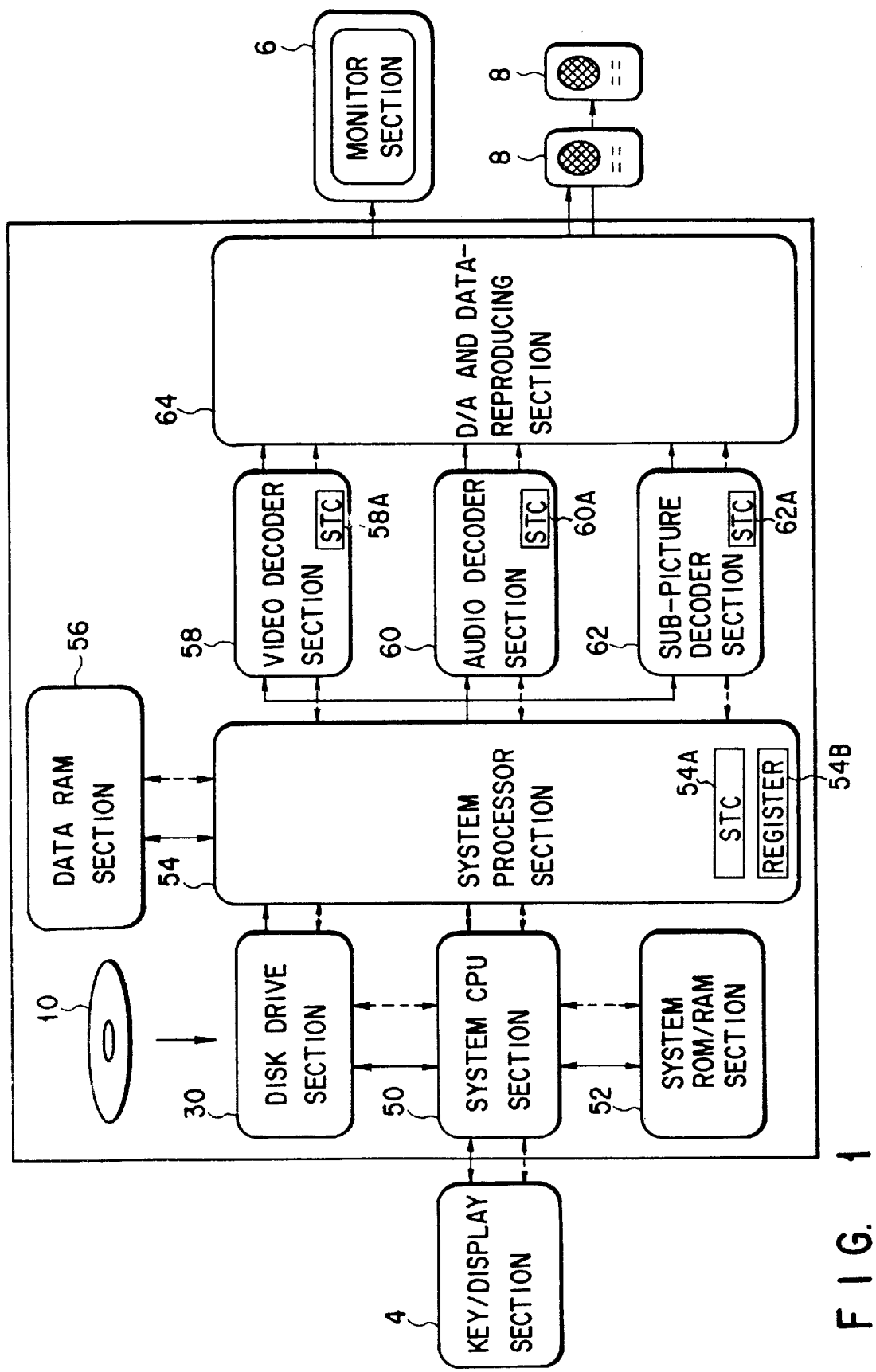
FIG. 1 is a schematic block diagram of an optical disk apparatus according to an embodiment of the present invention.
Figure 2:
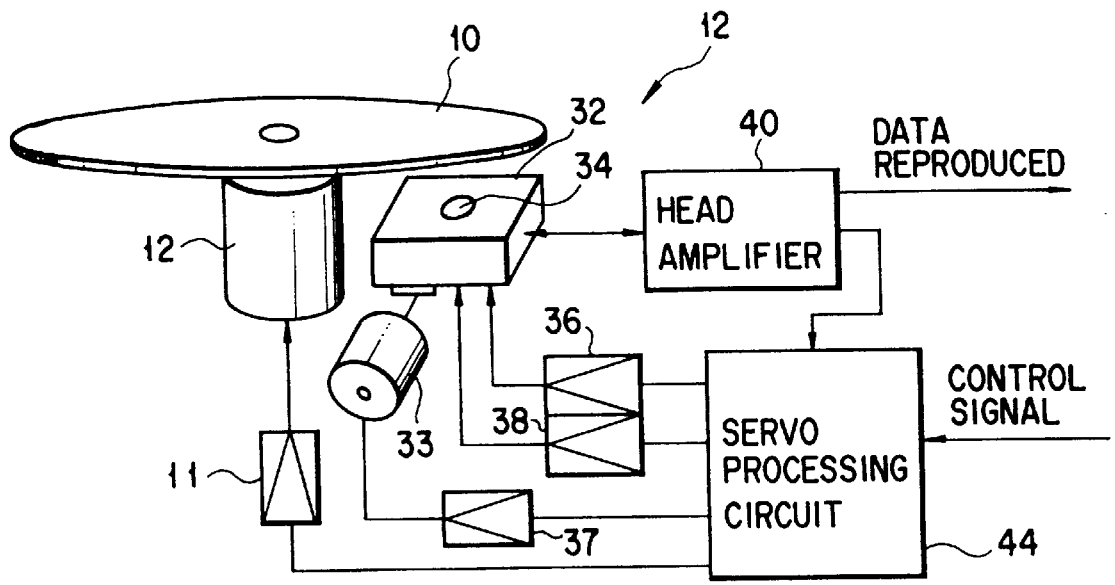
FIG. 2 is a detailed block diagram of the mechanical section of the disk drive unit of FIG. 1.
Figure 3:
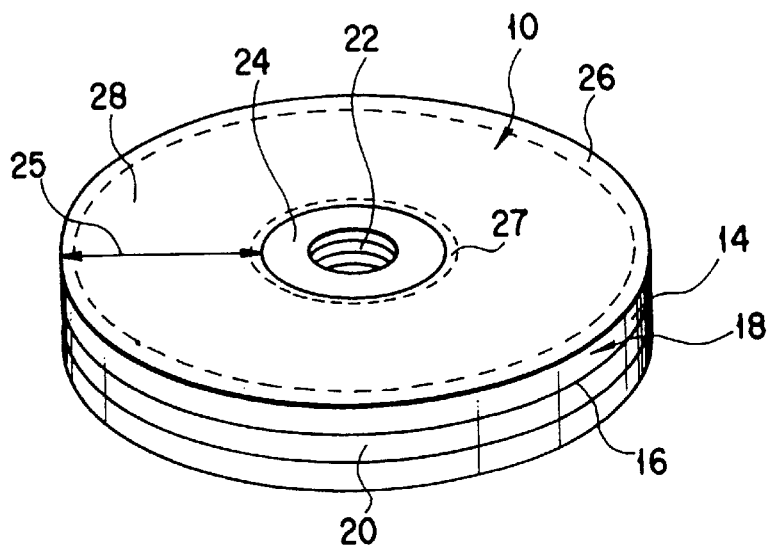
FIG. 3 is a schematic perspective view of the structure of an optical disk loaded in the disk drive unit of FIG. 1.

FIG. 1 is a block diagram of an optical disk reproducing apparatus that reproduces the data from an optical disk associated with an embodiment of the present invention. FIG. 2 is a block diagram of the disk drive section that drives the optical disk shown in FIG. 1. FIG. 3 shows the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the recorded data to be reproduced from an optical disk 10. The recorded data contains video data, sub-picture data, and audio data, which are converted into video signals and audio signals. The monitor section 6 displays images according to the audio signals and the speaker section 8 generates sound according to the audio signals.

It is known that the optical disk 10 is available with various structures. For instance, one type of the optical disk 10 is a read-only disk on which data is recorded with a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues to be clamped at the clamping areas 24.

As shown in FIG. 3, the optical disk 10 has an information zone 25 around the clamping zone 24 on each side, the information zones allowing the information to be recorded on the optical disk 10. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is the actual data recording area, in which management data, main video data, sub-picture data, and audio data are recorded in the form of pits (that is, in the form of changes in the physical state) as explained later. With the read-only optical disk 10, a train of pits is previously formed in the transparent substrate 14 by a stamper, a reflecting layer is formed by evaporation on the surface of the transparent substrate 14 in which the pit train is formed, and the reflecting layer serves as the recording layer 16. In the read-only optical disk 10, a groove is normally not provided as a track and the pit train in the surface of the transparent substrate 14 serves as a track.

The optical disk apparatus shown in FIG. 1, further comprises a disk drive section 30, a system CPU section 50, a system ROM/RAM section 52, a system processor section 54, a data RAM section 60, a video decoder 58, an audio decoder section 60, a sub-picture decoder section 62, and a D/A and data reproducing section 64. The system processor section 54 is provided with a system time clock (STC) 54A and a register 54B. The video decoder section 58, audio decoder section 60, and sub-picture decoder section 62 are also provided with system time clocks (STC) 58A, 60A, 62A, respectively.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and is rotated by the spindle motor 12. The optical head 32 that projects a laser beam on the optical disk 10 is located under the optical disk 10. The optical head 32 is placed on a guide mechanism (not shown). The feed motor driving circuit 37 is provided to supply a driving signal to the feed motor 33. The motor 33 is driven by the driving signal and moves in and out the optical head 32 across the radius of the optical disk 10. The optical head 32 is provided with an object lens 34 positioned so as to face the optical disk 10. The object lens 34 is moved according to the driving signal supplied from the focus circuit 36 so as to move along its optical axis.

To reproduce the data from the above optical disk, the optical head 32 projects a laser beam on the optical disk 10 via the object lens 34. The object lens 34 is moved little by little across the radius of the optical disk 10 according to the driving signal supplied from the tracking circuit 38. Furthermore, the object lens 34 is moved along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal and supplies these signals to the focus circuit 36, tracking circuit 38, and motor driving circuit 11, respectively.

Therefore, as the object lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to track at, for example, a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to move across the radius of the optical disk 10. Then, the optical head 32 accesses a specific sector formed at the recording layer 16 of the optical disk 10. The data is reproduced from the specific sector by the optical head 32, which then supplies it to the head amplifier 40. The head amplifier 40 amplifies the reproduced data, which is outputted at the disk drive section 30.

The reproduced data is transferred and stored in a data RAM section 56 by the system processor section 54, which is controlled by the system CPU section 50 operated in accordance with the programs stored in the system ROM/RAM section 52. The stored reproduced data is processed in the system processor section 54, which sorts the data into video data, audio data, and sub-picture data, are supplied to the video decoder section 58, audio decoder section 60, and sub-picture decoder section 62, respectively, and are decoded at the respective decoders. The D/A and data-reproducing section 64 converts the decoded video data, audio data, and sub-picture data into an analog video signal, an analog audio signal, and an analog sub-picture signal, subjects these signal to a mixing process, and supplies the resulting video signal and sub-picture signal to the monitor 6 and the resulting audio signal to the speaker 8. Then, on the basis of the video signal and sup-picture signal, image are displayed on the monitor section 6 and according to the audio signal, sound is simultaneously reproduced at the speaker section 8.

The detailed operation of the optical disk apparatus of FIG. 1 will be described later with reference to the logic format of the optical disk explained below.

Figure 4:
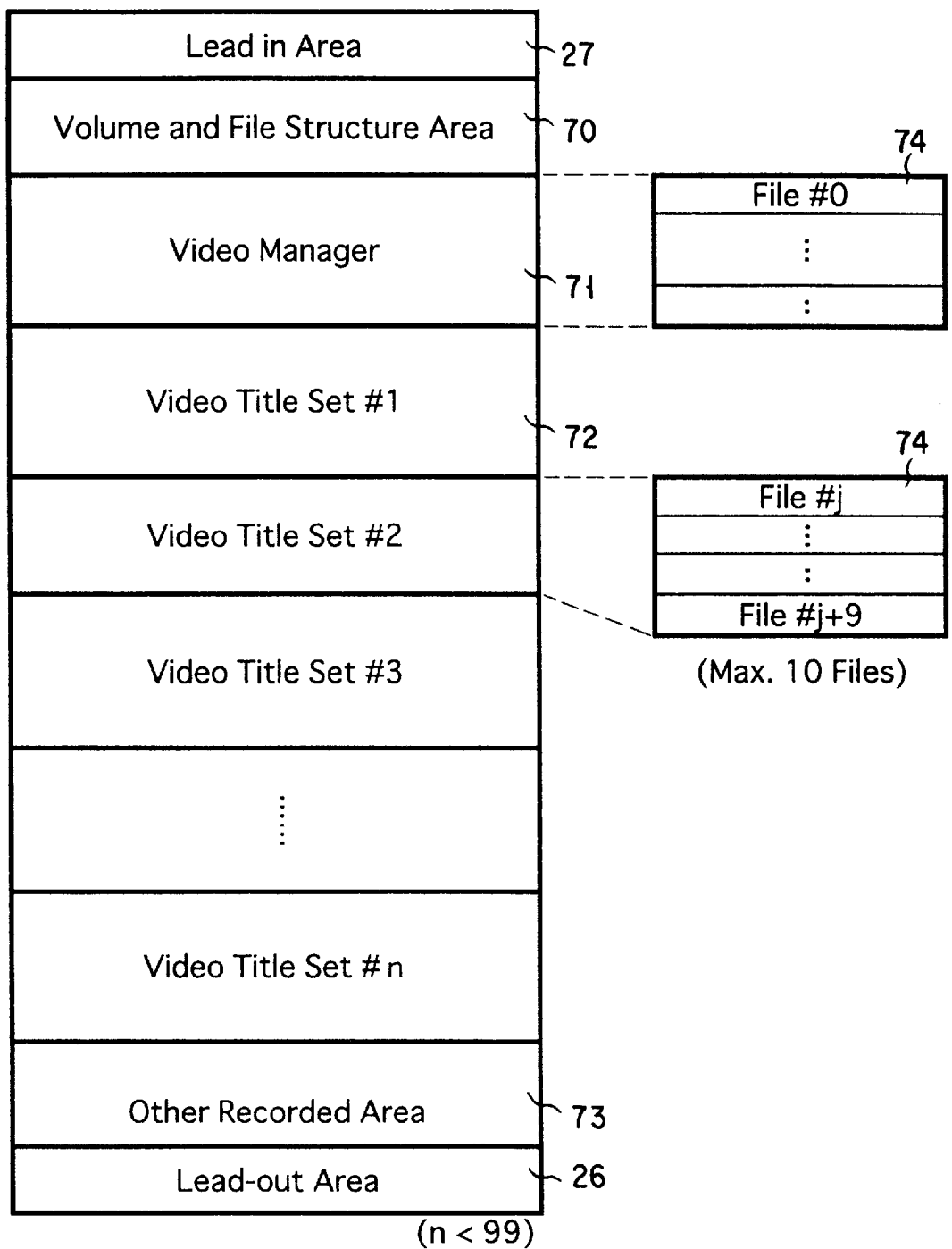
FIG. 4 shows the structure of the logic format of the optical disk of FIG. 3.

The data recording area 28 between the lead-in area 27 and the lead-out area 26 on the optical disk of FIG. 1 has a volume and file structure as shown in FIG. 4. The structure has been determined in conformity to specific logic format standards, such as Micro UDF or ISO 9660. The data recording area 28 is physically divided into a plurality of sectors as described earlier. These physical sectors are assigned serial numbers. In the following explanation, a logical address means a logical sector number (LSN) as determined in Micro UDF or ISO 9660. Like a physical sector, a logical sector contains 2048 bytes. The numbers (LSN) of logical sectors are assigned consecutively in ascending order as the physical sector number increments.

As shown in FIG. 4, the volume and file structure is a hierarchic structure and contains a volume and file structure area 70, a video manager 71, at least one video title set #i 72, and another recorded area 73. These areas 70, 71, 72, 73 are aligned with the boundaries between logical sectors. As with a conventional CD, a logical sector is defined as a set of 2048 bytes. Accordingly, one logical sector corresponds to one logical block.

The volume and file structure area 70 corresponds to a management area determined in Micro UDF or ISO 9660. According to the description in the management area, the video manager 71 is stored in the system ROM/RAM section 52. As explained with reference to FIG. 5, the information used to manage video title sets 72 is written in the video manager 71, which is composed of a plurality of files, starting with file #0. In each video title set 72, compressed video data, compressed audio data, compressed sub-picture data, and the reproducing information about these data items are stored as explained later. Each video title set is composed of a plurality of files 74. The number of video title sets 72 is limited to a maximum of 99. Furthermore, the number of files 74 (from file #j to file #j+9) constituting each video title set 72 is determined to be a maximum of 10. These files 72 are also aligned with the boundaries between logical sectors.

In the other recorded area 73, the information capable of utilizing the aforementioned video title sets 72 is recorded. The other recorded areas 73 are not necessarily provided.

As shown in FIG. 5, the video manager 71 contains at least three items each corresponding to individual files 74. Specifically, the video manager 71 is made up of volume manager information (VMGI) 75, a video object set for the video manager menu (VMGM_VOBS) 76, and a backup of video manager information (VMGI_BUP) 77. Here, the volume manager information (VMGI) 75 and the backup of the video manager information (VMGI_BUP) 77 are determined to be indispensable items, and the video object set for video manager menu (VMGM_VOBS) 76 is determined to be an optional item. In the video object set 76 for the video manager menu (VMGM), the video data, audio data, and sup-picture data about a menu of the volumes of the optical disk managed by the video manager 71 are stored.

By the video object set 76 for the VMGM (VMGM_VOBS), the volume name of the optical disk 10, the sound accompanying the volume name representation, and the description of the sub-picture are displayed and at the same time, selectable items are provided in the form of sub-pictures as in video reproduction explained later. For example, the video object set 76 for the VMGM (VMGM_VOBS) indicates that the optical disk 10 contains the video data representing the matches a boxer played until he won a world championship. Specifically, a fighting pose of boxer X, together with a volume name, such as the glorious history of boxer X, is reproduced in the form of video data and at the same time, his theme song is reproduced in sound, and his chronological table is provided in a sub-picture. Furthermore, the user is asked which language option to select, English or Japanese, in doing the narration of the matches. At the same time, the user is asked whether a caption in another language should be provided in a sub-picture or which language option should be selected for a caption. Thus, for example, the VMGM video object set 76 (VMGM_VOBS) provides the user with preparations to watch a video of a match of boxer X in English speech with a sub-picture using Japanese captions.

The structure of a video object set (VOBS) 82 will be described with reference to FIG. 6. FIG. 6 shows an example of a video object set (VOBS) 82. The video object set (VOBS) 82 comes in three types for two menus and a title. Specifically, the video object set (VOBS) 82 contains the video title set for the video manager menu (VMGM_VOBS) 76, a video object set (VTSM_VOBS) 95 for a menu in the video title sets 72 and a video object set (VTSTT_VOBS) 96 for the titles of at least one video title set 72 in a video title set (VTS) 72 as explained later. Each video object set 82 has the same structure except that their uses differ.

As shown in FIG. 6, a video object set (VOBS) 82 is defined as a set of one or more video objects (VOB) 83. The video objects 83 in a video object set (VOBS) 82 is used for the same application. A video object set (VOBS) 82 for menus is usually made up of one video object (VOB) 83 and stores the data used to display a plurality of menu screens. In contrast, a video object set (VTSTT_VOBS) 82 for title sets is usually composed of a plurality of video objects (VOB) 83.

When the aforesaid video of a boxing match is taken as example, a video object (VOB) 83 corresponds to the video data of each match played by boxer X. Specifying a particular video object (VOB) 83 enables, for example, boxer X's eleventh match for a world championship to be reproduced on a video. The video object set (VTSM_VOBS) 95 for a menu of the video title sets 72 contains the menu data for the matches played by boxer X. According to the presentation of the menu, a particular match, for example, boxer X's eleventh match for a world championship, can be specified. In the case of a typical single story movie, one video object (VOB) 83 corresponds to one video object set (VOBS) 82. One video stream is completed with one video object set (VOBS) 82. In the case of a collection of animated cartoons or an omnibus movie, a plurality of video streams, each corresponding to individual stories, are provided in a single video object set (VOBS) 82. Each video stream is stored in the corresponding video object 83. Accordingly, the audio stream and sub-picture stream related to the video stream are also completed with each video object (VOB) 83.

An identification number (IDN#j) is assigned to a video object (VOB) 83. By the identification number (ID#j), the video object (VOB) 83 can be identified. A video object (VOB) 83 further comprises one or more such cells 84. Although a usual video stream is made up of a plurality of cells 84, a menu video stream, or a video object (VOB) 83 may be composed of one cell 84. A cell 84 is likewise assigned an identification number (C_IDN#j). By the identification number (C_IDN#j), the cell 84 is identified. At the time of the change of the angle explained later, the angle is changed by specifying the cell number.

Here, angle means to change an angle at which an object is viewed in the field of the films. In an example of a boxing match, angle means that the same knockout scene can be seen from different angles: e.g., a scene viewed from the champion, a scene viewed from the challenger, or a scene viewed from the judge. An angle may be selected by the user as he or she wishes, or the same scene may be repeated while the angle is being changed automatically as the story advances. Furthermore, the angle may be changed after the beginning of the same scene has been reached: e.g., the scene is changed the moment that the boxer dealt the opponent a counter and then a scene where the counter is dealt again is played. The angle may also be changed at the scene following the current scene: e.g., the angle is changed the moment that the boxer has dealt the opponent a counter. To achieve any angle change, a navigation pack explained in detail later is provided in a video object unit (VOBU) 85.

As shown in FIG. 6, each cell 84 is composed of one or more video object units (VOBU) 85, normally a plurality of video object units (VOBU) 85. Here, a video object unit (VOBU) 85 is defined as a pack train having a navigation pack (NAV pack) 86 at its head. Specifically, a video object unit (VOBU) 85 is defined as a set of all the packs recorded, starting at a navigation pack (NAV pack) 86 to immediately in front of the next navigation pack. The reproducing time of the video object unit (VOBU) 85 corresponds to the reproducing time of the video data made up of one or more GOP (Group of Pictures) contained in the video object unit (VOBU) 85 as shown in FIG. 7. The maximum reproducing time is determined to be 0.4 or more second and less than one second. In MPEG, one GOP is defined as compressed image data which corresponds to about 15 frames to be played back for, usually, 0.5 seconds.

In the case where the video data includes a video object unit as illustrated in FIG. 6, GOPs each composed of a video pack (V pack) 88, a sub-picture pack (SP pack) 90 and an audio pack (A pack) 91, all complying to the MPEG standards, are arranged, producing a vide data stream. Regardless of the number of GOPs, a video object (VOBU) 83 is determined based on the time required for producing a GOP. The video object (VOBU) 83 has a navigation pack (NAV) pack 86 arranged at its head. Any reproduced data, whether audio data, sub-picture data, or audio/sub-picture data, consists of one more video object units. Thus, even if a video object unit is composed of only audio packs only, these audio packs will be reproduced within the time for reproducing the video object unit. The procedure of reproducing these packs will be explained later in detail, along with the procedure of reproducing the navigation pack (NAV pack) 86.

The procedure for reproducing these packs, together with the navigation pack, will be explained in detail later.

The video manager 71 will be explained with reference to FIG. 5. The volume management information 75 placed at the head of the video manager 71 contains the information used to search for titles and the information used to manage the video title sets (VTS) 72 such as the information used for reproduction of a video manager menu. The volume management information 75 contains at least three tables 78, 79, 80 in the order shown in FIG. 5. Each of these tables 78, 79, 80 is aligned with the boundaries between logical sectors. A first table 78, a volume manger information management table (VMGI_MAT) 78 is a mandatory table, in which the size of the video manager 71, the starting address of each piece of the information in the video manger 71, and the attribute information about the video object set (VMGM_VOBS) 76 for a video manager menu are written.

Written in a second table of the video manager 71, a title search pointer table 79 (TT_SRPT), is an entry program chain (EPGC) of the video titles (VTS) 72 contained in the optical disk 10 that are selectable according to the entry of a title number from the key/display section 4 on the apparatus.

A program chain 87 is a set of programs 89 that reproduce the story of a title as shown in FIG. 7. Continuous reproduction of a program chain 87 completes the movie of a title. Therefore, the user can start to see the movie from a particular scene of the movie by specifying the program 89.

In a third table of the video manager 71, a video title set attribution table (VTS_ATRT) 80, the attribute information determined in the video title set 72 in the volume of the optical disk 10 is written. Specifically, in this table 72, the following items are written as attribute information: the number of video title sets, video title set numbers, video attributes, such as a video data compression scheme, audio stream attributes, such as an audio coding mode, and sub-picture attributes, such as the type of sub-picture display.

The contents of the volume manager information management table (VMGI_MAT) 78 and the title search pointer table (TT_SRPT) 79 will be explained in detail with reference to FIGS. 8, 9, 10, and 11.

As shown in FIG. 8, written in the volume manager information management table (VMGI_MAT) 78 are a video manager identifier (VMG_ID), the size of video manager information (VMGI_SZ) in logical blocks (one logical block contains 2048 bytes as mentioned above), the version number (VERN) of the optical disk 10 complying with the digital versatile disk (DVD) video specification, and the category of video manager 71 (VMG_CAT).

In the category of video manager 71 (VMG_CAT), a flag indicating whether or not the DVD video directory prohibits copying is written. Further written in the table (VMGI_MAT) are a volume set identifier (VLMS_ID), the number of video title sets (VTS_Ns), the identifier for a person supplying the data to be recorded on the disk (Provider Unique ID: PVR_ID), a video manager menu video object set start address (VNGM_VOBS_SA), the end address (VMGI_MAT_EA) of a volume manager information management table (VMGI_MAT) 78, and the start address (TT_SRPT_SA) of a title search pointer table (TT_SRPT) 79. The end address of VMG_MAT 78 (VMGI_MAT_EA) and the start address of TT_SRPT (TT_SRPT_SA) 79 are represented by the number of logical blocks, relative to the first logical block.

Furthermore, in the table 78, the start address (VTS_ATRT_SA) of the attribute table (VTS_ATRT) 80 of video title sets (VTS) 72 is represented by the number of bytes, relative to the first byte in the VMGI manager table (VMGI_MAT) 71, and the video attribute (VMGM_V_AST) of the video manager menu (VMGM) is written. Further written in the table 78 are the number of audio streams (VMGM_AST_Ns) in the video manager menu (VMGM), the attributes of audio streams (VMGM_AST_ATR) in the video manager menu (VMGM), the number of sub-picture streams (VMGM_SPST_Ns) in the video manager menu (VMGM), and the attributes of sub-picture streams (VMGM_SPST_ATR) in the video manager menu (VMGM).

Figures 9, 10, 11:
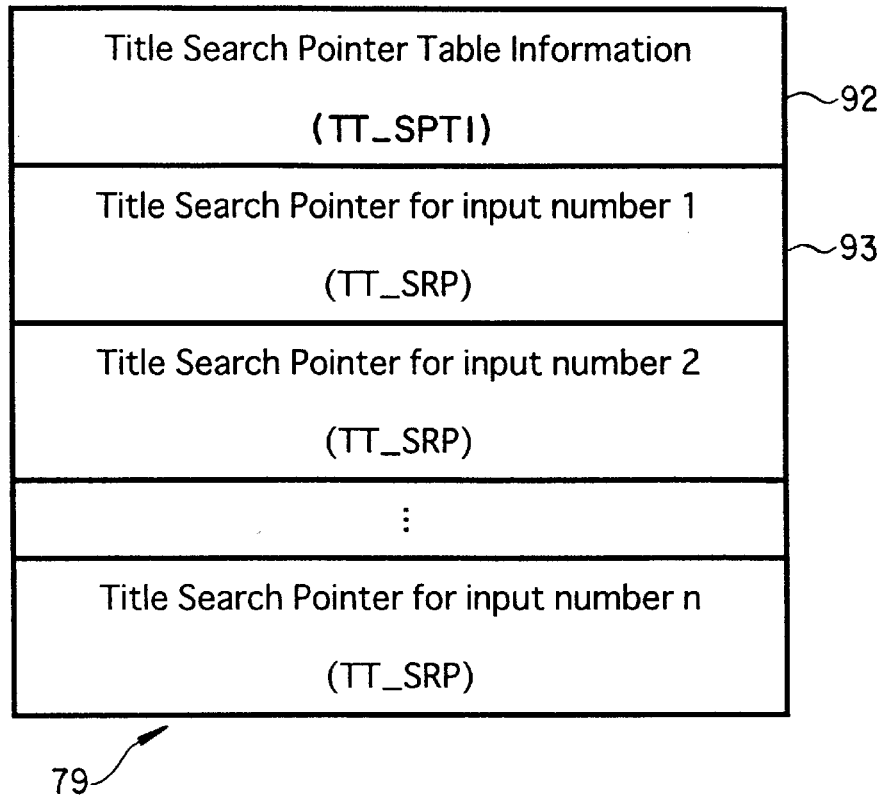
FIG. 9 shows the structure of the title search pointer table (TSPT) in the video manager (VMGI) of FIG. 5.
FIG. 10 shows the parameters and contents of the title search pointer table information (TSPTI) in the title search pointer table (TSPT) of FIG. 9.
FIG. 11 shows the parameters and contents of the title search pointer (TT_SRP) corresponding to the input number in the title search pointer table (TSPT) of FIG. 9.

In the title search pointer table (TT_SRPT) 79, as shown in FIG. 9, the title search pointer table information (TSPTI) is first written and then as many title search pointers for input numbers 1 to n (n≦99) as are needed are written consecutively. When only the reproducing data for one title, for example, only the video data for one title is stored in the volume of the optical disk and only one title search pointer (TT_SRP) 93 is written in the table (TT_SRPT) 79.

The title search pointer table information (TSPTI) contains the number of entry program chains (EN_PGC_Ns) and the end address (TT_SRPT_EA) of the title search pointer 93. The address (TT_SRPT_EA) is represented by the number of bytes, relative to the first byte in the title search pointer table (TT_SRPT) 79. Furthermore, as shown in FIG. 11, each title search pointer (TT_SRP) 93 contains the video title set number (VTSN), the program chain number (PGCN), and the start address (VTS_SA) of the video title set 72. The contents of the title search pointer (TT_SRP) 93 specifies a video title set 72 to be reproduced and a program chain (PGC) 87 as well as a location in which the video title set 72 is to be stored. The start address (VTS_SA) of the video title set 72 is represented by the number of logical blocks in connection with the title set 72 specified by the video title set number (VTSN).

The structure of the logic format of the video title set 72 shown in FIG. 4 will be described with reference to FIG. 12. In each video title set (VTS) 72, four items are written in the order shown in FIG. 12. Each video title set (VTS) 72 is made up of one or more video titles having common attributes. The video title set information (VTSI) 94 contains the management information on the video titles, including the information on entry search points, the information on playback of video object sets 72, the information on playback of title set menus (VTSM), and the attribute information on video object sets 72.

Each video title set 72 is provided with a backup of the video title set information (VTSI_BUP) 97. Between the video title set information (VTSI) and the backup of the information (VTSI_BUP) 97, a video object set for video title set menus (VTSM_VOBS) 95 and a video object set for video title set titles (VTSTT_VOBS) 96 are arranged. Both of the video object sets (VTSM_VOBS and VTSTT_VOBS) 95, 96 have the structure shown in FIG. 6, as explained earlier.

The video title set information (VTSI) 94, the backup of the information (VTSI_BUP) 97, and the video object set (VTSTT_VOBS) 96 for video title set titles are items indispensable to the video title set 72. The video object set (VTSM_VOBS) 96 for video title set menus is an option provided as the need arises.

Figure 12:
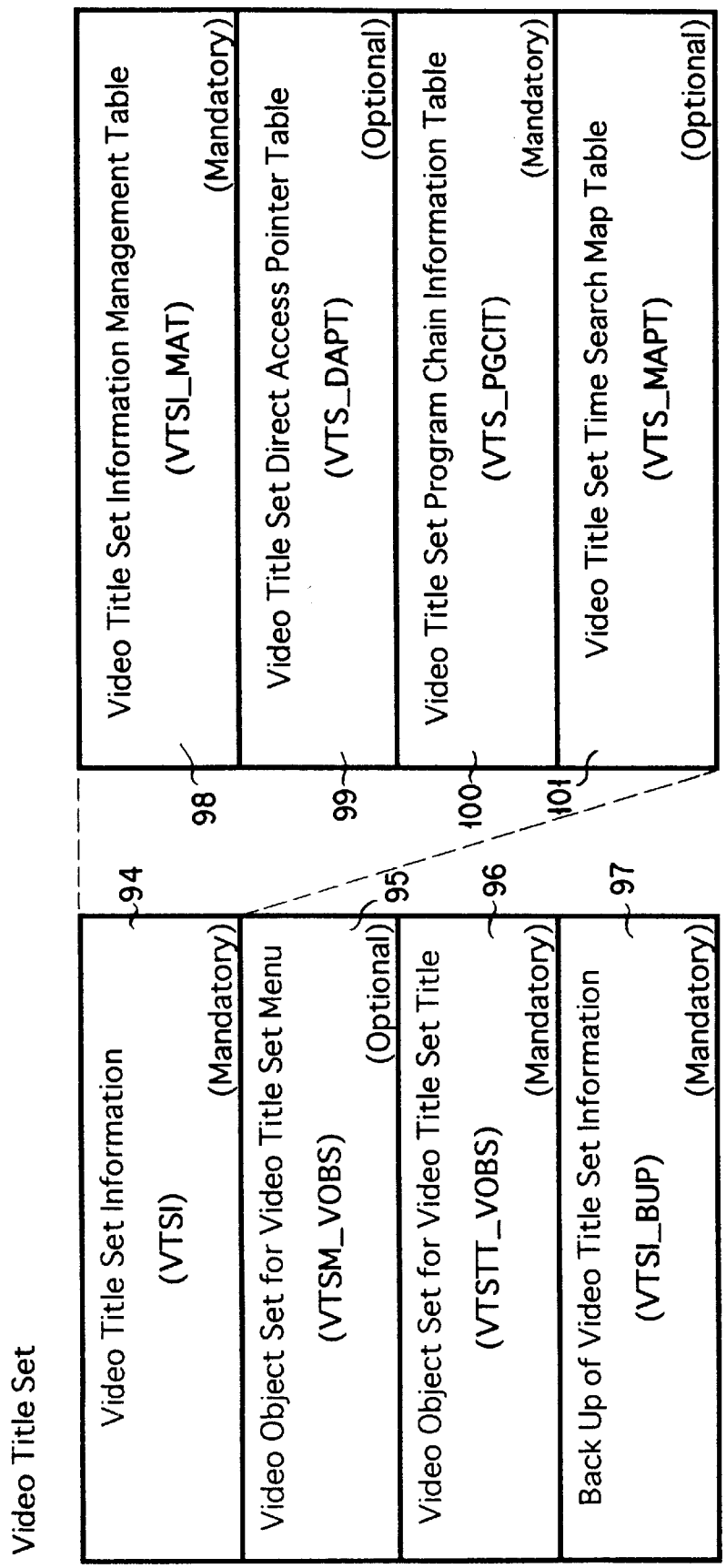
FIG. 12 illustrates the structure of the video title set of FIG. 4.

The video title set information (VTSI) 94 consists of four tables as shown in FIG. 12. The four tables are forced to align with the boundaries between logical sectors. The video title set information management table (VTSI_MAT) 98, a first table, is a mandatory table, in which the size of the video title set (VTS) 72, the start addresses of each piece of information in the video title set (VTS) 72, and the attributes of the video object sets (VOBS) 96 in the video title set (VTS) 72 are written.

The video title set direct access pointer table (VTS_DAPT) 99, a second table, is an optional table provided as the need arises. Written in the table 99 are the program chains (PGC) 87 and/or programs (PG) 89 contained in the video title set 72 that are selectable according to the entry of a title number from the key/display section 4 of the apparatus.

The video title set program chain information table (VTS_PGCIT) 100, a third table, is a mandatory table, in which the VTS program chain information (VTS_PGCI) 104 is written. The video title set time search map table (VTS_MAPT) 101, a fourth table, is an optional table provided as the need arises, in which the information on the recording location, for a specific period of time of display, of the video data in each program chain (PGC) 87 in the title set 72 to which the map table (VTS_MAPT) 101 belongs is written.

Next, the video title information management table (VTSI_MAT) 98 and video title set program chain information table (VTSI_PGCIT) 100 shown in FIG. 12 will be described with reference to FIGS. 13 to 20.

FIG. 13 shows the contents of the video title information management table (VTSI_MAT) 98, in which the video title set identifier (VTS_ID), the size of the video title set 72 (VTS_SZ), the version number of the DVD video specification (VERN), and the video title set category (VTS_CAT) are written in that order. Furthermore, in the table (VTSI_MAT) 98, the start address of the video object set (VTSM_

VOBS) for VTS menus is expressed by a logical block relative to the first logical block in the video title set (VTS) 72. The start address (VTSTT_VOB_SA) of the video object 83 for titles in the video title set (VTS) 72 is expressed by a logical block (RLBN) relative to the first logical block in the video title set (VTS) 72.

Furthermore, in the table (VTSI_MAT) 98, the end address (VTI_MAT_EA) of the video title set information management table (VTI_MAT) 98 is represented by the number of blocks, relative to the first byte in the table (VTI_MAT), 98 and the start address of the video title set direct access pointer table (VTS_DAPT) 99 is represented by the number of blocks, relative to the first byte in the video title set information (VTSI) 94.

Still furthermore, in the table (VTSI_MAT) 98, the start address (VTS_PGCIT_SA) of the video title set program chain information table (PGCIT) 100 is expressed by the number of blocks, relative to the first byte of the video title set information (VTSI) 94, and the start address (VTS_MAPT_SA) of the time search map (VTS_MAPT) 101 in the video title set (VTS) 72 is expressed by a logical sector relative to the first logical sector in the video title set (VTS) 72. Written in the table (VTSI_MAT) 98 are the video object set (VTSM_VOBS) 95 for the video title set menu (VTSM) in the video title set (VTS) 72, the video attributes (VTS_V_ATR) of the video object set (VTST_VOBS) 96 for the titles (VTSTT) in the video title set 72, and the number of audio streams (VTS_AST_Ns) in the video object set (VTSTT_VOBS) 82 for the titles (VTSTT) for the video title sets 72. Here, the video attributes (VTS_V_ATR) include a video compression mode, a frame rate of the TV system, and an aspect ratio for displaying an image on a display unit.

Written in the table (VTSI_MAT) 98 are the audio stream attributes (VTS_AST_ATR) of the video object set (VTST_VOBS) for the titles (VTSTT) in the video title set (VTS). The attributes (VTS_AST_ATR) include an audio encoding mode indicating how audio is encoded, the number of bits used to quantize audio, and the number of audio channels.

Furthermore, written in the table (VTSI_MAT) 98 are the number (VTS_SPST_Ns) of sub-picture streams in the video object set 82 for the titles (VTSTT) in the video title set (VTS) 72 and the attributes (VTS_SPST_ATR) of each sub-picture stream. The attributes (VTR_SPST_ATR) for each sub-picture stream include a sub-picture coding mode and a sub-picture display type.

Furthermore, in the table (VTSI_MAT) 98, written are the number (VTSM_AST_Ns) of audio streams in the video title set menu (VTSM), the audio stream attributes (VTSM_AST_TR), the number (VTSM_SPST_Ns) of sup-picture streams, and the sup-picture stream attributes (VISM_SPST_ATR).

The VTS program chain information table (VTS_PGCIT) 100 has a structure as shown in FIG. 14. In the information table (VTS_PGCIT) 100, information on the VTS program chain (VTS_PGC) is written, starting with information (VTS_PGCIT_I) 102 on the information table (VTS_PGCIT) 100 related to the VTS program chain (VTS_PGC). In the information table (VTS_PGCIT) 100, the information (VTS_PGCIT_I) 102 is followed by as many VTS_PGCI search pointers (VTS_PGCIT_SRP) 103 used to search for VTS program chains (VTS_PGC) as the number (#1 to #n) of VTS program chains in the information table (VTS_PGCIT). At the end of the table, there are provided as many pieces of information (VTS_PGCI) 104 on the respective VTS program chains (VTS_PGC) as the number (from #1 to #n) of the VTS program chains (VTS_PGC).

The information (VTS_PGCIT_I) 102 in the VTS program chain information table (VTS_PGCIT) 100 contains the number (VTS_PGC_Ns) of VTS program chains (VTS_PGC) as shown in FIG. 15. The end address (VTS_PGCIT_EA) of the table information (VTS_PGCIT_I) 102 is expressed by the number of bytes, relative to the first byte in the information table (VTS_PGCIT) 100.

Furthermore, as shown in FIG. 16, the VTS_PGCIT search pointer (VTS_PGCIT_SRP) 103 contains the attributes (VTS_PGC_CAT) of the program chains (VTS_PGC) in the video title set (VTS) 72 and the start address (VTS_PGCI_SA) of the VTS_PGC information (VTS_PGCI) 104 expressed by the number of bytes, relative to the first byte in the VTS_PGC information table (VTS_PGCIT) 100. Here, the VTS_PGC attribute (VTS_PGC_CAT) is, for example, an attribute indicating whether an entry program chain (Entry PGC) is the first one to be reproduced. Usually, an entry program chain (PGC) is written before program chains (PGC) that are not entry program chains (PGC). Generally, program chains (PGC) are reproduced in the description order of VTS_PGCIs as shown in FIG. 14.

The PGC information (VTS_PGCI) 104 in the video title set 72 contains four items as shown in FIG. 17. In the PGC information (VTS_PGCI) 104, the program chain general information (PGC_GI) 105 on a mandatory item is first arranged, followed by at least three items that are made mandatory only when there is an video object 83. Specifically, contained as the three items in the PGC information (VTS_PGCI) 104 are a program chain program map (PGC_PGMAP) 106, a cell playback information table (C_PBIT) 107, and a cell position information table (C_POSIT) 108.

As shown in FIG. 18, the program chain general information (PGC_GI) 105 contains the category (PGCI_CAT) of the program chain 87, the contents (PGC_CNT) of the program chain (PGC) 87, and the playback time of the program chain (PGC) 87. Written in the category of PGC (PGCI_CAT) are whether the PGC can be copied or not and whether the programs 89 in the PGC are played back continuously or at random. The contents of PGC (PGC_CNT) contains the description of the program chain structure, that is, the number of programs 89, the number of cells 84, and the number of angles in the program chain 87. The playback time of PGC (PGC_PB_TIME) contains the total playback time of the programs 89 in the PGC. The playback time is the time required to continuously play back the programs 89 in the PGC, regardless of the playback procedure. When an angle mode is available, the playback time of angle cell number 1 is the playback time of the angle.

Furthermore, the program chain general information (PGC_GI) 105 contains PGC sub-picture stream control (PGC_SPST_CTL), PGC audio stream control (PGC_AST_CTL), and PGC sub-picture pallet (PGC_SP_PLT). The PGC sub-picture stream control (PGC_SPST_CTL) contains the number of sub-pictures usable in the PGC 89 and the PGC audio stream control (PGC_AST_CTL) likewise contains the number of audio streams usable in the PGC 89. The PGC sub-picture palette (PGC_SP_PLT) contains a set of a specific number of color pallets used in all of the sub-picture streams in the PGC 89.

Furthermore, the PGC general information (PGC_GI) 105 contains the start address (C_PBIT_SA) of the cell playback information table (C_PBIT) and the start address (C_POSIT_SA) of the cell position information table (C_POSIT) 108. Both of the start addresses (C_PBIT_SA and C_POSIT_SA) are represented by the number of logical blocks, relative to the first byte in the VTS_PGC information (VTS_PGCI) 105.

The program chain program map (PGC_PGMAP) 106 is a map showing the arrangement of the programs 89 in the PGC 87 of FIG. 19. In the map (PGC_PGMAP) 106, the entry cell numbers (ECELLN), the start cell numbers of the individual programs 89, are written in ascending order as shown in FIGS. 19 and 20. In addition, program numbers are allocated, starting at 1, in the order in which the entry cell numbers are written. Consequently, the first entry number in the map (PGC_PGMAP) 106 must be #1.

The cell playback information table (C_PBIT) defines the order in which the cells 84 in the PGC 87 are played back. In the cell playback information table (C_PBIT) 107, pieces of the cell playback information (C_PBI) are written consecutively as shown in FIG. 21. Basically, cells 84 are played back in the order of cell number. The cell playback information (C_PBIT) 108 contains a cell category (C_CAT) as shown in FIG. 22. Written in the cell category (C_CAT) are a cell block mode indicating whether a cell is in the block and if it is in the block, whether the cell is the first one, a cell block type indicating whether a cell 84 is not part of the block or is in an angle block, and an STC discontinuity flag indicating whether the system time clock (STC) must be set again.

An "angle block" of cells is defined as a set of cells 84 having a specific angle. The angle can be changed by replacing one angle block with another. In the case of a baseball video program, for example, an angle block representing a scene taken from the outfield may be replaced by an angle block representing a scene taken from the infield.

Further written in the cell category (C_CAT) are a cell playback mode indicating whether the video object units (VOBU) 85 in the cell 84 are played back continuously or a picture is made still at one video object unit (VOBU) 85 to another in the cell 84, and cell navigation control indicating whether the picture is made still after the playback of the cell or indicating the rest time.

As shown in FIG. 22, the cell playback information table (C_PBIT) 107 contains the cell playback time (C_PBTNM) representing the total playback time of the PGC 87. When the PGC 87 has an angle cell block, the playback time of the angle cell number 1 represents the playback time of the angle block. Further written in the cell playback information table (C_PBIT) 107 are the start address (C_FVOBU_SA) of the first video object unit (VOBS) 85 in the cell 84 expressed by the number of logical sectors, relative to the first logical sector in the video object unit (VOBS) 85 in which the cell 84 is written and the start address (C_LVOBU_SA) of the end video object unit (VOBS) 85 in the cell 84 expressed by the number of logical sectors, relative to the first logical sector in the video object unit (VOBS) 85 in which the cell 84 is written.

The cell position information table (C_POSI) 108 specifies the identification number (VOB_ID) of the video object (VOB) 85 in the cell used in the PGC 87 and the identification number (Cell_ID) of the cell 84. In the cell position information table (C_POSI) 108, pieces of the cell position information (C_POSI) corresponding to the cell numbers written in the cell playback information table 107 as shown in FIG. 23 are written in the same order as in the cell playback information table (C_PBIT) 107. The cell position information (C_POSI) contains the identification number (C_VOB_IDN) of the video object unit (VOBS) 85 in the cell 84 and the cell identification number (C_IDN) as shown in FIG. 24.

As explained with reference to FIG. 6, a cell 84 is a set of video object units (VOBU) 85. A video object unit 85 is defined as a pack train starting with a navigation (NAV) pack 86. Therefore, the start address (C_FVOBU_SA) of the first video object unit (VOBU) 85 in a cell 84 is the start address of the NAV pack 86. As shown in FIG. 25, the NAV pack 86 consists of a pack header 110, a system header 111, and two packets 116, 117 of navigation data; namely, a playback control information (PCI) packet 116 and a data search information (DSI) packet 117. As many bytes as shown in FIG. 25 are allocated to the respective sections so that one pack may contain 2048 bytes corresponding to one logical sector. The NAV pack is provided immediately before the video pack 88 which contains the first data item in the group of pictures (GOP). Even if the object unit 85 contains no video pack 88, the NAV pack 86 is positioned at the head of the object unit 85, provided that the object unit 85 contains an audio pack 91 and/or a sub-picture pack 90. Thus, even if object unit 85 contains no video pack, its playback time is determined on the basis of the time required for playing back a video pack 88, exactly in the same way as in the case where the unit 85 contains a video pack 88.

Here, a GOP is defined as a data train constituting a screen determined in the MPEG standards. In other words, a GOP is equivalent to compressed data which may be expanded into image data representing a plurality of frames of a moving picture. The pack header 110 contains a pack starting code, a system clock reference (SCR), and a multiplex rate. The system header 111 contains a bit rate and a stream ID. The packet header 112, 114 of each of the PCI packet 116 and DCI packet 117 contains a packet starting code, a packet length, and a stream ID as determined in the MPEG2.

As shown in FIG. 26, another video, audio or sub-picture pack consists of a pack header 120, packet header 121, and a packet 122 containing the corresponding data as in the system layer 24 MPEG 2. Its pack length is determined to be 2048 bytes. Each of these packs is aligned with the boundaries between logical blocks.

The PCI data (PCI) 113 in the PCI packet 116 is navigation data used to make a presentation, or to change the contents of the display, in synchronization with the playback of the video data in the VOB unit (VOBU) 85. Specifically, the PCI data (PCI) 113 contains PCI general information (PCI_GI) as information on the entire PCI data 113 and angle information (NSLS_ANGLI) as each piece of jump destination angle information during angle change as shown in FIG. 27. The PCI general information (PCI_GI) contains the address (NAV_PCK_LBN) of the NAV pack (NAV_PCK) 86 in which the PCI data is recorded as shown in FIG. 28, the address being expressed in the number of blocks, relative to the VOBU logical sector in which the PCI data is recorded. The PCI general information (PCI_GI) contains the category of VOBU (VOBU_CAT), the start PTS of VOBU 85 (VOBU_SPTS), and the end PTS of VOBU 85 (VOBU_EPTS). Here, the start PTS of VOBU 85 (VOBU_SPTS) indicates the playback start time (start presentation time stamp (SPTS)) of the video data in the VOBU 85 containing the PCI data. The playback start time is the playback start time of the first picture in the first GOP in the VOBU 85. Normally, the first picture corresponds to I picture (intra-picture) data in the MPEG standards. The end PTS (VOBU_EPTS) in the VOBU 85 indicates the playback end time (end presentation time stamp (EPTS)) of the video data in the VOBU 85 containing the PCI data. The playback end time is the playback start time of the last picture in the last GOP in the VOBU 85.

The angle information (NSLS_ANGLI) contains as many start addresses (NSLS_ANGC_DSTA) of the angle cells at jump destinations as the number of angles as shown in FIG. 29. Each of the start addresses is represented by a logical sector relative to the logical sector of the NAV pack 86 in which the PCI data is recorded. When the angle is changed on the basis of the angle information (NSLS_ANGLI), the angle information (NSLS_ANGLI) contains either the start address of the VOBU in another angle block whose playback time is equal to that of the VOBU 85 in which the PCI data is recorded as shown in FIG. 30, or the start address (NSLS_ANGC_DSTA) of the VOBU 85 in another angle block whose playback time is closest to the preceding one.

According to the description of the start address (NSLS_ANGC_DSTA) of such an angle cell, the angle is changed in a concrete example as follows. Assuming that a series of consecutive scenes where in a baseball game, the pitcher throws a ball, the batter hits the ball, and the ball lands in the stands, the change of the angle will be explained. An angle cell (ANG_C#j) can be changed on a video object unit (VOBU) 85 basis as shown in FIG. 30. In FIG. 30, the video object units (VOBU) 85 are assigned numbers in the order of playback. The video object unit (VOBU#n) 85 corresponding to playback number n of an angle cell (ANG_C#j) stores the video data for a different scene which is contemporary with or immediately preceding that for which the video data is stored in the video object unit (VOBU#n) 85 with playback number n corresponding to another angle cell (ANG_C#1) or angle cell (ANG_C#9). It is assumed that in an angle cell (ANG_C#j), VOBUs are arranged consecutively as video data used to show on the screen the whole view including the pitcher and batter and a series of actions. It is also assumed that in angle cell (ANG_C#1), VOBUs are arranged consecutively as video data used to show only the batter on the screen to view the batting form of the batter, and that in angle cell (ANG_C#9), VOBUs are arranged consecutively as video data used to show only the expression of the pitcher on the screen. When the user is viewing angle cell #j (ANG_C#i) and changes to angle cell #1 the moment the batter hit the ball, that is, changes to the angle at which only the batter is shown, at the moment the batter made a hit, this switches to a screen where the batter starts swinging a bat before making the hit, not to a screen showing only the batter after he made a hit. Furthermore, when the user is viewing angle cell #j (ANG_C#i) and changes to angle cell #9 the moment the batter hit the ball, that is, changes to the angle at which only the pitcher is shown, at the moment the batter made a hit, this causes the pitcher's expression at the moment the batter made a hit to appear on the screen, enabling the user to read a change in the pitcher's mental state in his expression.

The DSI data (DSI) 115 in the DSI packet 117 shown in FIG. 25 is the navigation data used to search for a VOB unit (VOBU) 85. The DSI data (DSI) 115 contains the DSI general information (DSI_GI), angle information (SML_AGLI), VOBU search information (VOBU_SI), and the synchronizing playback information (SYNCI). See FIG. 31.

The DSI information (DSI_GI) contains information about the entire DSI data 115. Specifically, as shown in FIG. 32, the DSI general information (DSI_GI) contains the system clock reference for the NAV pack (NAV_PCK_SCR) 86. The system clock reference (NAV_PCK_SCR) is stored in the system time clock (STC) 54A, 58A, 60A or 62A built in each section of FIG. 1. On the basis of the STC 54A, 58A, 60A, 62A, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NAV_PCK_LBN) of the NAV pack (NAV_$_p$CK) 86 containing the DSI data expressed by the number of logical sectors (RLSN), relative to the first logical sector in the VOB set (VOBS) 82 containing the DSI, and the address (VOBU_EA) of the last pack in the VOB unit (VOBU) 85 containing the DSI data expressed by the number of logical sectors (RLSN), relative to the first logical sector in the VOB unit (VOBU) 85.

Furthermore, the DSI general information (DSI_GI) contains the end address (VOBU_IP_EA) of the V pack (V_PCK) 88 containing the last data item for the first I picture in the VOB unit (VOBU) expressed by the number of logical sectors (RLSN), relative to the first logical sector in the VOB unit (VOBU) 85 containing the DSI data, and the identification number (VOBU_IP_EA) of the VOB 83 containing the DSI and the identification number (VOBU_C_IDN) of the cell 84 in which the DSI data is recorded.

Like the angle information (NSLS_ANGLI) in PCI 113, the angle information (SML_AGLI) contains as many start addresses (SML_ANGLI_DSTA) of angle cells at jump destinations as the number of angles, as shown in FIG. 33. Each of the start addresses is represented by a logical sector relative to the logical sector in the NAV pack 86 in which the DSI 115 is recorded. When the angle is changed on the basis of the angle information (SML_AGLI), the angle information (SML_ANGLEI) contains the start address of the cell 84 in another angle block after the playback time of the VOBU 85 in which the DSI data 115 is recorded, as shown in FIG. 34.

When the angle information (SML_ANGL1) in DSI data 113 is used, the angle is changed, cell by cell, whereas PCI can be changed on the basis of a video object unit (VOBU) 85. Namely, consecutive changes of the angle are described in the angle information (SML_ANGL1) in DSI data 115, whereas discontinuous changes of the angle are described in the angle information (SML_ANGL1) in PCI data 113. In the above example of baseball, the angle is changed as follows. It is assumed that angle cell #j (AGL_C#j) 84 contains a stream of video data for a series of scenes where the pitcher throws a ball, the batter hits the ball, and the ball lands in the stands, filmed from the infield, and that angle cell #1 contains a stream of video data for a series of the same scenes filmed from the outfield. Furthermore, angle cell #9 is assumed to be a stream of video data as to how the team to which the batter belongs looks in connection with a series of the above scenes. When the user is viewing angle cell #j (AGL_C#j) and changes to angle cell #1 the instant the batter made a hit, that is, changes to a scene from the outfield the instant the batter hit the ball, he or she can switch to consecutive scenes where the ball is flying closer to the outfield after the batter hit the ball. Furthermore, when the user is viewing angle cell #j (AGL_C#i) and changes to angle cell #9 the moment the ball landed in the stands, that is, changes to an angle at which how the batter's team looks is shown on the screen, the team cheering for the home run and the baseball manager's expression are displayed on the screen. When the angle information (NSLS_ANGLI) in PCI data 113 and the angle information (SML_ANGLI) in DSI data 115 are used, it is apparent that a different scene is played back.

The search information (VOBU_SI) in VOBU 85 contains information used to identify the first address in a cell 84 as shown in FIG. 35A. Specifically, the search information (VOBU_SI) in VOBU 85 contains the start addresses (A_FWDn) of +1 to +20, +60, +120, and +240 VOB units (VOBU) 85 as forward addresses (FWDANn) in the order of playback on the basis of the VOB unit (VOBU) 85 containing the DSI 115 as shown in FIG. 35A, the forward addresses being expressed by the number of logical sectors, relative to the first logical sector in the VOB unit.

Each forward address (FWDANn) contains 32 bits as shown in FIG. 35B. Bit number 29 (b29) to bit number 0 (b0) are assigned to its address, for example, the address of forward address 10 (FWDA10). At the head of the forward address (FWDANn), a flag (V_FWD_Exist1) indicating whether the video data exists in the video object unit (VOBU) 85 corresponding to the forward address (FWDANn) and a flag (V_FWD_Exist2) indicating whether the video data exists in the video object unit between the current address and the forward address (FWDAn). Specifically, VFWD_Exist1 corresponds to bit number (b31). When this flag is at 0, this means that there is no video data in the video object unit (VOBU) specified by the address (FWDANn) written in bit number 29 to bit number 0. When this flag is at 1, this means that there is video data in the video object unit (VOBU) specified by the forward address (FWDANn) written in bit number 29 to bit number 0. For example, if forward address 10 (FWD10) has video data, the flag will be up (1) in V_FWD_Exist1 of the 31st bit. If the address has no video data, the flag will be down (0) in V_FWD_Exist1 of the 31st bit. Furthermore, V_FWD_Exist2 corresponds to bit number (b30). When this flag is at 0, this means that there is video data in none of the video object units between the current address and the forwarding address (FWDAn). Specifically, V_FWD_Exixt 1 corresponds to bit number (b31). When this flag is at 0, this means that there is no video data in the video object units (VOBU) 85 between the forward address (FWDANn) written in bit number 29 to bit number 0 and current address. When this flag is at 1, this means that there is video data in at least one of the video object units (VOBU) 85 between them. For example, if there is video data in a plurality of video object units 85 between forward address 1 and forward address 9, the flag will be up (1) in V_FWD_Exist2 of the 30th bit. If the address has no video data, the flag will be down (0) in V_FWD_Exist2 of the 30th bit.

Furthermore, the VOBU search information (VOBU_SI) contains the start addresses (A_BWDn) of −1 to −20, −60, −120, and −240 VOB units (VOBU) 85 as backward addresses (BWDA) in the reverse order of playback on the basis of the VOB unit (VOBU) 85 containing the DSI as shown in FIG. 35A, the backward addresses being expressed by the number of logical sectors, relative to the first logical sector in the VOB unit 85.

Each backward address (FWDANn) contains 32 bits as shown in FIG. 35C. Bit number 29 (b29) to bit number 0 (b0) are assigned to its address, for example, the address of backward address 10 (BWDA10). At the head of the backward address (BWDANn), a flag (V_BWD_Exist1) indicating whether the video data exists in the video object unit (VOBU) 85 corresponding to the backward address (BWDANn) and a flag (V_BWD_Exist2) indicating whether the video data exists in the video object units between the backward address (BWDAn) and the current address. Specifically, V_BWD_Exist1 corresponds to bit number (b31). When this flag is at 0, this means that there is no video data in the video object unit (VOBU) 85 specified by the address (BWDANn) written in bit number 29 to bit number 0. When this flag is at 1, this means that there is video data in the video object unit (VOBU) specified by the address (BWDANn) written in bit number 29 to bit number 0. For example, if backward address 10 (BWDA10) has video data, the flag will be up (1) in V_BWD_Exist1 of the 31st bit. If the address has no video data, the flag will be down (0) in V_BWD_Exist1 of the 31st bit. Furthermore, V_BWD_Exist2 corresponds to bit number (b30). When this flag is at 0, this means that there is video data in none of the video object units between the backward address (BWDANn) written in bit number 29 to bit number 0 and the current address. When this flag is at 1, this means that there is video data in at least one of the video object units (VOBU) 85. For example, if there is video data in video object units between the backward address 10 (BWDA10) and the current address 0, the flag will be up (1) in V_BWD_Exist2 of the 30th bit. If the address has no video data, the flag will be down (0) in V_BWD_Exist2 of the 30th bit.

The synchronizing information (SYNCI) contains address information on the sub-pictures and audio data reproduced in synchronization with the playback start time of the video data in the VOB unit (VOBU) 85 containing the DSI data. Specifically, as shown in FIG. 36, the start address (A_SYNCA) of the target audio pack (A_PCK) is expressed by the number of logical sectors (RLSN), relative to the NAV pack (NAV_PCK) 86 in which DSI data 115 is recorded. When there are more than one audio stream (8 audio streams maximum), as many pieces of the synchronizing information (SYNCI) as there are audio streams are written. Furthermore, the synchronizing information (SYNCI) contains the address (SP_SYNCA) of the NAV pack (NAV_PCK) 86 of the VOB unit (VOBU) 85 containing the target audio pack (SP_PCK) 91, the address being expressed by the number of logical sectors (RLSN), relative to the NAV pack (NAV_PCK) 86 in which DSI 115 is recorded. When there are more than one sub-picture stream (32 sub-picture streams maximum), as many pieces of the synchronizing information (SYNCI) as there are sub-picture streams are written.

Hereinafter, the operation of reproducing the movie data from the optical disk 10 with the logical formats shown in FIGS. 4 to 36 will be explained with reference to FIG. 1. In FIG. 1, the solid-line arrows indicate data buses and the broken-line arrows represent control buses.

With the optical disk apparatus of FIG. 1, when the power supply is turned on and an optical disk 10 is loaded, the system CPU section 50 reads the initial operation program from the system ROM/RAM 52 and operates the disk drive section 30. Then, the disk drive section 30 starts to read the data from the lead-in area 27 and then from the volume and file structure area 70 following the lead-in area 27 and determines a volume structure and a file structure in accordance with IS0-9660. Specifically, to read the data from the volume and file structure area 70 located in a specific position on the optical disk 10 set in the disk drive section 30, the system CPU section 50 gives a read instruction to the disk drive section 30 to read the contents of the volume and file structure area 70, and stores the data temporarily in the data RAM section 56 via the system processor section 54. The system CPU section 50 extracts information about the recording position and recording size of each file and management information necessary for other managing actions, and transfers and stores in specific locations in the system ROM/RAM section 52.

Then, the system CPU section 50 acquires a video manager 71 composed of files, starting with file number 0, with reference to the information about the recording position and recording capacity of each file in the system ROM/RAM section 52. Specifically, referring to the recording position and recording capacity of each file acquired from the system ROM/RAM section 52, the system CPU section 50 gives a read instruction to the disk drive section 30, acquires the positions and sizes of a plurality of files constituting the video manager 71 existing on the root directory, reads the video manager 71, and stores it in the data RAM section 56 via the system processor section 54. A volume manager information management table (VMGI_MAT) 78, the first table in the video manager 71, is searched for. By the search, the start address (VMGM_VOBS_SA) of the video object set (VMGM_VOBS) 76 for the video manager menu (VMGM) is obtained and the video object set (VMGM_VOBS) 76 is reproduced. Because the playback of the video object set (VMGM_VOBS) for menus is the same as that of the video object set (VTSM_VOBS) for titles in the video title set (VTS), its playback procedure will be omitted. When a language is set in the video object set (VMGM_VOBS) 76, or when there is no video manager menu (VMGM), the volume manager information management table (VMGI_MAT) is searched for and the start address (TT_SRPT_SA) of the title set search pointer table (TT_SRPT) 79 is retrieved.

By the retrieval, the title set search pointer table (TT_SRPT) 79 is transferred to a particular location in the system ROM/RAM section 52 and stored there. Next, the system CPU section 50 acquires the end address of the title search pointer table (TT_SRPT) 79 from the title search pointer table information (TSPTI) 92 and also obtains the video title set number (VTSN) corresponding to the input number, the program chain number (PGCN), and the start address (VTS_SA) of the video title set from the title search pointer (TT_SRP) 93 according to the input number from the key input section 4. When there is only one title set, one title search pointer (TT_SRP) 93 is searched for, regardless of whether the input number has been entered from the key input section 4, and the start address (VTS_SA) of the title set is acquired. From the start address (VTS_SA) of the title set, the system CPU section 50 acquires the target title set.

The system CPU 50 acquires the number of video streams, audio streams, and sub-picture streams for volume menus written in the information management table (VMGI_MAT) 78 in the volume manager (VMGI) 75 and their attribute information, and on the basis of the attribute information, sets parameters for playback of video manager menus in the video decoder 58, audio decoder 60, and sub-picture decoder 62.

Next, from the start address (VTS_SA) of the video title set 72 of FIG. 11, the video title set information (VTSI) 94 about the title set is obtained as shown in FIG. 12. The end address (VTI_MAT_EA) of the video title set information management table (VTSI_MAT) 98 of FIG. 13 is acquired from the management table (VTSI_MAT) 98 98 of the video title set information (VTSI) 94. At the same time, each section of the reproducing unit shown in FIG. 1 is set on the basis of the number of audio streams and the number of sub-picture data streams (VTS_AST_Ns, VTS_SPST_Ns) and the attribute information on the video, audio, and sub-picture data (VTS_V_ATR, VTS_A_ATR, VTS_SPST_ATR).

When a menu (VTSM) for a video title set (VTS) has a simple structure, the start address (VTSM_VOB_SA) of a video object set (VTSM_VOB) for menus for a video title set is acquired from the video title set information management table (VTSI_MAT) 98 of FIG. 13. On the basis of the video object set (VTSM_VOB) 95, a menu for the video title set is displayed. When an video object set (VTT_VOBS) 96 for titles (VTST) in the title set (VTS) is simply reproduced without selecting a program chain (PGC) with reference to the menu, the video object set 96 is reproduced on the basis of the start address (VTSTT_VOB_SA) shown in FIG. 13.

When a program chain is specified from the key/display section 4, the desired program chain 87 is retrieved in the following procedure. The retrieval of a program chain 87 is not limited to a program chain 87 for titles in the video title set. The same procedure applies to the retrieval of a program chain 87 for a relatively complex menu made up of program chains 87. The start address of the program chain information table (VTS_PGCIT) 100 in the video title set (VTS) of FIG. 13 written in the management table (VTSI_MAT) 98 of the video title set information (VTSI) 94 is acquired, and the information (VTS_PGCIT_I) 102 in the VTS program chain information table 100 of FIG. 14 is read. From the information (VTS_PGCIT_I) 104, the number of program chains (VTS_PGC_Ns) and the end address (VTS_PGCIT_EA) of the table 100 shown in FIG. 15 are obtained.

When the number of a program chain 87 is specified from the key/display section 4, the category of the program chain 87 and the start address of the VTS_PGC information 104 corresponding to the search pointer (VTS_PGCIT_SRP) 103 shown in FIG. 16 are acquired from the VTS_PGCIT search pointer (VTS_PGCIT_SRP) 103 corresponding to the number shown in FIG. 14. On the basis of the start address (VTS_PGCI_SA), the program chain general information (PGC_GI) of FIG. 17 is read out. According to the general information (PGC_GI) 105, the category and playback time of the program chain (PGC) (PGC_CAT, PGC_PB_TIME) are obtained and further the start addresses (C_PBIT_SA, C_POSIT_SA) of the cell playback information table (C_PBIT) and cell position information table (C_POSIT) 108 contained in the general information (PGC_GI) are acquired. From the start address (C_PBIT_SA), the video object identifier (C_VOB_IDN) and cell identifier (C_IDN) of FIG. 24 are acquired as the cell position information (C_POSI) of FIG. 23.

Furthermore, from the start address (C_POSIT_SA), the cell playback information (C_PBI) of FIG. 21 is obtained. The start address ($C_{13}$ FVOBU_SA) of the first VOBU 85 and the start address (C_IVOBU_SA) of the last VOBU in the cell of FIG. 22 contained in the playback information (C_PBI) are acquired. Then, the target cell is retrieved. In the playback of cells, referring to the program map of FIG. 19 in the PGC program map (PGC_PGMAP) 106 of FIG. 17, playback cells 84 are determined one after another. The data cells of program chains thus determined are read one after another from the video object 144 and input to the data RAM section 56 via the system processor section 54. The data cells 84, on the basis of the playback time information, are supplied to the video decoder section 58, audio decoder section 60, and sub-picture decoder section 62, which decode them. The decoded signals are subjected to signal conversion at the D/A and data-reproducing section 64 and an image is reproduced at the monitor section 6 and at the same time, sound is reproduced at the speaker sections 8, 9.

Furthermore, a normal playback and high-speed search of the video data using a navigation pack 86 will be described in detail with reference to a flowchart.

Figure 37A:
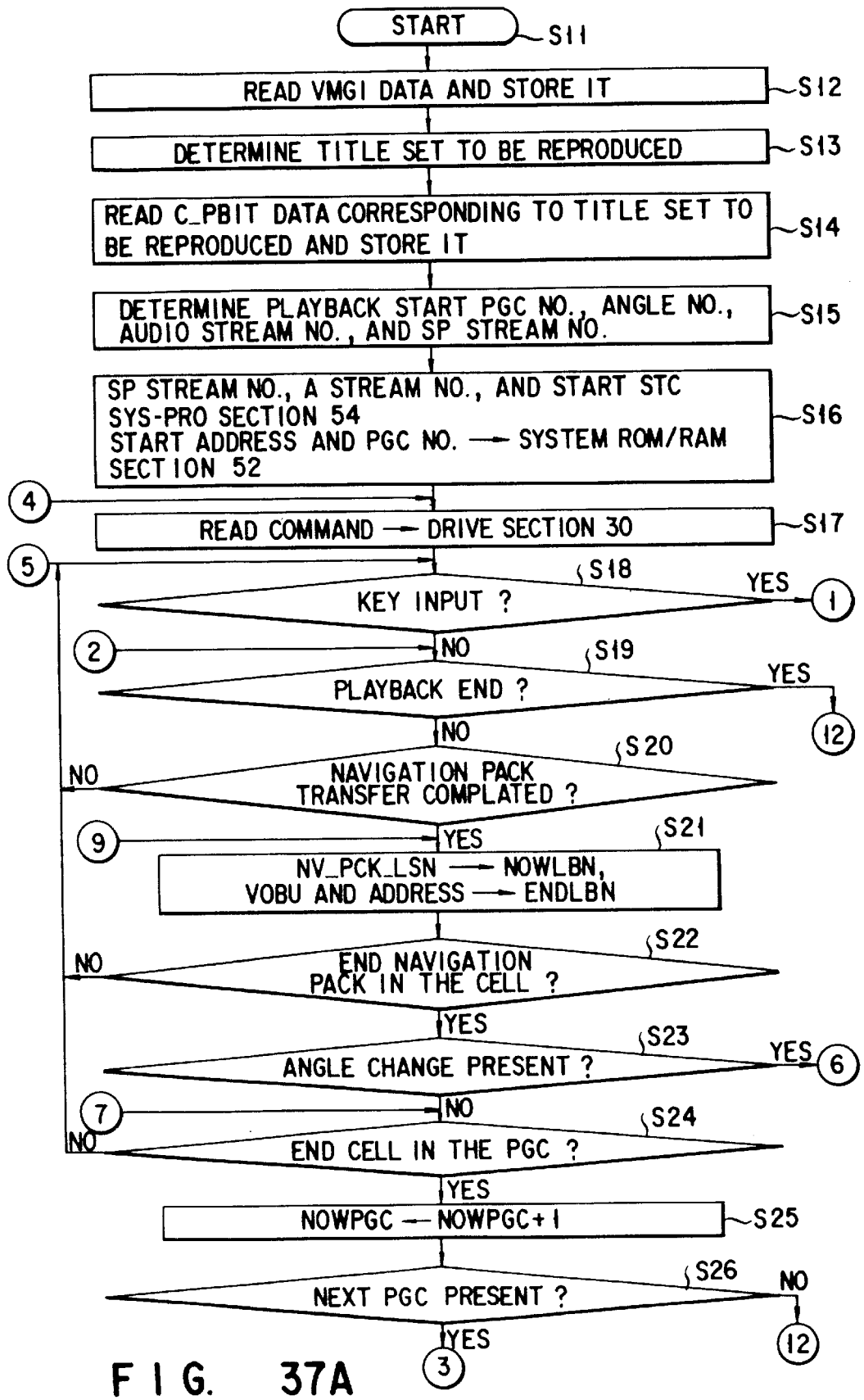

In a normal playback of video data, when a normal playback is started as shown in FIGS. 37A and 37B, after the start-up at step S11, the video manager information (VMGI) 75, as explained earlier, is retrieved by the system CPU section 50 and stored in the system ROM/RAM section 52. On the basis of the video manger information (VMGI) 75, the video title set information (VTSI) 94 on the video title set (VTS) 72 is read and simultaneously the video title set menu is displayed on the monitor section 6 using the video object set (VYTSM_VOBS) 95. On the basis of the display, as shown in step S13, the user selects a title set 72 to be reproduced and playback conditions. When the decided title 72 is selected using the key/display section 4, as shown in step S14, the data in the cell playback information table (C_PBIT) 107 of FIGS. 17, 21, and 22 is read by the system CPU section 50 from the program chain information table (VTS_PGCIT) 100 of FIG. 12 in the selected title set 72. The read-out data is stored in the system ROM/RAM section 52. According to the playback conditions, the system CPU section 50 determines a program chain number (VTS_PGC_Ns), angle number (ANGNS), audio stream number, and sub-picture stream number. For example, the eleventh boxing match for a world championship is selected as a title for a program chain and it is determined that Japanese subtitles are displayed as sub-pictures with English narration. The user selects an angle so that a match between the champion and the opponent may be viewed impressively. The determined sub-picture number and audio stream number are set in the register of the system processor section 54 as shown in step S16. Similarly, the playback start time is set in the system time clock in each of the system processor section 54, video decoder 58, audio decoder 60, and sub-picture decoder 62. The start address of the first VOBU in a cell and PGC number, or cell number, are stored in the system ROM/RAM section 52.

As shown in step S17, at the time when a preparation to read a video title set has been made, the system CPU section 50 gives a read command to the disk drive section 30, which searches the optical disk 10 on the basis of the above start address and PGC number. By the read command, the cells 84 related to the specified program chain (PGC) are read one after another from the optical disk 10, and are transferred to the data RAM section 56 via the system CPU section 50 and system processing section 54. The transferred cell data includes a navigation pack 86 which is, as shown in FIG. 6, the head pack of the video object unit (VOBU) 85. The navigation pack 86 is stored into the data RAM 56. Thereafter, the video pack 88, audio pack 91, and sub-picture pack 90 in the video object unit (VOBU) are distributed to the video decoder section 58, audio decoder section 60, and sub-picture decoder section 62, respectively. The individual decoders decode the packs and supply the resulting signals to the D/A and data-reproducing section 64. As a result, a video signal is sent to the monitor 6 and an audio signal is transmitted to the speaker 8, thereby starting the display of images with sub-pictures. At the same time, the reproduction of sound is started.

If a key input is supplied from the key/display section 4 during the video and audio reproduction, the key data acquired is stored into the system RAM/ROM section 52. If there is no key input from the section 4, it is determined in step S19 whether or not a playback end message has been supplied from the drive section 30. If the message has been supplied, it is determined whether or not a navigation pack 86 has been transferred to the system ROM/RAM section 52. If the navigation pack 86 has been transferred to the section 52, the logical sector number (NAV_PCK_LSN) in the navigation pack 86 is stored as current logical block number (NOWLBN) into the system RAM/ROM section 52 in step 20.

After the NAV pack has been transferred, it is determined whether the NAV pack is the last one in the cell 84. More precisely, in step S22 it is determined whether or not the NAV pack is the last navigation pack 86 in the cell 84. This is effected by comparing the start address (C_LVOBU_SA) of the cell playback table (C_PBI) 107 with the address (V_PCK_LBN) of the navigation pack 86. If the NAV 86 is not the last one in the cell 84, control will return to step S18. If the NAV pack 86 is the last one in the cell 84, control goes to step S23. In step S23 it is verified whether there is an angle change. An angle change is judged on the basis of whether an angle change is inputted from the key/display section 4 to the system CPU section 50. If there is no angle change, as shown in step S24, it will be verified whether it is the end cell of the program chain (PGC) to which the cell 84 belongs. The verification is effected on the basis of whether the cell 84 shown in FIGS. 17 and 21 is the end cell in the cell playback information table (C PBIT) 107. Namely, the verification is achieved on the basis of the number of cells 84 constituting the program chain and the identification number of the reproduced cell. If the cell does not correspond to the end cell of the program chain (PGC), control will be returned to step S18.

If the cell 84 is the end cell of the program chain (PGC), it will be determined that the program chain has finished and the next program chain (PGC) will be specified. Except for special cases, the program chains are reproduced in the sequence of their numbers, so that adding 1 to the number of the program chain that has been reproduced enables the number of a program chain to be reproduced next to be set. Whether there is a program chain whose program number is the set program chain number is verified at step S26. If there is no program chain to be reproduced next, control will be passed to the flow for the playback end procedure shown in FIG. 38 explained later. If the set program chain is present, as shown in step S27, the address of the cell in the program chain that has been set again, that is, the start address (C_FVOBU_SA) of C_FVOBU in the cell playback information (C_PBI) 107 of FIG. 22 is obtained as the present logical block number. As shown in step S28, it is verified whether the start address (C_FVOBU_SA) is equal to the address obtained by adding 1 to the end address (ENDLBN) of the cell 84 in the preceding program chain already reproduced. If they are equal to each other, this means the playback of cells having consecutive addresses and control will return to step S18. If those addresses are not equal, this means that addresses of the cells are not consecutive. In this case in step S29, the system CPU section 50 issues a read end address command and temporarily stops the reading operation of the disk drive section 30. The read end address command designates the end address of the current video object unit. Thereafter, in step S30, the system CPU section 50 gives a consecutive read command again to the disk drive section 30. Then, control return to step S18, thereby starting the retrieval of a navigation pack 86.

If a key input is supplied from the key/display section 4 at step S18, it will be confirmed in step S31 whether the key input is for fast-forward (FF), for example. If it is for fast-forward (FF), a high-speed searching process will be executed in step S32. If it is not for fast-forward, another process, or a process related to a series of video playback, such as a pause in playback or the change of audio streams, will be carried out at step S9. Then, control returns to step S19.

Figure 38:
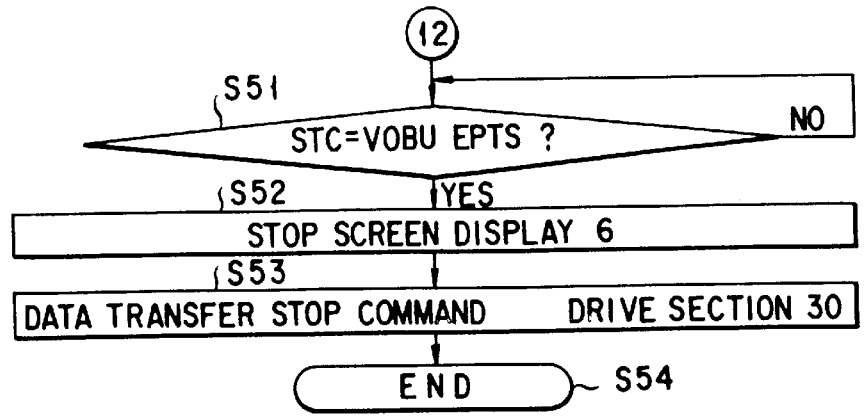

If the end of playback has been specified in step S19, or if there is no program chain to be reproduced next in step S26, the end PTS (VOBU_EPTS) contained in the PCI general information (PCI_GI) is referred to in step S51 (FIG. 38). When the end PTS (VOBU_EPTS) coincides with the system time clock (STC), the monitor 6 will stop displaying on the screen as shown in step S52, then the system CPU will supply a data transfer stop command to the disk drive section 30, which thereby stops the data transfer, terminating the playback operation.

Figure 40:
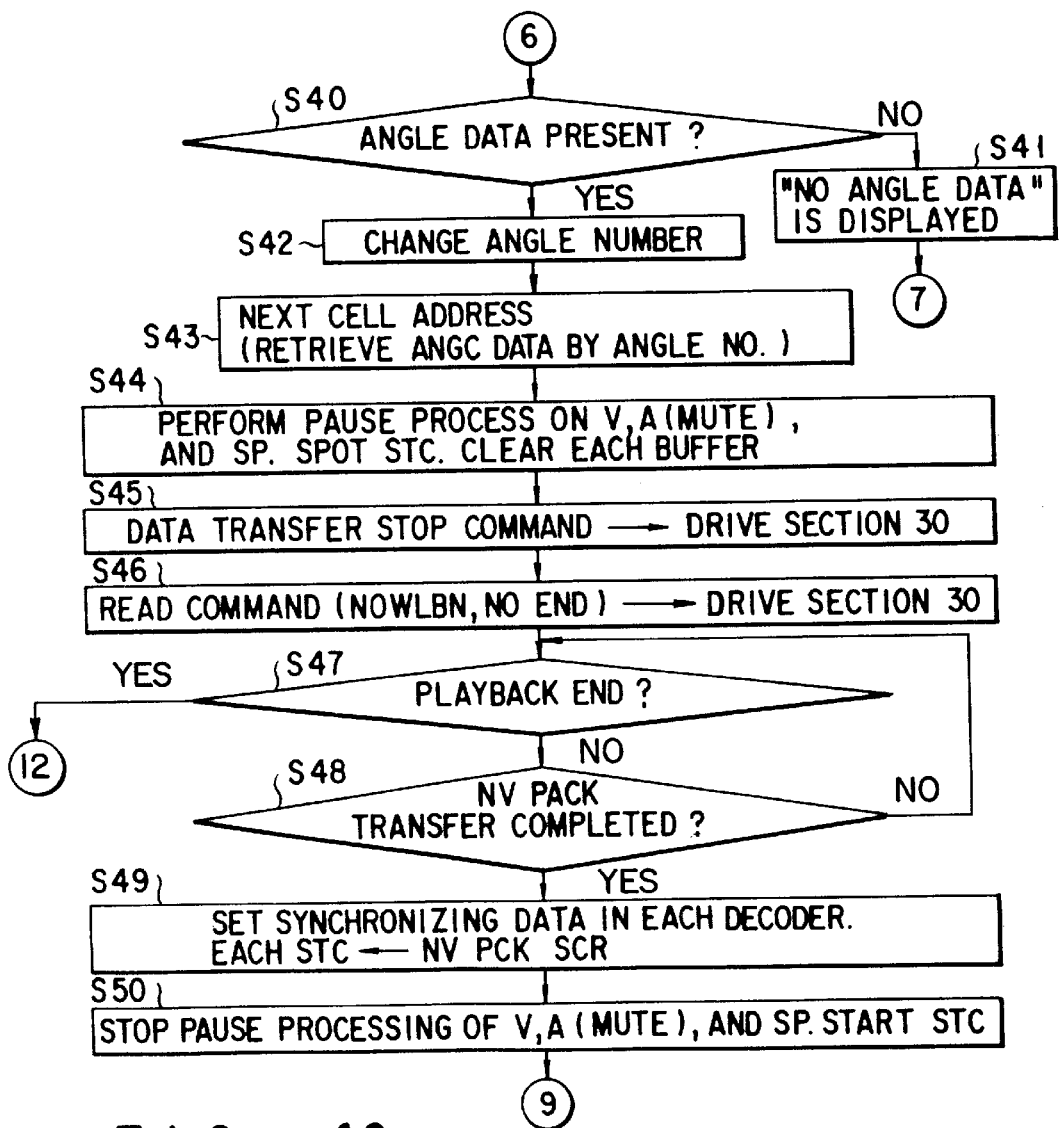
FIG. 40 is a flowchart of the procedure for changing the angle during playback of the video data from an optical disk having logic formats shown in FIGS. 4 to 36.

If an angle change input is supplied from the key/display section 4 in step S23, it will be checked whether there is angle data as shown in step S40 of FIG. 40. The presence/absence of angle has been given as angle information (NSULS_ANGLE, SML_AGLI) to both of the PCI data 113 and DSI data 115 in the navigation pack 86. If there is no angle to be changed in step S40, the message that there is no angle data will be displayed on the key/display section 4 or the monitor 6 as shown in step S41. After the message for no angle data is displayed, control goes to step S24. If there is angle data, as shown in step S42, an angle number to be changed will be specified from the key/display section 4. In this case, as explained earlier, it will be specified which of the angle information in the PCI data and the DSI data (NSULS_ANGLEI, SML_AGLI) is used to change the angle. When only one type of angle information is available, the selection is limited to the one type. If an angle number is specified, the target addresses (NSLS_ANGC_DSTA, SML_ANG_DSTA) of the angle cell corresponding to the specified angle number as shown in FIGS. 29 and 30 will be acquired at step S43. By this address, a cell is searched for. The address is set for the logical block number (NOWLBN) to be searched for. With the angle change operation using the PCI data, the system CPU section 50 performs a muting process on the playback of video and audio data and also effects a pause process on the playback of sub-pictures. These processes stop the system time clock (STC) in each section of the reproducing system and make it possible to take in the angle data already changed by clearing the buffers in the video, audio, and sub-picture decoders 58, 60, and 62. At the same time, at shown in step S45, the system CPU section 50 issues a read end address command and temporarily prevents the disk drive section 30 from reading the data. Thereafter, as shown in step S46, the CPU section 50 supplies a read command to the disk drive section 30. Then, the selected cell is searched for by the set retrieval logical block number, or by the start address of the cell, the cell data is retrieved consecutively. The transfer of the data in the selected angle cell is ten started.

After the transfer has been started, it is checked again, in step S47 whether a playback end has been specified and control waits for the transfer of the navigation pack of the first cell associated with the changed angle. As shown in step S48, it is checked whether a navigation pack has been transferred as a result of the data transfer. If no navigation pack has been transferred, control will be returned to step S47. If a navigation pack has been transferred, each system time clock (STC) will be set with reference to the SCR in the NAV pack (NAV_PCK_SCR) contained in the DSI general information (DSIG) in the navigation pack 86. Thereafter, the video and audio muting state and the pause state of sub-pictures are canceled at step S44 and then the system time clock (STC) starts. Then, step S21 of FIG. 37A is executed as in a normal playback.

When an interrupt process is started as shown in step S33 (FIG. 39), the interrupt state will be stored in the system ROM/RAM section 52 in step S34. Next, it is confirmed whether the interrupt state is of timer interrupt. If it is not a timer interrupt, control will be passed to step S37. If it is a timer interrupt, the contents of the current system clock (STC) 58A, 60A, 62A will be read from the MPEG decoder sections 58, 60, 62, that is, one of the video, audio, and sub-picture decoder sections 58, 60, and 62 and the read-out value will be allowed to appear on the display section, for example, on the monitor section 6 or the key/display section 4. Thereafter, at step S37, it is verified whether it is a key interrupt. If it is a key interrupt, the data for the key input will be stored in the system RAM/ROM. If it is not a key interrupt, as shown in step S39, control will be returned to the original state at the time when the interrupt occurred, in step S39 after the storage of the key input data.

Next, the high-speed search operation of an image to be reproduced will be described with reference to FIGS. 42A, 42B, 42C, and 42D. In a high-speed search of an image to be reproduced, it is assumed that image data items are skipped at regular intervals of 10 video object units (VOBU). When at step S55, an operation flow of a high-speed search starts, the system CPU section 50, at step S56, will instruct the respective decoders 58, 60, and 62 in the reproducing system to perform the processes for high-speed searching. Under the instruction, only the I picture is played back from the video pack, whereas the audio and sup-picture data are muted forcibly and not reproduced. Furthermore, the counter is prohibited from appearing on the monitor section 6 or the key/display section 4 and the system clock is prevented from operating.

After the search is started, it is checked in step S59 whether the navigation pack 86 of the video object unit (VOBU) 8 has been transferred or not. If No, the control returns to step S57, in which the transfer of the navigation pack 86 is waited for. The control then goes to step S58. If Yes in step S59, the control goes to step S60. In step S60, the logic block number (NAV_PCK_LBN) shown in FIG. 32 and the forward address (FWDA1 to FWDAn) shown in FIG. 35 are acquired and stored into the system ROM/RAM 52.

Next, as shown in step S62, the value of NAV pack SCR (NAV_PCK_SCR) is displayed on the monitor section 6 or the key/display section 4. Seeing the display, the user can know the time at the reproducing section in which the video data is being searched for. After the display, it is confirmed at step S63 whether the I picture of the video data in the video object unit (VOBU) to which the NAV pack belongs has been reproduced. In other words, the system CPU section 50 waits for the information indicating that the video decoder section 58 has reproduced the I picture used as status data. If the reproduction of I picture has been completed, it will be verified, in step S64 as shown in step 64, whether the forward address (FWDA10 [b29:b0]) has been written in from bit 29 to bit 0. If the forward address has not been written (FWDA10 [b29:b0]=0), control will be advanced to step S80 explained later with reference to FIG. 42C. If the forward address has been written (FWDA10 [b29:b0]=/0), it will be verified in the next step S65 whether there is video data in the video object unit (VOBU) at the forward address 10. If there is no video data (FWDA10 [b31]=0), control will be advanced to step 90 explained later with reference to FIG. 42D. If there is video data (FWDA10 [b31]=/0), the forward address (FWDA10 [b29:b0]) will be determine to be the current relative logical block number and the video object unit at the start address will be searched for.

Then, at step S67, it is checked whether the high-speed search has been completed. If the high-speed search has not been completed, at step S68, a data transfer cancel command will be given to the drive section 30 and control will be returned again to step S57. If the high-speed search has been completed at step S67, a read command will be given to the drive section 30 in step S69 of FIG. 42B. In step S70 it will be checked whether the reproduction has been completed. If the reproduction has been completed, step S51 shown in FIG. 38 will be executed. If the reproduction has not been completed, it will be checked at step S71 whether the NAV pack has been transferred. If it has not been transferred, control will wait for the NAV pack to be transferred. If the NAV pack has been transferred, the address of the NAV pack will be stored in the system ROM/RAM section 52 as shown in step S72. If the address coincides with the relative logical block (NOWLBN) being searched for, an instruction for an ordinary playback process will be given to the respective decoders 58, 60, and 62, which will be set in the normal playback mode, and control will be passed to step S21 shown in FIG. 37A. If at step S37, the address of NAV pack does not coincide with the relative logical block (NOWLBN) being searched for, control will return to step S69 and the NA pack will be searched for until the address has coincided with the block.

Figure 42B:
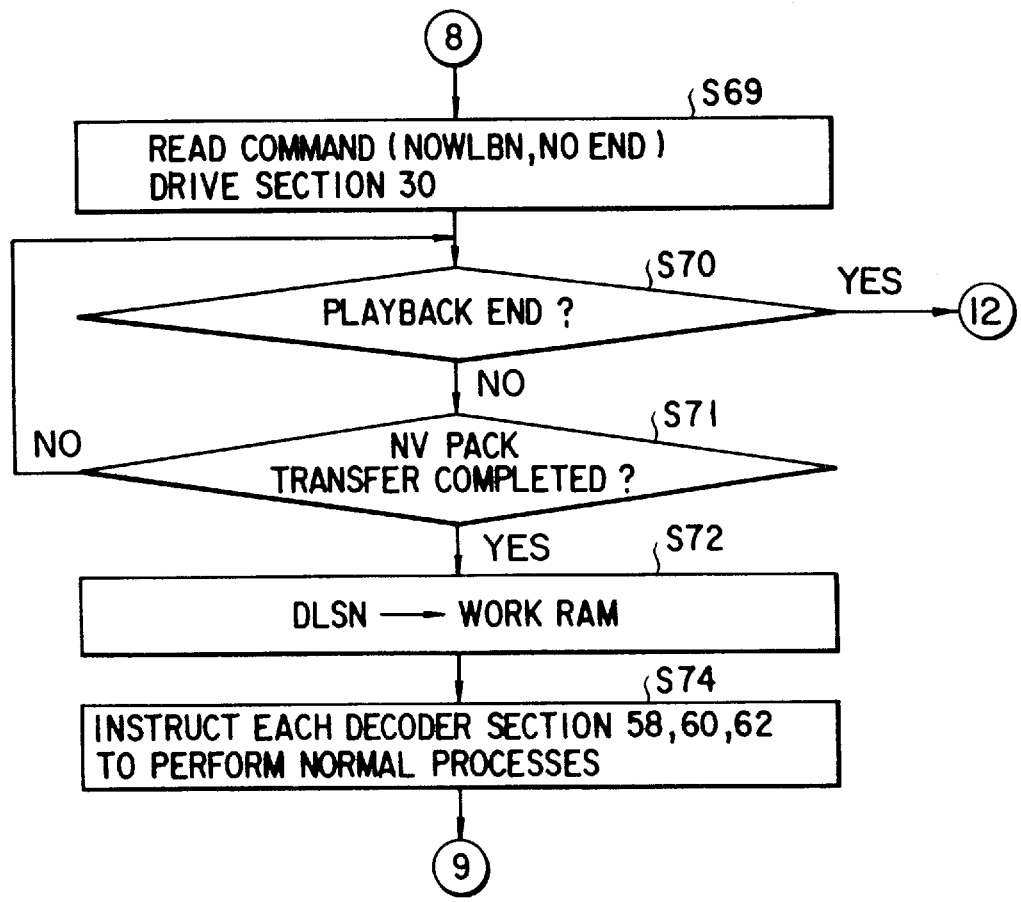
Figure 42C:
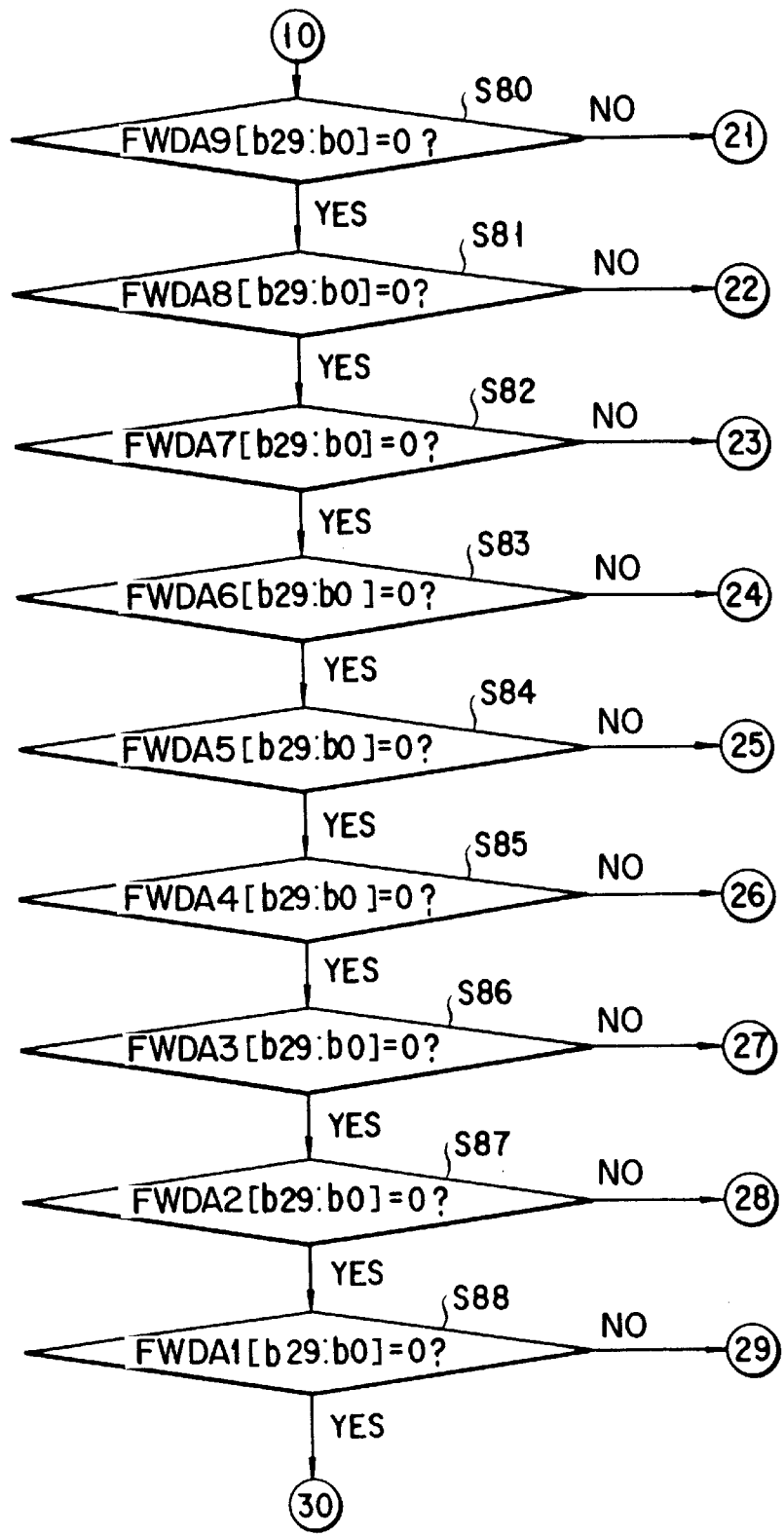

If at step S64, there is no description of forward address in forward address 10 (FWDA10 [b29:b0]=0), it will be checked as shown in step S80 of FIG. 42C whether there is a description of forward address in forward address 9 (FWDA10 [b29:b0]=0). If there is no address description, it will be confirmed at step S81 whether there is a description of forward address in forward address 8. As shown in steps S82 to S88, if there is no description of forward address, the number of the forward address will be decremented by 1 until forward address 1 has been checked. If the description does not exist in forward address S88 either as shown in step S88, control will be passed to step S121 explained later in FIG. 42. Furthermore, in step S80, there is a description of forward address in forward address 9 (FWDA10 [b29:b0]= 1), control will be passed to step S91 of FIG. 42D. If in steps S82 to S88, there is a description of forward address in forward addresses 8 to 1 (FWDA 8 to FWDA 1 [b29:b0]=1), control will be passed to the corresponding step S93, S95, S97, S99, S101, or S103 shown in FIG. 42D.

Figure 42D:
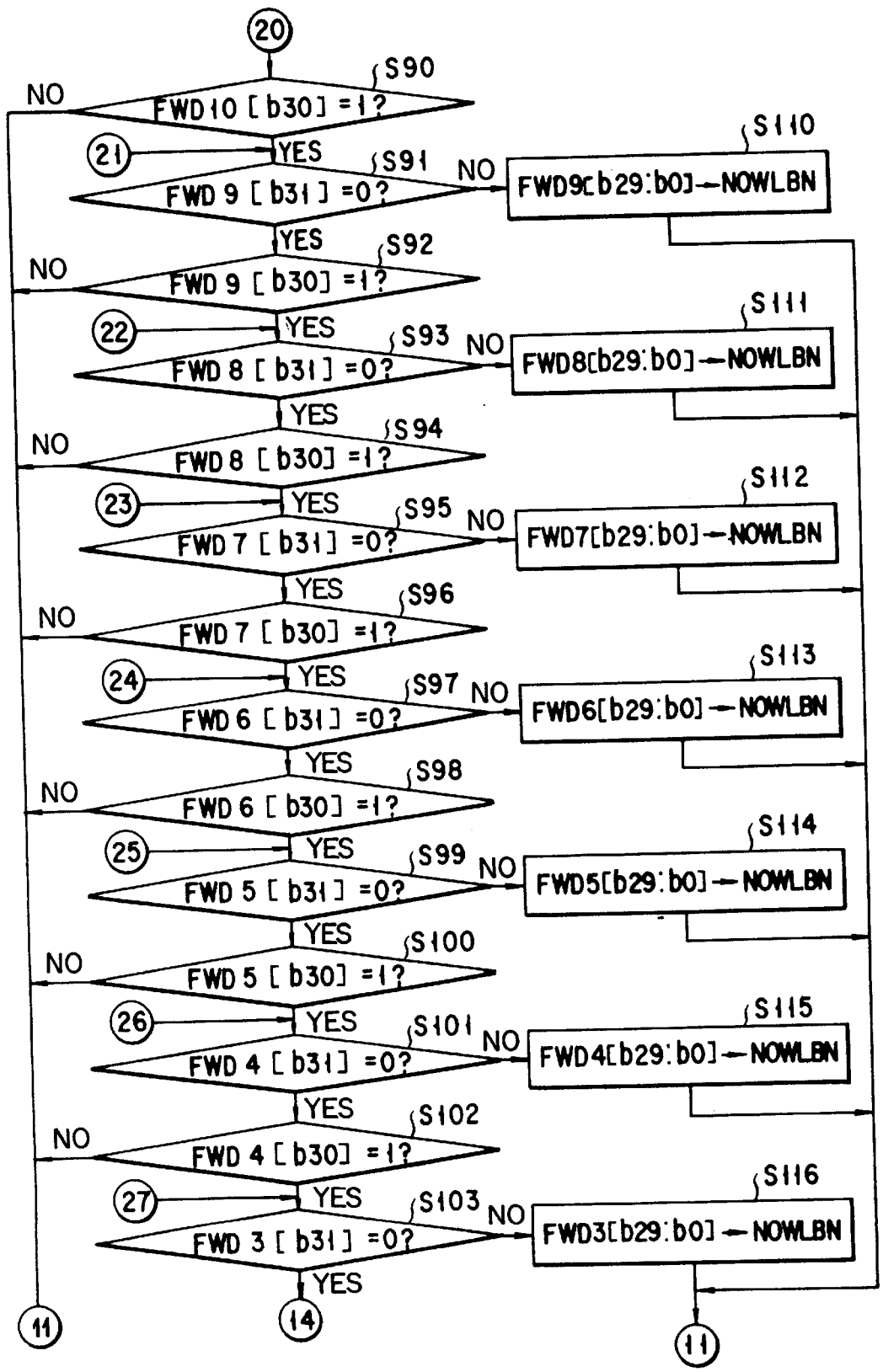

If there is no video data in the forward address (FWDA10) (FWDA10 [b31]=0) in step S65 of FIG. 42A, control will be advanced to step S90 shown in FIG. 42D. In step S90, it is checked whether there is video data in the range from forward address (FWDA1) to forward address (FWDA 1) (FWDA10 [b30]=1). If there is no video data in the range, control will go to step S124 shown in FIG. 42F.

If there is video data in the range (FWDA10 [b30]=1), it will be confirmed as shown in step S91 whether there is no video data in forward address 9 obtained by decrementing forward address 10 by 1 (FWDA9 [b31]=0). If there is video data in forward address 9 (FWDA9 [b31]=0), at step S110, the forward address (FWD9 [b29:b0]) will be set in the relative logical block (NOWLBN) to be searched for and control will be returned to step S67. If there is no video data in FWDA9 in step S91 (FWDA9 [b31]=0), it will be checked as shown in step S92 whether there is video data in the range from forward address (FWDA8) to forward address (FWDA1) (FWDA9 [b30]=1). If there is video data in the range (FWDA9 [b30]=1), steps S93 to 108 will be repeated. If there is no video data in the range, control will go to step S124. If there is video data in steps S93 to S108, control will be passed to any one of steps S111 to S119 that is similar to step S110.

Figures 42E, 42F:
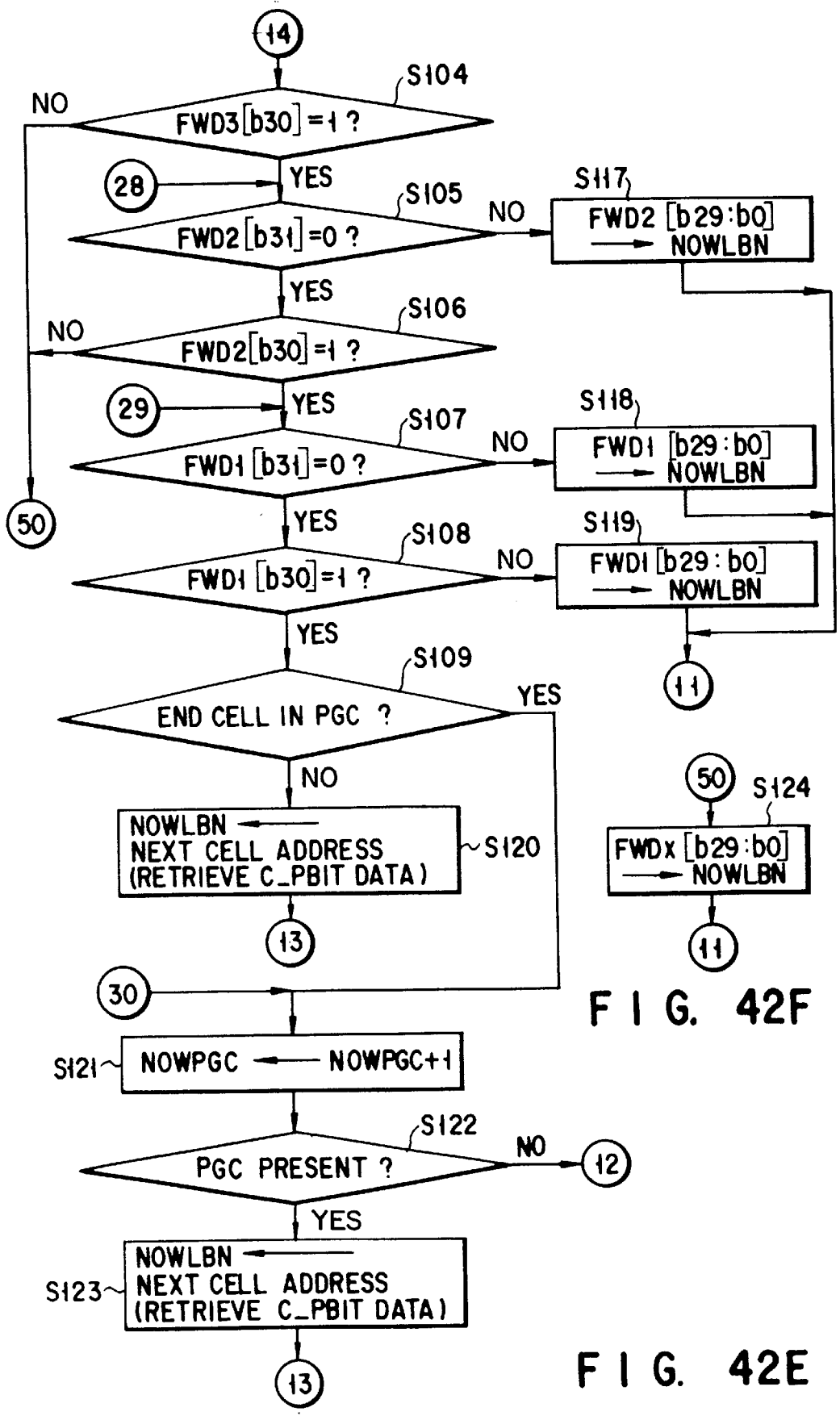

If it is found, in steps S90 to S106, that there is no video data, the control goes to step S124 shown in FIG. 42F. In step S124, the address (FWDX) is searched for. It should be noted that no video data of the video object unit is stored at this address (fWDx). Then, the control returns to step S67.

In step S109, it is checked whether the cell to which the video object unit (VOBU) containing the DSI belong is the end cell in the program chain. Specifically, on the basis of the cell playback information table (C_PBIT) of FIG. 21 to which the program chain information (VTS_PGCI) of FIG. 17 belongs, it will be checked whether the cell is the end cell. If the cell is found to be the end cell, as shown in step S121, a 1 will be added to the program chain number to which the cell to be searched for and the next program chain will be set. At step S122, it is confirmed whether there is a program chain corresponding to the set number. The presence/absence of the program chain is determined by referring to the PGCCI table search pointer (VTS_PGCIT_SRP) contained in the PGC information (VTS_PGCI) of FIG. 17. If the corresponding program chain does not exist at step S121, control will be passed to step S51 of FIG. 38. If the corresponding program chain exists, the entry cell of the program chain will be identified. Then, as shown in step S123, the address (C_FVOBU_SA) of the cell will be determined to be the logical block number to be searched for and control will be passed to step S57.

If at step S109, the cell the video object unit (VOBU) containing the DSI is not the end cell of the program chain, at step S120, the cell playback information table (C_PBIT) will be searched, the cell to be reproduced next be identified, the address of the cell be determined to be the logic block number to be searched for, and control will be passed to step S57.

The above high-speed searching operation has been explained with reference to the flowchart for an example of fast-forward. Because a backward action is also carried out by similarly referring to the addresses and flags shown in FIGS. 35A and 35C, its explanation will be omitted. Although in the fast-forward search, a method of decreasing the addresses is used in steps S90 to S108, a method of increasing the addresses may be used.

Figure 43:
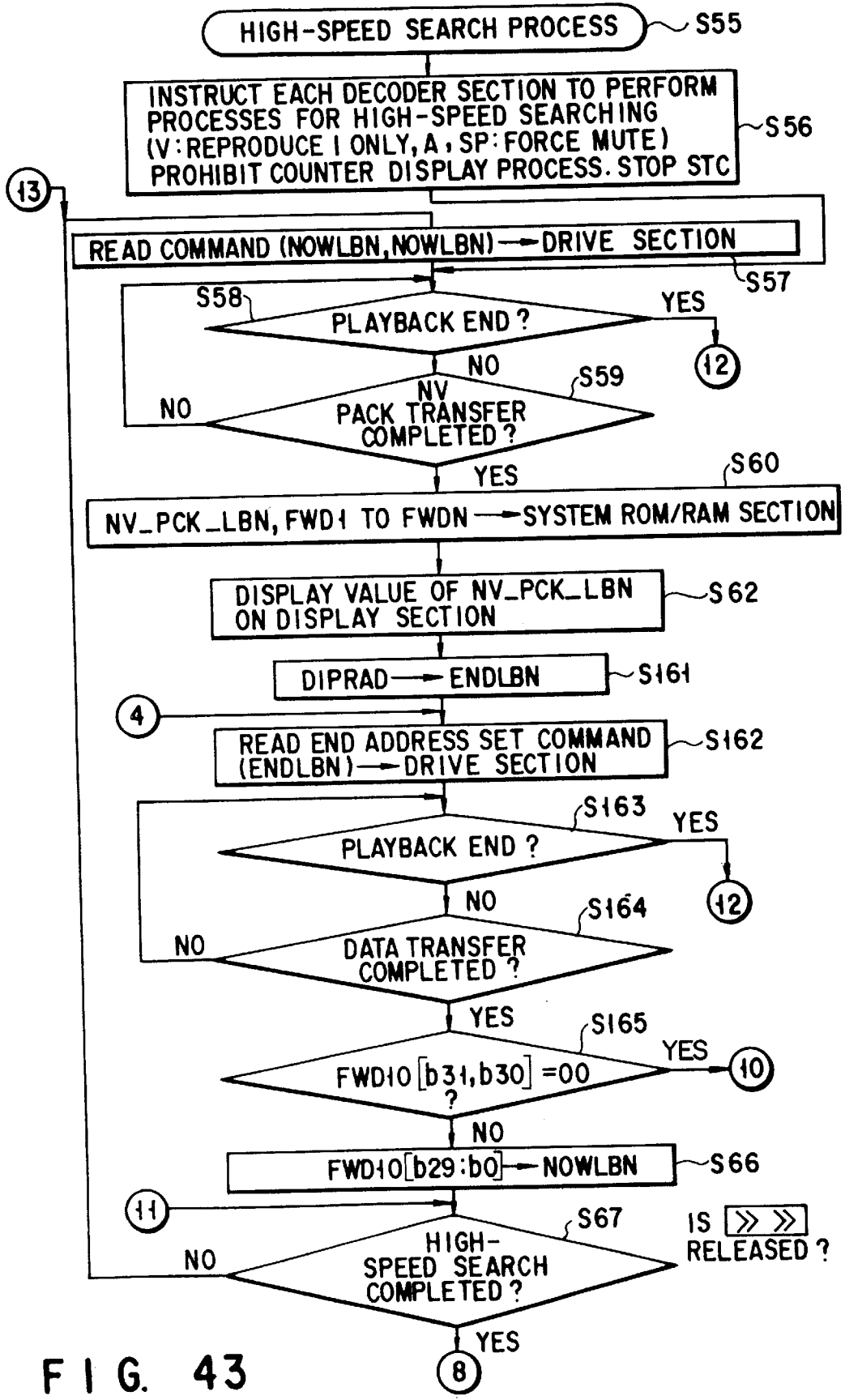
FIG. 43 is a flowchart of the procedure for another example of a high-speed search process of the video data on an optical disk having logic formats shown in FIGS. 4 to 36.

Next, another example of high-speed search will be described with reference to FIG. 43. In FIG. 43, the steps marked with the same symbols as those shown in FIGS. 42A to 42E indicate the same steps and explanation of them will not be given. At step S62 of FIG. 43, the value of the NAV pack SCR (NAV_PCK_SCR) is allowed to appear on the monitor 6 or the key/display section 4. From the displayed value, the user knows the time of the playback portion of the video presently being searched for. Thereafter, as shown in step 161, the address (VOBU_IP_EA) of the video pack in which the end data of the first I picture in the DSI of FIG. 32 is determined to be the address (ENDLBN) to be searched for. On the basis of the address, the video data is searched for and the video data for the I picture is acquired. After the address is retrieved, a read end command is given to the drive section 30 in step S162, causing the drive section to temporarily stop reading at the address. At step S164, it is checked whether the transfer of the data related to the I picture has been completed. If the transfer of the data has not been completed, the transfer of the data will be waited for. While the I picture is being displayed after the transfer of the data, it is confirmed whether video data exists in the location 10 addresses beyond the current address, that is, in address FWDA10 and whether video data exists between the current address and address FWDA10. If there is no video data (FWDA10 [b30,B30]=00), control will be passed to step S80 of FIG. 42C. If there is video data, at step S66, the forward address (FWDA10 [b29:0]) will be changed to the address to be searched for (NOWLBN). Thereafter, it is verified whether the high-speed search has finished, for example, whether the user has stopped pressing the FF button in the key/display section 4. If the high-speed search has not finished, step S57 will be started using the updated search address and steps S58 to S66 will be repeated. If the high-speed search has ended at step S67 of FIG. 42B, step S69 will be executed.

Figure 44:
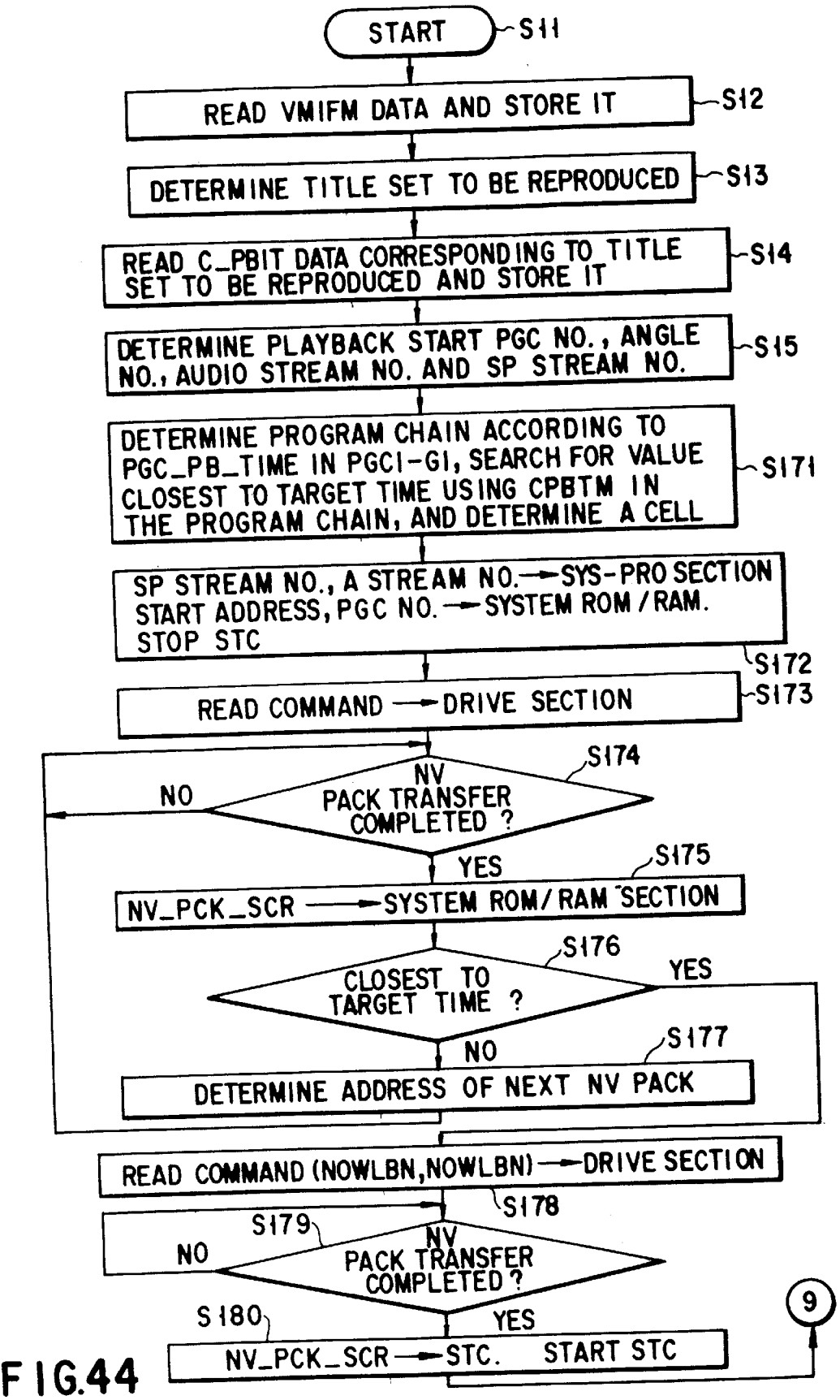
FIG. 44 is a flowchart of the procedure for reproducing the video data from an optical disk having logic formats shown in FIGS. 4 to 36, after a specific time has elapsed.

Furthermore, the operation of reproducing the video from the scene 30 minutes away from the start of playback will be explained with reference to FIG. 44. In FIG. 44, the flows marked with the same symbols and numerals as those in FIGS. 37A and 37B indicate the same operations and their explanation will be omitted. In the operation flow of FIG. 44, after steps S11 to S15 have been executed, at step S171, a program chain corresponding to a specific time later, for example, 30 minutes later, is determined using the program chain playback time (PG_PB_TIME) of FIG. 18. On the basis of the cell playback time (C_PBI) of FIG. 22 in the program chain, a value closest to the target time is decided and at the same time, a cell to be reproduced is determined. As shown in step S172, on the basis of the cell decision, the sub-picture stream number and the audio stream number are transferred to the system processor section 54, the start address and the program chain number are stored in the system ROM/RAM section 52, and the system time clock (STC) is stopped temporarily. Next, as shown in step S173, the main system CPU section 50 gives a read command to the drive section 30 to cause it to search for the cell to be retrieved.

In step S174, it is checked whether the NA pack in the first VOBU in the cell has been transferred. If the NAV pack has not been transferred, the transfer of the NAV pack will be waited for. If the NAV pack has been transferred, its SCR (NAV_PCK_SCR) is stored in the system ROM/RAM 52. In step S176, the system CPU section 50 determines whether or not the system ROM/RAM 52 stores the SCR (NAV_PCK_SCR) of the NAV pack 86 having the address immediately preceding the address of the NAV pack transferred. If No, the address of the next NAV pack is determined in step S177, for there is no object to compare. Then, the transfer of the NAV pack 86 of the next address is waited for.

When the next NAV pack 86 is transferred, it is checked in step S176 whether or not the SCR (NAV_PCK_SCR) of the NAV pack 86 transferred has passed the target time. If No in step S176, the address of the next NAV pack is determined in step S177, and the transfer of the NAV pack 86 of the next address is waited for. If Yes, in step S176, it is determined which one of the SCRs (NAV_PCK_SCR) stored in the system ROM/RAM 52 is the closest to the target time, but not passing over the target time. The address of the NAV pack having the SCR closest to the target time is stored into the system ROM/RAM 52. The control then goes to step S178, in which a read command at the address of this NAV pack is supplied to the drive section 30. In step S179, the transfer of the NAV pack is waited for. After the NAV pack has been transferred, the reference time SCR (NAV_PCK_SCR) in the NAV pack is set in the STC at step S180, which then starts to count the time. Thereafter, control is passed to step S21 of FIG. 37A, where playback is started at the retrieved cell.

Next, the video data in the logic formats shown in FIGS. 4 to 35C, a method of recording data on the optical disk 10 to reproduce the video data, and a recording system to which the recording method is applied will be explained with reference to FIGS. 45 to 50.

FIG. 45 shows an encoder system that creates a video file of a title set 84 in which the video data is encoded. In the system of FIG. 45, for example, a videotape recorder (VTR) 201, an audiotape recorder (ATR) 202, and a sub-picture source 203 are used as sources of the main video data, the audio data, and the sup-picture data. Under the control of a system controller (Sys con) 205, they create the main video data, audio data, and sup-picture data, which are supplied to a video encoder (VENC) 206, an audio encoder (AENC) 207, and a sub-picture encoder (SPENC) 208, respectively. Under the control of the system controller (Sys con) 205, these encoders 206, 207, and 208 perform A/D conversion of the main video data, audio data, and sup-picture data and encode them by the respective compression schemes. The encoded main video data, audio data, and sub-picture data (Comp Video, Comp Audio, Comp Sub-pict) are stored in memories 210, 211, and 212. The main video data, audio data, and sub-picture data (Comp Video, Comp Audio, Comp Sub-pict) are outputted to a file formatter (FFMT) 214 under the control of the system controller (Sys con) 205 which converts them so that they may have a file structure of video data for the system as explained earlier. Then, under the control of the system controller (Sys con) 205, the setting conditions for each data item and the management information including attributes are stored in a memory 216 in the form of files.

Explained next will be a standard flow of an encoding process in the system controller (Sys con) 205 that creates a file from video data.

Figure 46:
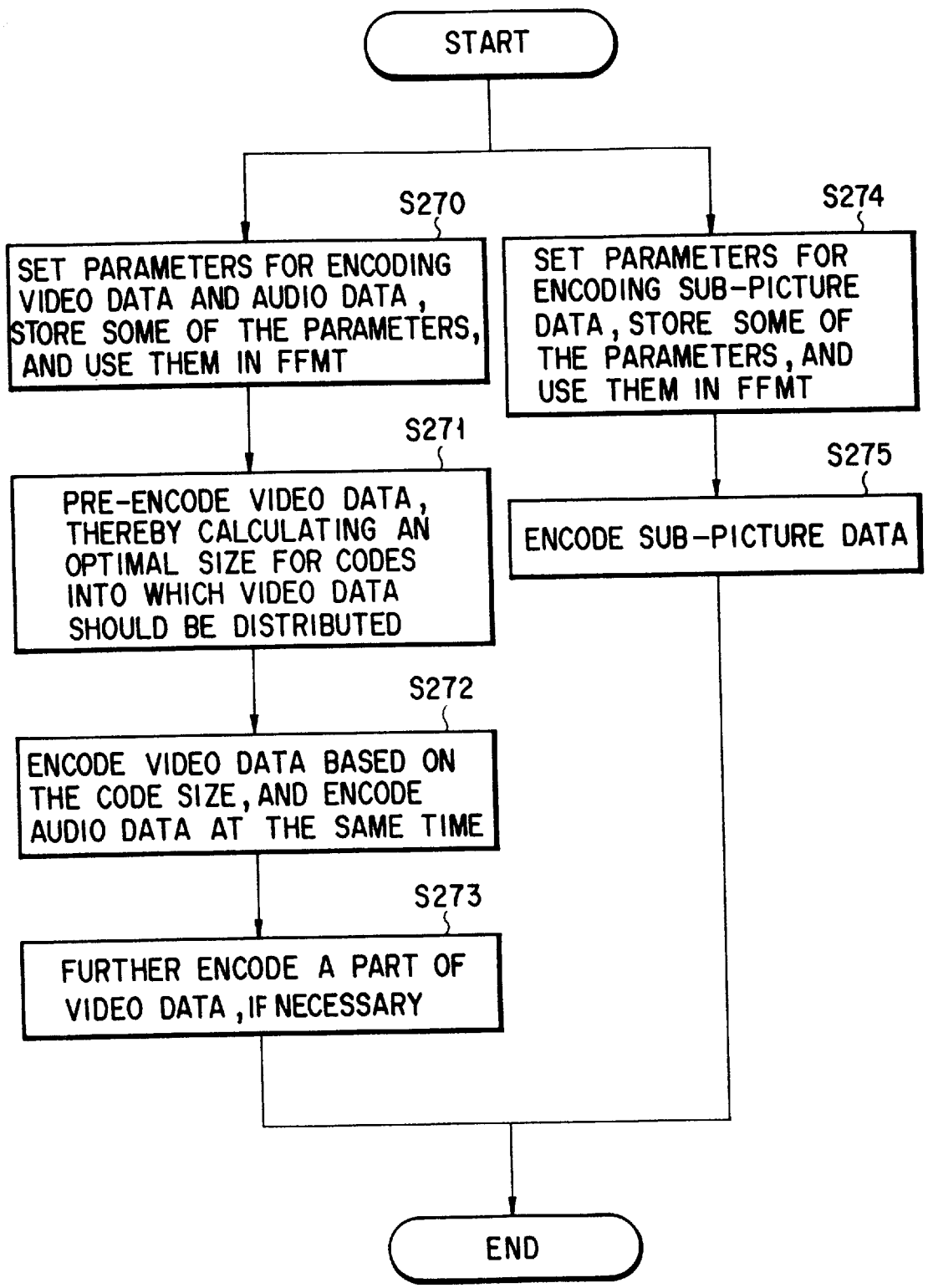
FIG. 46 is a flowchart for an encoding process of FIG. 45.

According to the flow of FIG. 46, the main video data and the audio data are encoded and the encoded main video data and audio data (Comp Video, Comp Audio) are supplied. Specifically, when the encoding process is started, as shown in step S270 of FIG. 46, the parameters necessary for encoding the main video data and audio data are set. Part of the set parameters are stored in the system controller (Sys con) 205 and at the same time, are used at the file formatter (FFMT) 214. As shown in step S271, the main video data is pre-encoded using the parameters and the optimum distribution of the amount of codes is calculated. Then, on the basis of the code amount distribution obtained in the pre-encoding, the main video data is encoded as shown in step S272. At the same time, the audio data is also encoded at step S272. As shown in step in S273, if necessary, the main video data is partially encoded again and the reencoded portion of the main video data is replaced with the old one. Through the series of steps, the main video data and audio data are encoded. Furthermore, as shown in steps S274 and S275, the sub-picture data is encoded and the encoded sub-picture data (Comp Sub-pict) is supplied. Namely, the parameters necessary for encoding the sub-picture data is set. As shown in step S274, part of the parameters are stored in the system controller (Sys con) 205 and used in the file formatter (FFMT) 214. On the basis of the parameters, the sub-picture data is encoded. By the process, the sub-picture data is encoded.

According to the flow of FIG. 47, the encoded main video data, audio data, and sup-picture data (Com Video, Com Audio, Comp Sub-pict) are combined and converted so as to form a video data title set structure as explained in FIGS. 4 and 12. Specifically, as shown in step S276, a cell is set as the smallest unit of the video data and cell playback information on a cell (C_PBI) is created. Then, as shown in step S277, the structure of the cells constituting a program chain and the main video, sub-picture, and audio attributes (the information obtained in encoding the respective data items are used part of these attributes) are set and the video title set information management table information (VTSI_MAT) 98 containing information on a program chain and a video title set time search map table (VTS_MAPT) 142 are created. At this time, as the need arises, a video title set direct access pointer table (VTS_DAPT) is also created.

The encoded main video data, audio data, and sup-picture data (Com Video, Comp Audio, Comp Sup-pict) are subdivided into specific packs. A NAV pack is placed at the head of each VOBU unit so that playback can be effected in the order of time code of each data item. With the NAV packs arranged this way, each data cell is positioned so that a video object (VOB) may be composed of a plurality of cells as shown in FIG. 6. A set of such video objects is formatted into the title set structure.

In the flow of FIG. 47, the program chain information (PGI) is obtained in the process of step S277 by using the database in the system controller (Sys con) 205 or entering data again as the need arises.

FIG. 48 shows a disk formatter system that records on an optical disk the title set formatted as described above. In the disk formatter system of FIG. 48, the memories 220, 222 in which the created title set is stored supply these file data items to a volume formatter (VFMT) 226. In the volume formatter (VFMT) 226 extracts the management information from the title sets 84, 86, produces a video manager 71, and creates the logic data to be recorded on the disk 10 in the arrangement of FIG. 4. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data to be recorded actually on the disk. Then, a recorder 232 records the modulated recording data on the disk 10.

A standard flow for creating the aforementioned disk will be described with reference to FIGS. 49 and 50. FIG. 49 shows the flow for creating the logic data to be recorded on the disk 10. Specifically, as shown in step S280, parameter data items, including the number of video data files, their arrangement, and the size of each video data file, are set first. Next, in step S281 video manger 71 is generated from the parameters set and the video title set information 281 of each video title set 72. In step S282, the video manager 71 and the video tile set 71 are arranged in the order mentioned, according to their logic block numbers, thereby generating logic data which is to be recorded on the disk 10.

Thereafter, the flow for creating the physical data to be recorded on the disk as shown in FIG. 50 is executed. Specifically, as shown in step S283, the logic data is divided into units of a specific number of bytes, thereby forming error correction data. Next, as shown in step S284, the logic data divided into units of a specific number of bytes are combined with the created error correction data to form physical sectors. Thereafter, as shown in step S285, physical data is created by combining physical sectors. In this way, the modulating process based on certain rules is performed on the physical data created in the flow of FIG. 50, thereby forming the recording data. Thereafter, the recording data is recorded on the disk 10.

Figure 51:
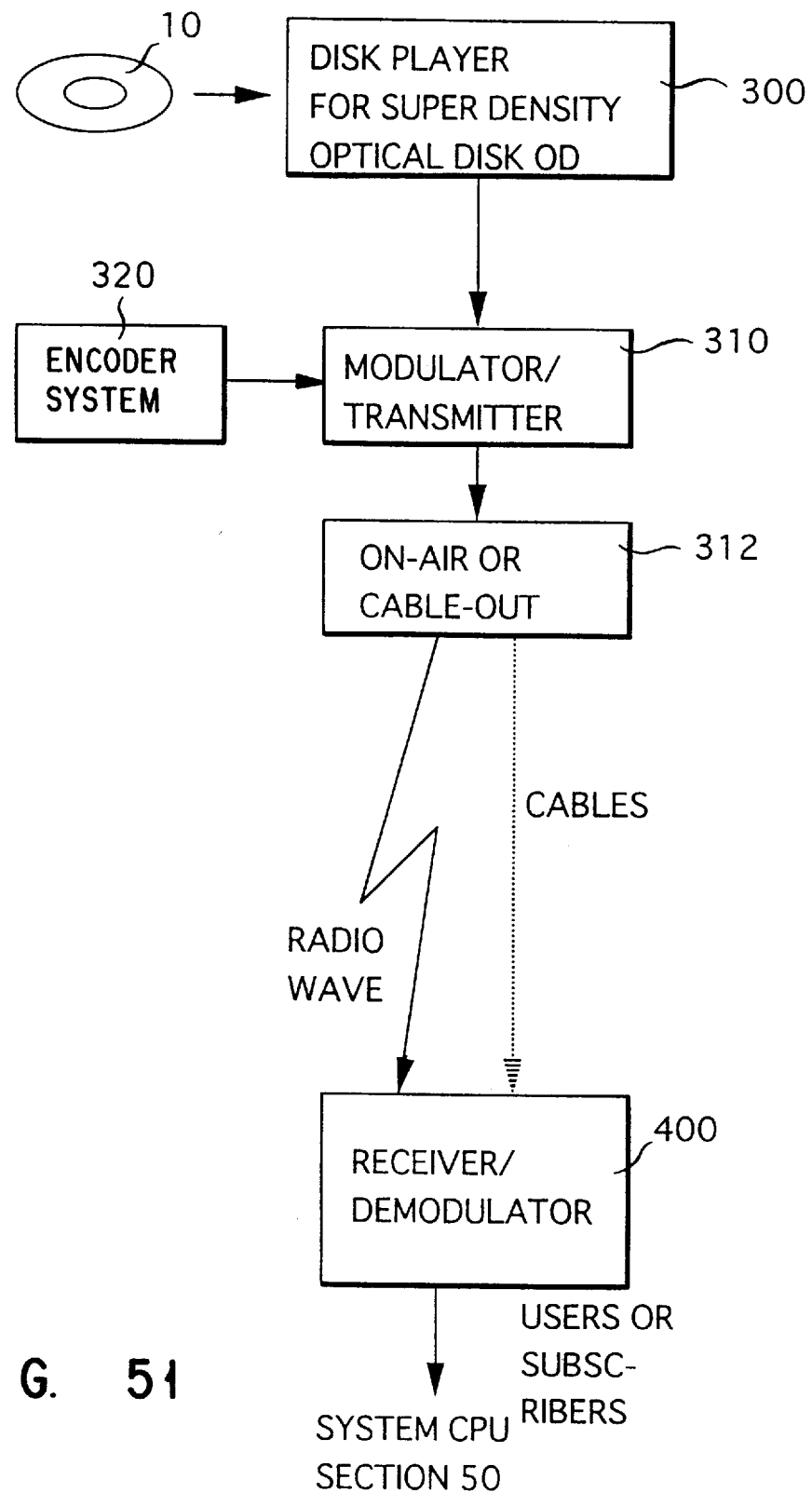
FIG. 51 is a schematic diagram of a system that transfers the video title set of FIG. 4 via a communication route.

The above-described data structure can be applied not only to a case where the data is recorded on recording mediums, such as optical disks, and then the disks are distributed to the users, but also to a communication system as shown in FIG. 51. Specifically, according to the procedure shown in FIGS. 45 to 48, an optical disk 10 in which a video manager 71 and video title set 72 as shown in FIG. 4 may be loaded into a reproducing unit 300, from whose system CPU section 50 the encoded data is taken out digitally and transmitted by a modulator/transmitter 310 to the users or the cable subscribers by radio or via a cable. Furthermore, the encoding system 320 shown in FIGS. 45 and 48 may create the data encoded on the provider side, such as a broadcasting station and the encoded data may be transmitted by the modulator/transmitter 310 to the users or the cable subscribers by radio or via a cable. In such a communication system, the information in the video manager 71 is modulated at the modulator/transmitter 310 and then supplied to or is directly supplied to the users free of charge. When a user is interested in the title, the modulator/transmitter 310 transmits the title set 72 at the user's or subscriber's request by radio or via a cable. Under the control of the video manager 71, the video title set information 94 is first transferred and then the title video object 95 in the video title set reproduced according to the title set information 94 is transferred. At this time, if necessary, the video title set menu video object 95 is also transmitted. The transferred data is received by a receiver/demodulator 400 on the user side and is processed as encoded data at the system CPU section 50 of the reproducing unit on the user or subscriber side of FIG. 1 in the same manner as in the above-described reproducing process, whereby the video data is reproduced.

In transferring the video title set 72, the video object sets 95, 96 are transferred using the video object unit 85 of FIG. 6 as a unit. At the head of the video object unit 85, an NAV pack 86 containing video playback and search information is arranged. Furthermore, because the NAV pack contains the addresses of the video object units to be reproduced immediately before and after the video object unit 85 to which the NAV pack 86 belongs, even if the video object unit 85 is lost during transfer for some reason, the video object can be reproduced reliably on the user side by requesting the lost video object unit 85 to be transmitted again. Furthermore, even if transfer is not carried out in the order of playback of video object units, because the system ROM/RAM section 52 on the user side holds the accurate playback information on program chains, the system CPU section 50 can specify the order of playback referring to the address data in its NAV pack.

While in the above explanation, the video object unit is a data train containing video data, audio data, and sub-picture data, the video object unit may be composed of audio packs only or sub-picture packs only, because the video object unit has only to contain any one of video data, audio data, and sub-picture data.

As described above, the information used to control the playback and search of the data packets of the video and audio data determined and compressed in the MPEG system layer 2 is stored in a navigation pack. The navigation pack is placed at the head of a playback data packet train in a specific range of time and on the basis of the navigation pack, data transfer is performed, which assures reliable playback. Because the addresses of other navigation packs are put in the navigation pack, it is possible to achieve the change of angle, the skip of pictures, and special playback including fast-forward playback and fast-backward playback. Furthermore, because in the communication system, too, the data is transferred on the basis of the navigation pack, reliable data transfer is assured.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A recording medium with navigation data, comprising:
    a plurality of data units to be played back time-sequentially and each to be reproduced within a specific period of time, the specific time period for each data unit being substantially equal, each data unit being composed of at least one predetermined sequence of data packs, each data pack having the same pack length, the sequence of data packs including at least one of video packs, audio packs and sub-picture packs, wherein each data pack includes a header and a packet of encoded video, audio or sub-picture data and a navigation pack placed at the head of the sequence,
    the navigation pack including a pack header, a first packet and a second packet,
    the first packet being composed of a packet header and first control information for storing presentation control information, which includes a start time and an end time of the presentation of the data unit, and
    the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flat indicating whether or not the data unit designated by each start address contains video data.

2. A recording medium according to claim 1, wherein said navigation pack contains address information indicating its own address.

3. A recording medium according to claim 1, wherein said navigation pack contains an end address for the data unit to which the navigation pack itself belongs.

4. A recording medium according to claim 1, wherein said navigation pack contains angle information indicating an address of the data unit related to an angle to which a current angle of the scene to be reproduced is to be switched.

5. A recording medium according to claim 4, wherein said angle information contains an item describing no data unit related to an angle to which the current angle is to be switched.

6. A recording medium according to claim 4, wherein said angle information contains information indicating addresses of the data units to be reproduced later than the data unit to which the navigation pack belongs.

7. A recording medium according to claim 4, wherein said angle information contains the addresses of the data units to be reproduced earlier than the data unit to which the navigation pack belongs.

8. A recording medium according to claim 1, wherein said navigation pack contains end address information indicating an end address of the data unit containing the navigation pack.

9. A recording medium according to claim 1, wherein, when said data unit contains the video data determined in MPEG, said navigation pack contains end address information indicating the address in the data unit in which the minimum data capable of forming an image of I picture is stored.

10. A recording medium according to claim 1, wherein, when said data unit contains video data and at least one of audio data and sub-picture data, said navigation pack contains synchronizing information on at least one of the audio data and sub-picture data reproduced in synchronization with the video data.

11. A recording medium according to claim 1, wherein said navigation pack contains reproduction information describing addresses of 15 data units to be reproduced before and addresses of 15 data units to be reproduced after a data unit to which said navigation pack belongs, and also describing addresses of 20th, 30th, 60th, 120th, and 240th data units, said data unit to which said navigation pack belongs being a 0th data unit.

12. The recording medium of claim 1, wherein:
    the navigation pack contains search information consecutively indicating the addresses of a specified number of data units to be searched for consecutively before and after the address of the navigation unit, and the data units are searched for with reference to the addresses,
    wherein the search information contains a flag indicating whether the data unit to be searched for contains video data, and a flag indicating whether there is video data in the data units between the address of the data unit to be searched for and the address of the navigation data.

13. A recording medium according to claim 1, wherein said recording medium contains a plurality of cell data items, where the data units to be time-sequentially made playback objects are stored in each cell data item, one data unit for one cell data item.

14. A recording medium according to claim 13, wherein said recording medium contains a table in which a playback program is written to define the playback sequence of said cell data items.

15. A recording medium according to claim 14, wherein said recording medium contains a table in which a plurality of programs are written defining the playback sequence of said cell data items and program chain information indicating a relationship between the plurality of programs and performing playback in various modes.

16. A method of reproducing playback data containing navigation data, comprising:
    receiving playback data comprising a plurality of data units to be played back time-sequentially and each to be reproduced within a specified period of time, the specific time period for each data unit being substantially equal, each data unit being composed of at least packs, wherein each data pack includes, a header and a packet of encoded video, audio or sub-picture data, and a navigation pack placed at the bead of the sequence,
    the navigation pack including a pack header, a first packet and a second packet
    the first packet being composed of a packet header and first control information for storing presentation control information, which includes a start time and an end time of the presentation of the data unit, and
    the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address contains video data;
    converting at least one of the data units into a playback signal with reference to the presentation control information and the data search information; and
    reproducing the playback signal.

17. A method according to claim 16, wherein said navigation pack contains address information indicating its own address.

18. A method according to claim 16, wherein said navigation pack contains an end address for the data unit to which the navigation pack itself belongs.

19. A method according to claim 16, wherein said navigation pack contains angle information indicating an address of the data unit related to an angle to which a current angle of the scene to be reproduced is to be switched, where the angle is switched with the reference to the address at the time of angle change.

20. A method according to claim 19, wherein said angle information contains an item describing no data unit related to an angle to which the current angle is to be switched.

21. A method according to claim 19, wherein said angle information contains information indicating addresses of the data units to be reproduced later than the data unit to which the navigation pack belongs, where the data units are obtained with reference to the addresses and the playback signal undergoes rewind playback.

22. A method according to claim 19, wherein said angle information contains the addresses of the data units to be reproduced earlier than the data unit to which the navigation pack belongs, where the data units are obtained with reference to the addresses so that the playback signal undergoes fast-forward playback.

23. A method according to claim 16, wherein said navigation pack contains end address information indicating an end address of the data unit containing the navigation pack, and the next data unit is acquired with reference to the end address.

24. A method according to claim 16, wherein, when said data unit contains the video data determined in MPEG, said navigation pack contains end address information indicating the address in the data unit in which the minimum data capable of forming an image of I picture is stored, and the minimum data to reproduce the I picture is acquired with reference to the address.

25. A method according to claim 16, wherein, when said data unit contains video data and at least one of audio data and sub-picture data, said navigation pack contains synchronizing information on the at least one audio data and sub-picture data to be reproduced in synchronization with the video data, and at least one of the audio data and the sub-picture data, together with the video data, is reproduced with reference to the synchronizing information.

26. A method according to claim 16, wherein said navigation pack contains reproduction information describing addresses of 15 data units to be reproduced before and addresses of 15 data units to be reproduced after a data unit to which said navigation pack belongs, and also describing addresses of 20th, 60th, 120th, and 240th data units, said data unit to which said navigation pack belongs being a 0th data unit.

27. The method of claim 16, wherein:
the navigation pack contains search information consecutively indicating the addresses of a specified number of data units to be searched for consecutively before and after the address of the navigation unit, and the data units are searched for with reference to the addresses,
wherein the search information contains a flag indicating whether the data unit to be searched for contains video data, and a flag indicating whether there is video data in the data units between the address of the data unit to be searched for and the address of the navigation data.

28. A method according to claim 16, wherein said playback data contains a plurality of cell data items, where the data units to be time-sequentially made playback objects are stored in each cell data item, one data unit for one cell data item, a program being reproduced with reference to the cell data items.

29. A method according to claim 16, wherein said playback data contains a table in which a playback program is written to define a playback sequence of said cell data items.

30. A method according to claim 16, wherein said playback data contains a table in which a plurality of programs are written defining a playback sequence of said cell data items and program chain information indicating a relationship between the plurality of programs and performing playback in various modes.

31. An apparatus for reproducing playback data containing navigation data, comprising:
means for retrieving, from a recording medium, playback data comprising a plurality of data units to be played back time-sequentially and each to be reproduced within a specific period of time, the specific time period for each data unit being substantially equal, each data unit comprising at least one predetermined sequence of data packs, each data pack having the same pack length, the sequence of data packs including at least one of video packs, audio packs and sub-picture packs, wherein each data pack includes a header and a packet of encoded video, audio or sub-picture data, and a navigation pack placed at the head of the sequence,
the navigation pack including a pack header, a first packet and a second packet,
the first packet being composed of a packet header and first control information for storing presentation control information, which includes a start time and an end time of the presentation of the data unit, and
the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address contains video data; and
means for converting the data unit into a playback signal with reference to the presentation control information and the data search information in the retrieved playback data and for reproducing the playback signal.

32. An apparatus according to claim 31, wherein said navigation pack contains address information indicating its own address.

33. An apparatus according to claim 31, wherein said navigation pack contains end address for the data unit to which the navigation pack itself belongs.

34. An apparatus according to claim 31, wherein said navigation pack contains angle information indicating an address of the data unit related to an angle to which a current angle of the scene to be reproduced is switched, wherein the angle is switched with reference to the address at the time of angle change.

35. An apparatus according to claim 34, wherein said angle information contains an item describing no data unit related to an angle to which the current angle is switched.

36. An apparatus according to claim 34, wherein said angle information contains information on the addresses of the data units to be reproduced later than the data unit to which the navigation pack belongs, where the data units are obtained with reference to the addresses so that the playback signal undergoes rewind playback.

37. An apparatus according to claim 34, wherein said angle information contains the addresses of the data units to be reproduced earlier than the data unit to which the navigation pack belongs, where the data units are obtained with reference to the addresses so that the playback signal undergoes fast-forward playback.

38. An apparatus according to claim 31, wherein said navigation pack contains end address information indicating an end address of the data unit containing the navigation pack, where a next data unit is acquired with reference to the end address.

39. An apparatus according to claim 31, wherein, when said data unit contains the video data determined in MPEG, said navigation pack contains end address information indicating the address in the data unit in which the minimum data capable of forming an image of I picture is stored.

40. An apparatus according to claim 31, wherein, when said data unit contains video data and at least one of audio data and sub-picture data, said navigation pack contains synchronizing information on at least one of the audio data and sub-picture data reproduced in synchronization with the video data, and at least either the audio data or the sub-picture data, together with the video data, is reproduced with reference to the synchronizing information.

41. An apparatus according to claim 31, wherein said navigation pack contains search information consecutively indicating the addresses of a specified number of data units to be searched for consecutively before and after the address of the navigation unit, and the data units are searched for with reference to the addresses.

42. An apparatus according to claim 41, wherein said search information contains a flag indicating whether there is video data in the data units between the address of the data unit to be searched for and the address of the navigation data.

43. An apparatus according to claim 31, wherein said playback data contains a plurality of cell data items, where the data units to be time-sequentially made playback objects are stored in each cell data item, one data unit for one cell data item, a program being reproduced with reference to the cell data items.

44. An apparatus according to claim 31, wherein said playback data contains a table in which a playback program is written to define a playback sequence of said cell data items.

45. An apparatus according to claim 44, wherein said playback data contains a table in which a plurality of programs are written defining a playback sequence of said cell data items and program chain information indicating a relationship between the plurality of programs and performing a playback in various modes.

46. A method of recording playback data containing navigation data on a recording medium, comprising:

preparing at least one predetermined sequence of data packs, each data pack having the same pack length, the sequence of data packs including at least one of video packs, audio packs and sub-picture packs, wherein each data pack includes a header and a packet of encoded video audio or sub-picture data;

preparing a plurality of data units, each of which is composed of a sequence of data packs that is to be reproduced within a specific period of time, the specific time period for each data unit being substantially equal, and a navigation pack provided at the head of the sequence, the navigation pack including a pack header, a first packet and a second packet the first packet being composed of a packet header and first control information for storing presentation control information, which includes a start time and an end time of the presentation of the data unit, and the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address contains video data; and recording the data units time-sequentially on a recording medium so that the data units can be reproduced.

47. A method according to claim 46, wherein said navigation pack contains address information indicating its own address.

48. A method according to claim 46, wherein said navigation pack contains an end address for the data unit to which the navigation pack itself belongs.

49. A method according to claim 46, wherein said navigation pack contains angle information indicating an address of the data unit related to an angle to which a current angle of the scene to be reproduced is to be switched.

50. A method according to claim 49, wherein said angle information contains an item describing no data unit related to an angle to which the current angle is to be switched.

51. A method according to claim 49, wherein said angle information contains information indicating addresses of the data units to be reproduced later than the data unit to which the navigation pack belongs.

52. A method according to claim 49, wherein said angle information contains the addresses of the data units to be reproduced earlier than the data unit to which the navigation pack belongs.

53. A method according to claim 46, wherein said navigation pack contains end address information indicating an end address of the data unit containing the navigation pack.

54. A method according to claim 46, wherein, when said data unit contains the video data determined in MPEG, said navigation pack contains end address information indicating the address in the data unit in which the minimum data capable of forming an image of I picture is stored.

55. A method according to claim 46, wherein, when said data unit contains video data and at least one of audio data and sub-picture data, said navigation pack contains synchronizing information on at least one of the audio data and sub-picture data reproduced in synchronization with the video data.

56. A method according to claim 46, wherein said navigation pack contains reproduction information describing addresses of 15 data units to be reproduced before and addresses of 15 data units to be reproduced after a data unit to which said navigation pack belongs, and also describing addresses of 20th, 60th, 120th, and 240th data units, said data unit to which said navigation pack belongs being a 0th data unit.

57. A method according to claim 46, wherein the step of recording data on said recording medium contains the step of recording data in units of a plurality of cell data items where the data units to be time-sequentially made playback objects are stored in each cell data item, one data unit for one cell data item.

58. A method according to claim 57, further including the step of creating a table in which a playback program is written defining a playback sequence of said cells, wherein the cell table is recorded on the recording medium in the recording step.

59. A method according to claim 57, further including the step of creating a table in which a plurality of programs are written defining a playback sequence of said cell data items, and the steps of creating program chain information indicating a relationship between the plurality of programs and performing playback in various modes, wherein the program chain information is recorded on the recording medium in the recording step.

60. An apparatus for recording on a recording medium playback data containing navigation data, comprising:

means for generating at least one predetermined sequence of data packs, each data pack having the same pack length, the sequence of data packs including at least one of video packs, audio packs and sub-picture packs, wherein each data pack includes a header and a packet of encoded video, audio or sub-picture data; means for preparing a plurality of data units, each data unit being composed of a sequence of data packs that is to be reproduced within a specified period of time, the specific time period for each data unit being substantially equal, and a navigation pack provided at the head of the sequence, the navigation pack including a pack header a first packet and a second packet, the first packet being composed of a packet header and first control information for storing presentation control information, which includes a start time and an end time of the presentation of the data unit, and the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address contains video data; and means for recording said data units time-sequentially on the recording medium so that said data units can be reproduced.

61. An apparatus according to claim 60, wherein said navigation pack contains an end address for the data unit to which the navigation pack itself belongs.

62. An apparatus according to claim 60, wherein said navigation pack contains angle information indicating an address of the data unit related to an angle to which a current angle of the scene to be reproduced is to be switched.

63. An apparatus according to claim 62, wherein said angle information contains an item describing no data unit related to an angle to which the current angle is to be switched.

64. An apparatus according to claim 62, wherein said angle information contains information indicating addresses of the data units to be reproduced later than the data unit to which the navigation pack belongs.

65. An apparatus according to claim 62, wherein said angle information contains the addresses of the data units to be reproduced earlier than the data unit to which the navigation pack belongs.

66. An apparatus according to claim 60, wherein said navigation pack contains end address information indicating an end address of the data unit containing the navigation pack.

67. An apparatus according to claim 60, wherein, when said data unit contains the video data determined in MPEG, said navigation pack contains end address information indicating the address in the data unit in which the minimum data capable of forming an image of I picture is stored.

68. An apparatus according to claim 60, wherein, when said data unit contains video data and at least one of audio data and sub-picture data, said navigation pack contains synchronizing information on at least one of the audio data and sub-picture data reproduced in synchronization with the video data.

69. An apparatus according to claim 60, wherein said navigation pack contains reproduction information describing addresses of 15 data units to be reproduced before and addresses of 15 data units to be reproduced after a data unit to which said navigation pack belongs, and also describing addresses of 20th, 60th, 120th, and 240th data units, said data unit to which said navigation pack belongs being a 0th data unit.

70. The apparatus of claim 60, wherein;

the navigation pack contains search information consecutively indicating the addresses of a specified number of data units to be searched for consecutively before and after the address of the navigation unit, the search information containing a flag indicating whether there is video data in the data units between the address of the unit to be searched for and the address of the navigation data.

71. An apparatus according to claim 60, wherein said means for recording data on said recording medium records data in units of a plurality of cell data items, where the data units to be time-sequentially made playback objects are stored in each cell data item, one data unit for one cell data item.

72. An apparatus according to claim 71, further comprising means for creating a table in which a playback program is written defining the playback sequence of said cells, wherein the cell table is recorded by the recording means on the recording medium.

73. An apparatus according to claim 60, further comprising:

means for creating a table in which a plurality of programs are written defining the playback sequence of said cells; and means for creating program chain information indicating the way of combining the plurality of playback programs and performing playback in various modes, wherein the program chain information is recorded by the recording means on the recording medium.

74. A communication system for transferring playback data containing navigation data, comprising:

means for creating playback data comprising a plurality of data units to be played back time-sequentially and each to be reproduced within a specific period of time, the specific time period for each data unit being substantially equal, each data unit being composed of at least one predetermined sequence of data packs, each data pack having the same pack length, the sequence of data packs including at least one of video packs, audio packs and sub-picture packs, wherein each data pack includes a header and a packet of encoded video, audio or sub-picture data, and a navigation pack placed at the head of the sequence, the navigation pack including a pack header, a first packet and a second packet, the first packet being composed of a packet header and first control information for storing presentation control information, which includes a start time and an end time of the presentation of the data unit, and the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address contains video data;

means for transferring the data units;

means for converting at least one of the data units into a playback signal with reference to the presentation control information and data search information; and means for reproducing the playback signal.

75. A communication system according to claim 74, wherein said navigation pack contains address information indicating its own address.

76. A communication system according to claim 74, wherein said navigation pack contains an end address for the data unit to which the navigation pack itself belongs.

77. A communication system according to claim 74, wherein said navigation pack contains angle information indicating an address of the data unit related to an angle to which the current angle of the scene to be reproduced is switched, where the angle is switched with reference to the address at the time of angle change.

78. A communication system according to claim 77, wherein said angle information contains a specific description indicating the existence of no data unit related to an angle to which the current angle is switched.

79. A communication system according to claim 77, wherein said angle information contains information indicating addresses of the data units to be reproduced later than the data unit to which the navigation pack belongs, so that the data units are obtained with reference to the addresses and the playback signal undergoes rewind playback.

80. A communication system according to claim 77, wherein said angle information contains the addresses of the data units to be reproduced earlier than the data unit to which the navigation pack belongs, where the data units are obtained with reference to the addresses and the playback signal undergoes fast-forward playback at the playback means.

81. A communication system according to claim 74, wherein said navigation pack contains end address information indicating end address of the data unit containing the navigation pack, where the next data unit is acquired with reference to the end address.

82. A communication system according to claim 74, wherein said navigation pack, when said data unit contains the video data determined in MPEG, said navigation pack contains end address information indicating the address in the data unit in which the minimum data capable of forming an image of I picture is stored, and the minimum data to reproduce the I picture is acquired with reference to the address.

83. A communication system according to claim 74, wherein, when said data unit contains video data and at least one of audio data and sub-picture data, said navigation pack contains synchronization information on the at least one audio data and sub-picture data to be reproduced in synchronization with the video data, where the at least one audio data and sub-picture data is reproduced, together with the video data, with reference to the synchronizing information.

84. A communication system according to claim 74, wherein said navigation pack contains reproduction information describing addresses of 15 data units to be reproduced before and addresses of 15 data units to be reproduced after a data unit to which said navigation pack belongs, and also describing addresses of 20th, 60th, 120th, and 240th data units, said data unit to which said navigation pack belongs being a 0th data unit.

85. the communication system of claim 74, wherein:

the navigation pack contains search information consecutively indicating the addresses of a specified number of data units to be searched for consecutively before and after the address of the navigation unit, and the data units are searched for with reference to the addresses, the search information containing a flag indicating whether there is video data in the data units between the address of the data unit to be searched for and the address of the navigation data.

86. A communication system according to claim 74, wherein said playback data contains a plurality of cell data items, where the data units to be time-sequentially made playback objects are stored in each cell data item, one data unit for one cell data item, where the transferring means transfers the cell data items, and where the reproducing means reproduces a program from the cell data items.

87. A communication system according to claim 74, wherein said playback data contains a table in which a playback program is written defining a playback sequence of said cell data items.

88. A communication system according to claim 74, wherein said playback data contains a table in which a plurality of programs are written defining a playback sequence of cell data items and program chain information indicating a relationship between the plurality of programs and performing playback in various modes.

89. A recording medium with navigation data comprising:

a plurality of data cells whose playback sequence can be specified and which are to be played back consecutively and time-sequentially, each data cell being composed of a plurality of data units, each data unit being reproduced within a specific period of time, the specific time period for each data unit being substantially equal, each data unit including at least one predetermined sequence of data packs, each data pack having the sane pack length, the sequence of data packs including at least one of video packs, audio packs and sub-picture packs, wherein each data pack includes a header and a packet of encoded video, audio or sub-picture data, and a navigation pack placed at the head of the sequence, the navigation pack including a pack header, a first packet and a second packet, the first packet being composed of a packet header and first control information for storing presentation control information, which includes a start time and an end time of the presentation of the data unit, and the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address Contains video data; and a table second playback information is written concerning playback of each data cell.

90. A recording medium according to claim 89, wherein said second playback information contains an address of the first data unit in each data cell.

91. A recording medium according to claim 89, wherein second playback information contains an address of the end data unit in each data cell.

92. A recording medium according to claim 89, wherein said second playback information contains the playback time of the data cell.

93. A recording medium according to claim 89, wherein said second playback information is written on said table according the an order in which the data cells are to be reproduced.

94. A recording medium according to claim 89, wherein said data cells are assigned identification numbers.

95. A recording medium according to claim 89, wherein said navigation pack contains information on the time when the data unit containing the navigation pack is to be reproduced.

96. A method of reproducing playback data containing navigation data, comprising:

acquiring contents of a table that includes first playback information indicating playback information for data cells; and playing back the data cells based on contents of the table and converting information from the data cells into playback signals, the data cells being played back consecutively and time-sequentially, each data cell being composed of a plurality of data units to be reproduced within a specified period of time, the specific time period for each data unit being substantially equal, each data unit including at least one predetermined sequence of data packs, each data pack having the same pack length, the sequence of data packs including at least one of video packs, audio packs and sub-picture packs, wherein each data pack includes a header and a packet of encoded video, audio or sub-picture data, and a navigation pack placed at the head of the sequence, the navigation pack including a pack header, a first packet and a second packet, the first packet being composed of a packet header and first control information for storing presentation control information, which includes a start time and an end time of the presentation of the data unit, and the second packet being composed of a packet header and second control information for storing data search information, which includes a list of start addresses of a number of data units forward and backward in playback order of the sequence, each listed start address expressed as a start address relative from the start address of the respective data unit to which the navigation data pack belongs, and a flag indicating whether or not the data unit designated by each start address contains video data.

97. A method according to claim 96, wherein said first playback information contains an address of a first data unit in each data cell.

98. A method according to claim 96, wherein said first playback information contains the address of a last data unit in each data cell.

99. A method according to claim 96, wherein said playback information contains the playback time of the data cell.

100. A method according to claim 96, wherein said acquiring step contains the step of transferring the data cell to be reproduced after a certain time has elapsed with reference to said playback time.

101. A method according to claim 96, wherein said first playback information is written on said table according to an order in which the data cells are to be reproduced.

102. A method according to claim 96, wherein said data cells are assigned identification numbers.

103. A method according to claim 96, wherein said navigation pack contains information indicating a time when the data unit containing the navigation pack is to be reproduced, and said acquiring step contains the step of transferring the data cell to be reproduced after a certain time has elapsed with reference to the playback time of said data cell and the time information on the data unit.

104. A method according to claim 103, wherein said acquiring step includes a step of indicating a playback time and determining an address of a data unit which is to be reproduced at the indicated time.

105. An apparatus for reproducing data from a recording medium with navigation data, comprising:

means for receiving playback information from said recording medium and for storing second playback information, where the recording medium contains:

a plurality of data cells whose playback sequence can be specified and which are to be played back consecutively and time-sequentially, each data cell being composed of a plurality of data units, each data unit being reproduced within a specific period of time, the specific time period for each data unit being substantially equal, each data unit including at least one predetermined sequence of data packs, each data pack having the same pack length, the sequence of data packs including at least one of video packs, audio packs and sub-picture packs, wherein each data pack includes a header and a packet of encoded video, audio or sub-picture data, and a navigation pack placed at the head of the sequence the navigation pack including a pack header, a first packet and a second packet, the first packet being composed of a packet header and first control information for storing presentation control information, which includes a start time and an end time of the presentation of the data unit, and the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address contains video data, and a table in which the second playback information is written concerning playback of each data cell;

means for converting the playback information from the data cell into playback signals; and means for transferring the playback information from the data cells to the converting means with reference to the stored playback information.

106. An apparatus according to claim 105, wherein said playback information contains an address of a first data unit in each data cell.

107. An apparatus according to claim 105, wherein said second playback information contains an address of a last data unit in each data cell.

108. An apparatus according to claim 105, wherein said second playback information contains a playback time of the data cell.

109. An apparatus according to claim 105, wherein said transferring means transfers the data cell to be reproduced to the converting means after a certain time has elapsed with reference to said playback time.

110. An apparatus according to claim 105, wherein said second playback information is written on said table according to an order in which the data cells are to be reproduced.

111. An apparatus according to claim 105, wherein said data cells are assigned identification numbers.

112. An apparatus according to claim 105, wherein said playback information contains the playback time of the data cell, said navigation pack contains information indicating a time when the data unit containing the navigation pack is to be reproduced, and said transferring means transfers the data cell to be reproduced to the converting means after a specific time has elapsed with reference to the playback time of said cell and the time information on the data unit.

113. A method according to claim 105, wherein said acquiring step includes a step of indicating a playback time and determining an address of a data unite which is playbacks at the indicated time.

114. A method of recording playback data containing navigation data on a recording medium, comprising:
preparing at least one predetermined sequence of data packs, each data pack having the same pack length, the sequence of data packs including at least one of video packs, audio packs and sub-picture packs, wherein each data pack includes a header and a packet of encoded video, audio or sub-picture data, a navigation pack being placed at the head of each predetermined sequence
the navigation pack including a pack header, a first packet and a second packet,
the first packet being composed of a packet header and first control information for storing presentation control information, which includes a start time and an end time of the presentation of the data unit, and
the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address contains video data;
preparing a plurality of data units, each of which is composed of at least one data pack train, each data unit to be reproduced within a certain period of time;
collecting the plurality of data units to be reproduced time-sequentially and creating a plurality of data cells whose playback sequence can be specified;
creating a table in which second playback information is written concerning playback of each data cell; and
recording on the recording medium the plurality of data cells and the table, the data cells being recorded immediately after the table.

115. A method according to claim 114, wherein said second playback information contains an address of a first data unit in each data cell.

116. A method according to claim 114, wherein said second playback information contains an address of a last data unit in each data cell.

117. A method according to claim 114, wherein said second playback information contains a playback time of the data cell.

118. A method according to claim 114, wherein said second playback information is written on said table according to an order in which the data cells are to be reproduced.

119. A method according to claim 114, wherein said data cells are assigned identification numbers.

120. A method according to claim 114, wherein said navigation pack contains information on a time when the data unit containing the navigation pack is reproduced, and said transferring means transfers the data cell to be reproduced to the converting means after a specific time has elapsed with reference to the playback time.

121. An apparatus for recording playback data containing navigation data on a recording medium, comprising:
means for creating at least one predetermined sequence of data packs, each data pack having the same pack length, the sequence of data packs including at least one of video packs, audio packs and sub-picture packs, wherein each data pack includes a header and a packet of encoded video audio or sub-picture data;
means for preparing a plurality of data units, each data unit being composed of a sequence of data packs and a navigation pack, each data unit to be reproduced within a certain period of time, the navigation pack located at a head of the sequence,
the navigation pack including a pack header, a first packet and a second packet,
the first packet being composed of a packet header and first control information for storing presentation control information, which includes a start time and an end time of the presentation of the data unit, and
the second packet being composed of a packet header and second control information for storing data search information, which includes a list of start addresses of a number of data units forward and backward in a playback order of the sequence, each listed start address expressed as a start address relative from the start address of the respective data unit to which the navigation data pack belongs, and a flag indicating whether or not the data unit designated by each start address contains video data;
means for collecting the plurality of data units so that they may be reproduced time-sequentially and for creating a plurality of data cells whose playback sequence can be specified;
means for creating a table in which second playback information is written concerning playback of each data cell; and
means for recording the plurality of data cells and the table, the data cells being recorded immediately after the table.

122. An apparatus according to claim 89, wherein said playback information contains an address of a first data unit in each data cell.

123. An apparatus according to claim 89, wherein said playback information contains an address of a lost data unit in each data cell.

124. An apparatus according to claim 89, wherein said playback information contains a playback time for the data cell.

125. An apparatus according to claim 121, wherein said second playback information is written on said table based on an order in which the cells are to be reproduced.

126. An apparatus according to claim 89, wherein said data cells are assigned identification numbers .

127. An apparatus according to claim 89, wherein the navigation pack stores playback information on the data pack and navigation information indicating the relationship with other data units.

128. An apparatus according to claim 89, wherein said navigation pack contains information on a time when the data unit containing the navigation pack is to be reproduced.

129. A communication system for transferring playback data containing navigation data, comprising:

means for creating a plurality of data cells whose playback sequence can be specified and which are played back consecutively and time-sequentially, each data cell being composed of a plurality of data units to be reproduced within a specific period of time, each data unit including at least one predetermined sequence of data packs, each data pack having the same pack length, the sequence of data packs including at least one of video packs, audio packs and sub-picture packs, wherein each data pack includes, a header and a packet of encoded video, audio or sub-picture data, and a navigation pack placed at the head of the sequence the navigation pack including a pack header, a first packet and a second packet, the first packet being composed of a packet header and first control information for storing presentation control information, which includes a start time and an end time of the presentation of the data unit, and the second packet being composed of a packet header and second control information for storing data search information, which includes a list of start addresses of a number of data units forward and backward in playback order of the sequence, each listed start address expressed as a start address relative from the start address of the respective data unit to which the navigation data pack belongs, and a flat indicating whether or not the data unit designated by each start address contains video data;

a table in which second playback information is written concerning the playback of each data cell; and means for transferring the table with reference to the table after transferring the data units including the navigation pack.

130. A communication system according to claim 129, wherein said playback information contains an address of a first data unit in each data cell.

131. A communication system according to claim 129, wherein said playback information contains an address for date data unit in each data cell.

132. A communication system according to claim 129, wherein said playback information contains the playback time of the cell.

133. A communication system according to claim 129, wherein said acquiring step contains the step of transferring the data cell to be reproduced with reference to said playback time after a certain time has elapsed.

134. A communication system according to claim 129, wherein said second playback information is written on said table according to an order in which the data cells are to be reproduced.

135. A communication system according to claim 129, wherein said data cells are assigned identification numbers.

136. A communication system according to claim 129, wherein said navigation pack contains information on the time when the data unit containing the navigation pack is to be reproduced.

137. A communication system according to claim 129, further comprising, converting at least one of means for converting the data units into a playback signal with reference to the navigation information in the transferred playback data.

138. A communication system according to claim 137, wherein said converting means receives the data cells with reference to said navigation pack.

* * * * *